US010701020B2

(12) United States Patent
Miller

(10) Patent No.: US 10,701,020 B2
(45) Date of Patent: Jun. 30, 2020

(54) MULTI-USER MEDIA PRESENTATION SYSTEM

(71) Applicant: Facebook, Inc., Menlo Park, CA (US)

(72) Inventor: Joshua Alexander Miller, London (GB)

(73) Assignee: FACEBOOK, INC., Menlo Park, CA (US)

(*) Notice: Subject to any disclaimer, the term of this patent is extended or adjusted under 35 U.S.C. 154(b) by 218 days.

(21) Appl. No.: 14/788,415

(22) Filed: Jun. 30, 2015

(65) Prior Publication Data

US 2016/0294894 A1 Oct. 6, 2016

Related U.S. Application Data

(60) Provisional application No. 62/141,132, filed on Mar. 31, 2015.

(51) Int. Cl.
G06F 17/20 (2006.01)
H04L 12/58 (2006.01)
H04L 29/08 (2006.01)
G06F 16/2457 (2019.01)
H04L 29/06 (2006.01)
G06F 3/0482 (2013.01)
G06F 3/0484 (2013.01)
G06Q 30/02 (2012.01)
G06Q 50/00 (2012.01)

(52) U.S. Cl.
CPC ............ H04L 51/32 (2013.01); G06F 3/0482 (2013.01); G06F 3/04842 (2013.01); G06F 16/24578 (2019.01); G06Q 30/0242 (2013.01); G06Q 50/01 (2013.01); H04L 51/10 (2013.01); H04L 51/20 (2013.01); H04L 51/24 (2013.01); H04L 51/36 (2013.01); H04L 63/102 (2013.01); H04L 65/1089 (2013.01); H04L 65/4007 (2013.01); H04L 65/4076 (2013.01); H04L 65/4084 (2013.01); H04L 65/605 (2013.01); H04L 67/1044 (2013.01); H04L 67/306 (2013.01)

(58) Field of Classification Search
CPC ...................................... H04L 51/32
See application file for complete search history.

(56) References Cited

U.S. PATENT DOCUMENTS

| 6,484,156 | B1 | 11/2002 | Gupta et al. |
| 7,031,931 | B1* | 4/2006 | Meyers ............. G06Q 30/0203 |
| | | | 348/E5.096 |
| 7,454,509 | B2 | 11/2008 | Boulter et al. |

(Continued)

OTHER PUBLICATIONS

U.S. Appl. No. 14/788,432, filed Jun. 30, 2015, Miller.

(Continued)

Primary Examiner — Shahid K Khan
(74) Attorney, Agent, or Firm — Keller Jolley Preece

(57) ABSTRACT

One or more embodiments of the disclosure provide systems and methods for providing media presentations to users of a media presentation system. A media presentation generally includes a plurality of media segments provided by multiple users of the media presentation system. In one or more embodiments, a user of the media presentation system may share a media presentation with a co-user. The media presentation system can provide a number of features to assist a user in sharing, filtering, and accessing media presentations.

20 Claims, 27 Drawing Sheets

(56) References Cited

U.S. PATENT DOCUMENTS

| | | | | |
|---|---|---|---|---|
| 7,516,186 B1* | 4/2009 | Borghetti | G06Q 10/107 | 707/999.104 |
| 7,756,880 B2* | 7/2010 | Sighart | G06F 16/3326 | 707/751 |
| 7,996,566 B1 | 8/2011 | Sylvain et al. | | |
| 8,275,880 B2* | 9/2012 | Allard | G06Q 30/02 | 709/217 |
| 8,291,452 B1* | 10/2012 | Yong | H04N 21/2743 | 715/719 |
| 8,725,832 B2* | 5/2014 | Bartholomew | G06F 3/0482 | 709/217 |
| 8,849,816 B2* | 9/2014 | Burba | G06F 16/9535 | 707/732 |
| 8,874,558 B1 | 10/2014 | He et al. | | |
| 9,071,871 B2 | 6/2015 | Porter et al. | | |
| 9,118,869 B2* | 8/2015 | Stallings | H04N 5/44543 | |
| 9,118,965 B1 | 8/2015 | Gravino et al. | | |
| 9,129,640 B2 | 9/2015 | Hamer | | |
| 9,130,892 B2* | 9/2015 | Singh | H04L 51/04 | |
| 9,179,116 B1 | 11/2015 | Liao | | |
| 9,361,353 B1 | 6/2016 | Aristides | | |
| 9,367,883 B2 | 6/2016 | Sokolov et al. | | |
| 9,386,063 B2 | 7/2016 | McMahon et al. | | |
| 9,396,195 B1 | 7/2016 | Beguelin | | |
| 9,411,816 B2* | 8/2016 | Lai | G06F 16/178 | |
| 9,661,364 B2* | 5/2017 | Scheer | H04N 21/2408 | |
| 9,900,659 B1 | 2/2018 | Norum et al. | | |
| 2003/0105827 A1* | 6/2003 | Tan | G06Q 10/107 | 709/206 |
| 2005/0234850 A1* | 10/2005 | Buchheit | G06Q 10/10 | |
| 2006/0026593 A1* | 2/2006 | Canning | G06F 9/4843 | 718/100 |
| 2006/0083119 A1* | 4/2006 | Hayes | G11B 27/034 | 369/30.09 |
| 2006/0143236 A1* | 6/2006 | Wu | G06F 17/30053 | |
| 2006/0267995 A1 | 11/2006 | Radloff et al. | | |
| 2007/0028266 A1 | 2/2007 | Trajkovic et al. | | |
| 2007/0112630 A1* | 5/2007 | Lau | G06K 9/72 | 705/14.1 |
| 2007/0143428 A1* | 6/2007 | Kumar | G06Q 10/107 | 709/206 |
| 2007/0233736 A1 | 10/2007 | Xiong et al. | | |
| 2007/0244902 A1 | 10/2007 | Seide et al. | | |
| 2007/0245882 A1 | 10/2007 | Odenwald | | |
| 2008/0028427 A1* | 1/2008 | Nesvadba | H04N 5/44543 | 725/46 |
| 2008/0030300 A1 | 2/2008 | Naito et al. | | |
| 2008/0126954 A1* | 5/2008 | Schmidt | G06Q 30/02 | 715/758 |
| 2008/0184122 A1* | 7/2008 | Grant | G06Q 10/10 | 715/723 |
| 2008/0304808 A1* | 12/2008 | Newell | G11B 27/034 | 386/278 |
| 2009/0132520 A1 | 5/2009 | Nemeth et al. | | |
| 2009/0144392 A1 | 6/2009 | Wang et al. | | |
| 2009/0164516 A1* | 6/2009 | Svendsen | G11B 27/105 | |
| 2009/0164904 A1 | 6/2009 | Horowitz et al. | | |
| 2010/0011292 A1 | 1/2010 | Marinkovich et al. | | |
| 2010/0299326 A1* | 11/2010 | Germaise | G06F 16/9535 | 707/728 |
| 2010/0325218 A1* | 12/2010 | Castro | G06Q 50/01 | 709/206 |
| 2011/0126236 A1 | 5/2011 | Arrasvuori et al. | | |
| 2011/0161423 A1 | 6/2011 | Pratt et al. | | |
| 2011/0225249 A1* | 9/2011 | Forstall | H04L 51/00 | 709/206 |
| 2011/0246937 A1 | 10/2011 | Roberts et al. | | |
| 2011/0280549 A1 | 11/2011 | Walker et al. | | |
| 2011/0321072 A1 | 12/2011 | Patterson et al. | | |
| 2012/0005282 A1* | 1/2012 | Steinbok | G06F 16/353 | 709/206 |
| 2012/0030282 A1 | 2/2012 | Brody et al. | | |
| 2012/0054275 A1* | 3/2012 | Channell | G06Q 30/0278 | 709/204 |
| 2012/0077175 A1* | 3/2012 | Levisay | G09B 5/06 | 434/322 |
| 2012/0109345 A1* | 5/2012 | Gilliland | G11B 27/105 | 700/94 |
| 2012/0114194 A1 | 5/2012 | Kim et al. | | |
| 2012/0117488 A1 | 5/2012 | Amidon et al. | | |
| 2012/0143972 A1* | 6/2012 | Malik | H04L 51/36 | 709/206 |
| 2012/0192064 A1 | 7/2012 | Antebi et al. | | |
| 2012/0297313 A1* | 11/2012 | Sharma | G06Q 10/10 | 715/751 |
| 2012/0308209 A1 | 12/2012 | Zaletel | | |
| 2012/0331169 A1 | 12/2012 | McIntire et al. | | |
| 2013/0013622 A1* | 1/2013 | Elliot-McCrea | G06F 17/30038 | 707/751 |
| 2013/0031162 A1* | 1/2013 | Willis | H04L 65/1069 | 709/203 |
| 2013/0086030 A1* | 4/2013 | De Filippi | G06F 16/9535 | 707/706 |
| 2013/0103814 A1 | 4/2013 | Carrasco et al. | | |
| 2013/0117365 A1 | 5/2013 | Padmanabhan et al. | | |
| 2013/0117692 A1 | 5/2013 | Padmanabhan et al. | | |
| 2013/0247111 A1 | 9/2013 | Templeman et al. | | |
| 2013/0262585 A1 | 10/2013 | Niemeyer et al. | | |
| 2013/0268973 A1 | 10/2013 | Archibong et al. | | |
| 2013/0275312 A1 | 10/2013 | Claman et al. | | |
| 2014/0040381 A1 | 2/2014 | Guerrera et al. | | |
| 2014/0052539 A1 | 2/2014 | Lauback et al. | | |
| 2014/0056574 A1 | 2/2014 | Mostoufi et al. | | |
| 2014/0067828 A1* | 3/2014 | Archibong | H04L 65/4084 | 707/748 |
| 2014/0186004 A1 | 7/2014 | Hamer | | |
| 2014/0278872 A1 | 9/2014 | Shimizu et al. | | |
| 2014/0325362 A1 | 10/2014 | Potts et al. | | |
| 2014/0359011 A1 | 12/2014 | Varenhorst et al. | | |
| 2015/0038121 A1* | 2/2015 | Koum | H04L 51/10 | 455/412.2 |
| 2015/0039609 A1 | 2/2015 | Weinstein et al. | | |
| 2015/0070516 A1 | 3/2015 | Shoemake et al. | | |
| 2015/0088897 A1 | 3/2015 | Sherman et al. | | |
| 2015/0089384 A1 | 3/2015 | Lewis et al. | | |
| 2015/0141140 A1 | 5/2015 | Lampe et al. | | |
| 2015/0205971 A1 | 7/2015 | Sanio et al. | | |
| 2015/0236998 A1* | 8/2015 | Verma | H04L 63/08 | 709/206 |
| 2015/0296228 A1 | 10/2015 | Chen et al. | | |
| 2016/0034425 A1 | 2/2016 | Liu et al. | | |
| 2016/0065520 A1* | 3/2016 | Puranik | G06F 3/0482 | 715/752 |
| 2016/0174036 A1 | 6/2016 | Ruhstaller et al. | | |
| 2016/0182950 A1 | 6/2016 | Robinson et al. | | |
| 2016/0234267 A1 | 8/2016 | Hebbar | | |
| 2016/0286244 A1 | 9/2016 | Chang et al. | | |
| 2016/0328404 A1* | 11/2016 | Ross | G06F 17/3053 | |

OTHER PUBLICATIONS

U.S. Appl. No. 14/788,441, filed Jun. 30, 2015, Miller.
U.S. Appl. No. 14/788,461, filed Jun. 30, 2015, Miller.
U.S. Appl. No. 14/788,484, filed Jun. 30, 2015, Miller.
Horowitz, Paul, "Easily Add Password Protection to Shared iTunes Libraries & Playlists" Jan. 5, 2013, OSXDaily.
U.S. Appl. No. 14/788,432, Mar. 24, 2017, Office Action.
U.S. Appl. No. 14/788,441, May 19, 2017, Office Action.
U.S. Appl. No. 14/788,461, Apr. 20, 2017, Office Action.
U.S. Appl. No. 14/788,484, May 11, 2017, Office Action.
U.S. Appl. No. 14/788,461, Nov. 29, 2017, Office Action.
U.S. Appl. No. 14/788,484, Feb. 2, 2018, Office Action.
U.S. Appl. No. 14/788,432, Aug. 28, 2017, Office Action.
U.S. Appl. No. 14/788,441, Oct. 17, 2017, Office Action.
U.S. Appl. No. 14/788,432, Feb. 22, 2018, Office Action.
U.S. Appl. No. 14/788,441, Apr. 19, 2018, Notice of Allowance.
U.S. Appl. No. 14/788,461, May 4, 2018, Office Action.

(56) References Cited

OTHER PUBLICATIONS

U.S. Appl. No. 62/139,451 titled "Live Video Streaming Services" dated Mar. 27, 2015.
U.S. Appl. No. 14/788,432, Jun. 18, 2018, Office Action.
U.S. Appl. No. 14/788,432, Jan. 10, 2019, Office Action.
U.S. Appl. No. 14/788,461, Feb. 6, 2019, Office Action.
U.S. Appl. No. 14/788,484, Nov. 15, 2018, Office Action.
U.S. Appl. No. 14/788,432, May 31, 2019, Office Action.
U.S. Appl. No. 14/788,461, Jun. 28, 2019, Office Action.
U.S. Appl. No. 14/788,484, May 29, 2019, Office Action.
U.S. Appl. No. 14/788,484, Oct. 2, 2019, Office Action.
U.S. Appl. No. 14/788,461, dated Jan. 16, 2020, Office Action.

* cited by examiner

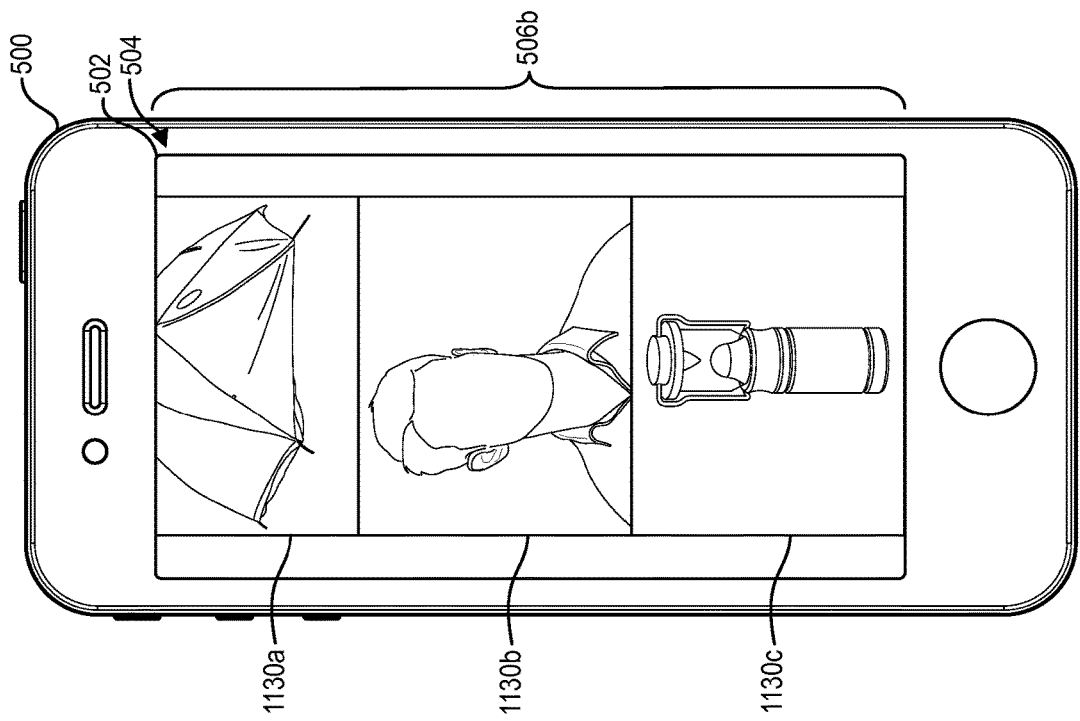
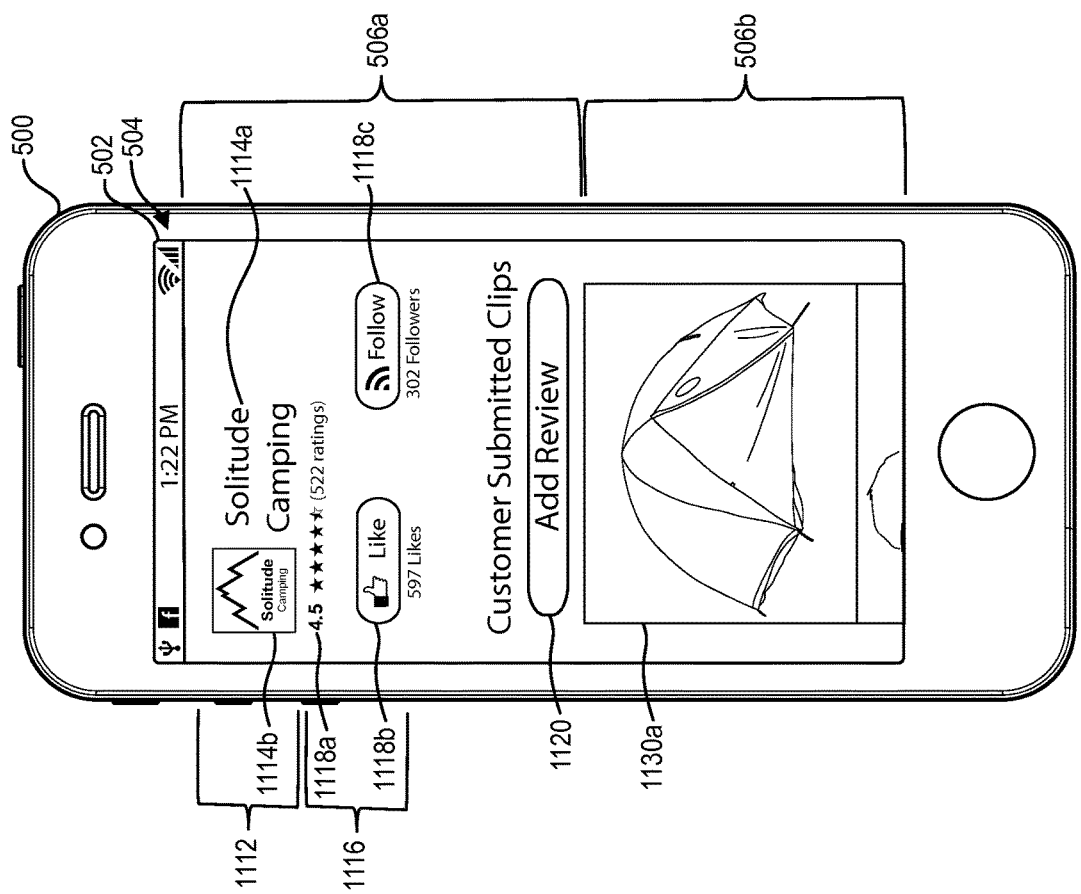
Fig. 11A
Fig. 11B

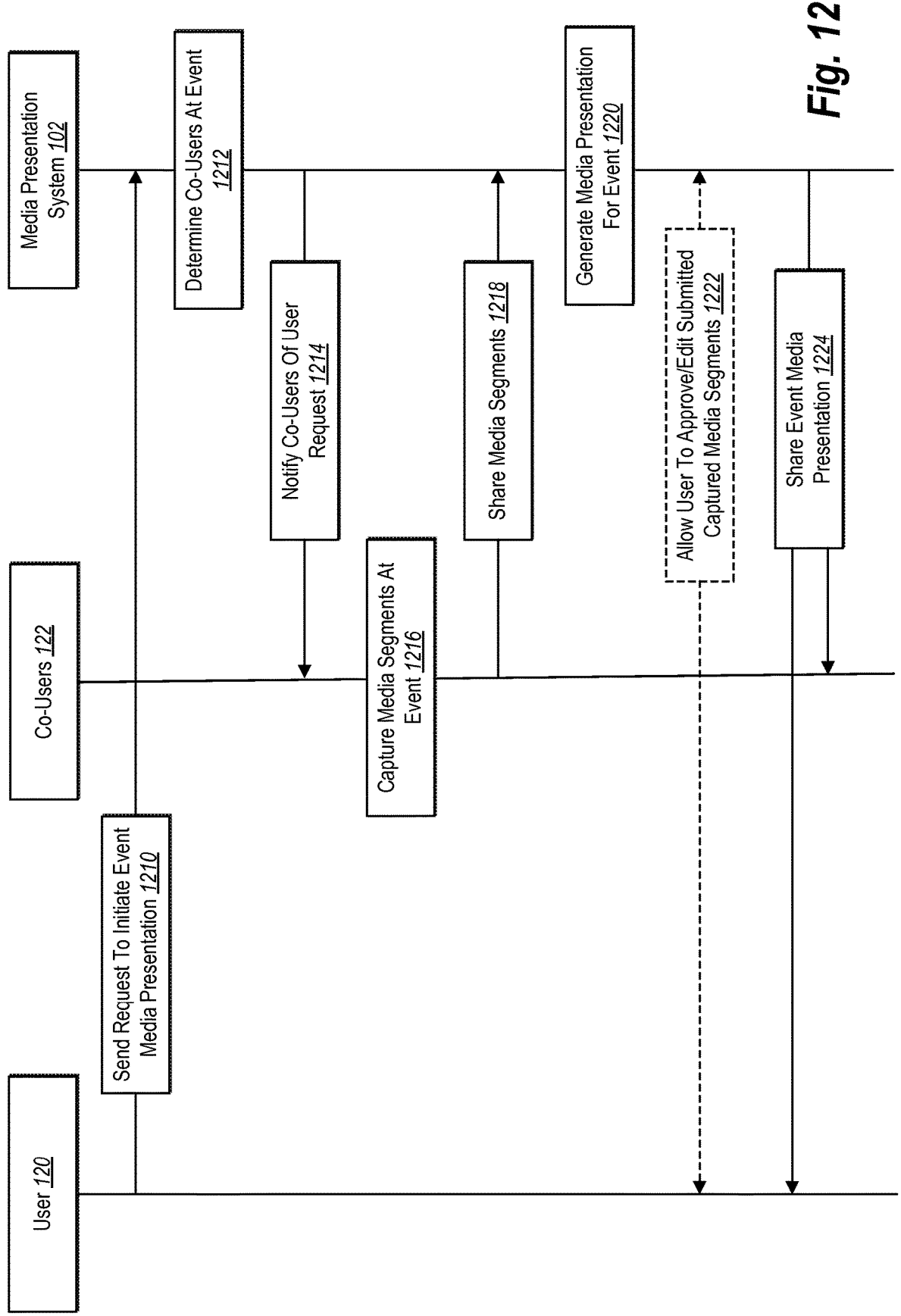

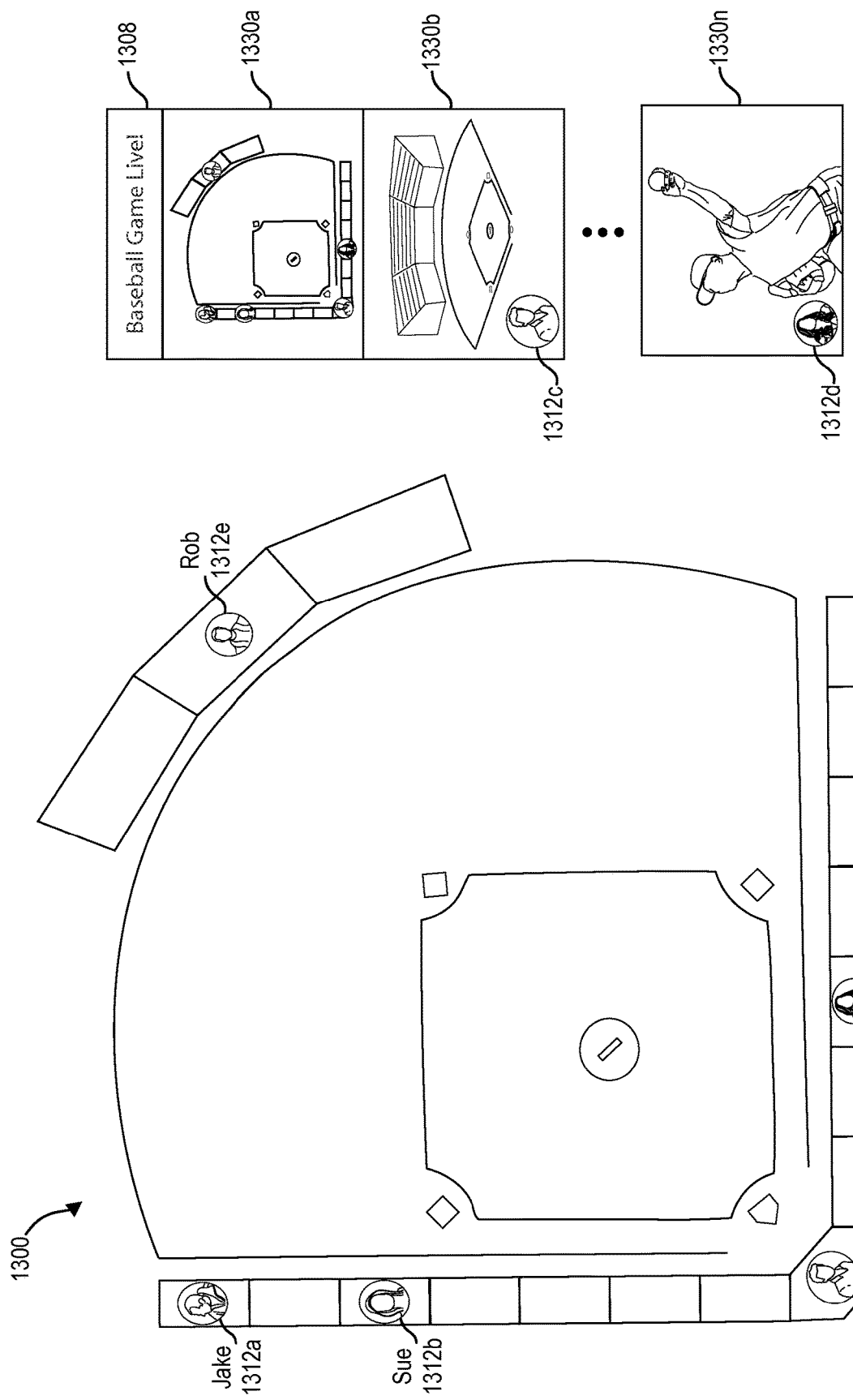

MULTI-USER MEDIA PRESENTATION SYSTEM

CROSS REFERENCE TO RELATED APPLICATIONS

The present application claims priority from U.S. Provisional Application No. 62/141,132 filed Mar. 31, 2015. The aforementioned application is hereby incorporated by reference in its entirety.

BACKGROUND

1. Technical Field

One or more embodiments relate to systems and methods for providing media content to multiple users. More specifically, one or more embodiments of the present invention relate to systems and methods for distributing media content among multiple users.

2. Background and Relevant Art

Through advancements in computing devices and computing technology, users can often share user-generated media with other users. As such, users are increasingly capturing and sharing experiences using various computing devices. For example, modern mobile devices enable users to capture and share pictures, videos, and text with co-users (e.g., family members, co-workers, friends, or with the public at large). For instance, a user can share user-generated content with a group of friends via a variety of communication systems (e.g., IM, text, or social networks).

Despite advances in technology, a number of drawbacks remain for a user wanting to share user-generated media with other users. For example, one disadvantage of conventional systems is that many conventional systems are directed toward media posts that are individualistic in nature. In other words, a thread of posts between multiple users focuses on interactions between the individual user that created the post and the other co-users interacting with the user, rather than a group of users interacting with each other as a group. Thus, many conventional systems do not provide an environment where a group of users can co-create and share group-created media with each other.

As another disadvantage, many conventional communication systems that allow users to share user-generated media often provide a cluttered and confusing presentation of the shared content. Some conventional systems that allow users to share user-generated media with other users attempt to reduce interface clutter by removing, deleting, or denying additional access to shared media once a co-user accesses the shared media. Specifically, in these conventional systems, a co-user's access to the shared media ends after the co-user accesses the shared media (e.g., views a shared photo or video). Although these conventional systems provide an effort to reduce clutter, these conventional systems do so at the expense of further increasing the isolation of each post between users. In other words, because users view each media post in isolation, and because each media post is removed automatically after a user accesses the media, participating in a media conversation using these conventional systems is difficult. This is especially the case with a group media conversation involving multiple users.

Accordingly, there are a number of considerations to be made in improving a user experience in relation to creating and participating in multimedia conversations with a group of users.

SUMMARY

One or more embodiments described herein provide benefits and/or solve one or more of the foregoing or other problems in the art with systems and methods of creating and sharing collaborative media content between co-users. For example, one or more principles described herein provide systems and methods that allow a user to view, contribute to, and create media presentations that include media segments generated and provided by the user and/or multiple co-users.

Moreover, some principles described herein provide systems and methods that provide users with a number of features that assist users in the automatic creation, sharing, and filtering of media segments and media presentations. For example, systems and methods described herein may provide for the automatic creation of media presentations based that share related media segment or the automatic creation of an event media presentation. As another example, the systems and methods described herein may provide suggestions to a user as to which co-users with which the user should share a media presentation. Further, the systems and methods may filter media presentation to isolate particular media segment as well as identify and block inappropriate media.

The systems and methods may also provide information to users regarding media presentations as well as about co-users. For example, the systems and methods disclosed herein may automatically generate and display credits for a media presentation. Further, the systems and methods can allow users to view and contribute to a co-user's profile, such as enabling the user to share a personal media segment message with the co-user.

In addition, principles described herein provide systems and methods that provide users to access live media captured at an event and/or view highlights from the event. Further, the systems and methods may allow a user to access and view the live media and highlight for more than one angle or perspective. For instance, systems and methods described herein can obtain multiple live streaming media segments captured at the same time by different users at an event, and share the live streaming media segments with other co-users.

In addition, the systems and methods disclosed herein provide a user with a media presentation list that organizes media presentations for presentation to the user. For example, the systems and methods disclosed herein provide efficient and intuitive navigation between various media segments within a media presentation. As a result, a user can quickly navigate and experience the media presentations in a manner that reduces user interface clutter and increases user enjoyment. Similarly, a user can intuitively navigate through media segments within a media presentation to experience a media presentation in an enjoyable manner.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail using the accompanying drawings.

FIGS. 11A-11B illustrate exemplary graphical user interfaces showing a company profile in accordance with one or more embodiments;

FIG. 12 illustrates a sequence-flow diagram showing a user and a co-user interacting with the media presentation system in accordance with one or more embodiments;

FIG. 13A illustrates a baseball stadium where multiple users of the media presentation system may be watching a baseball game;

FIG. 13B illustrates an example media presentation including media segment captured by users at the baseball game shown in FIG. 13A in accordance with one or more embodiments;

DETAILED DESCRIPTION

Figure 1:
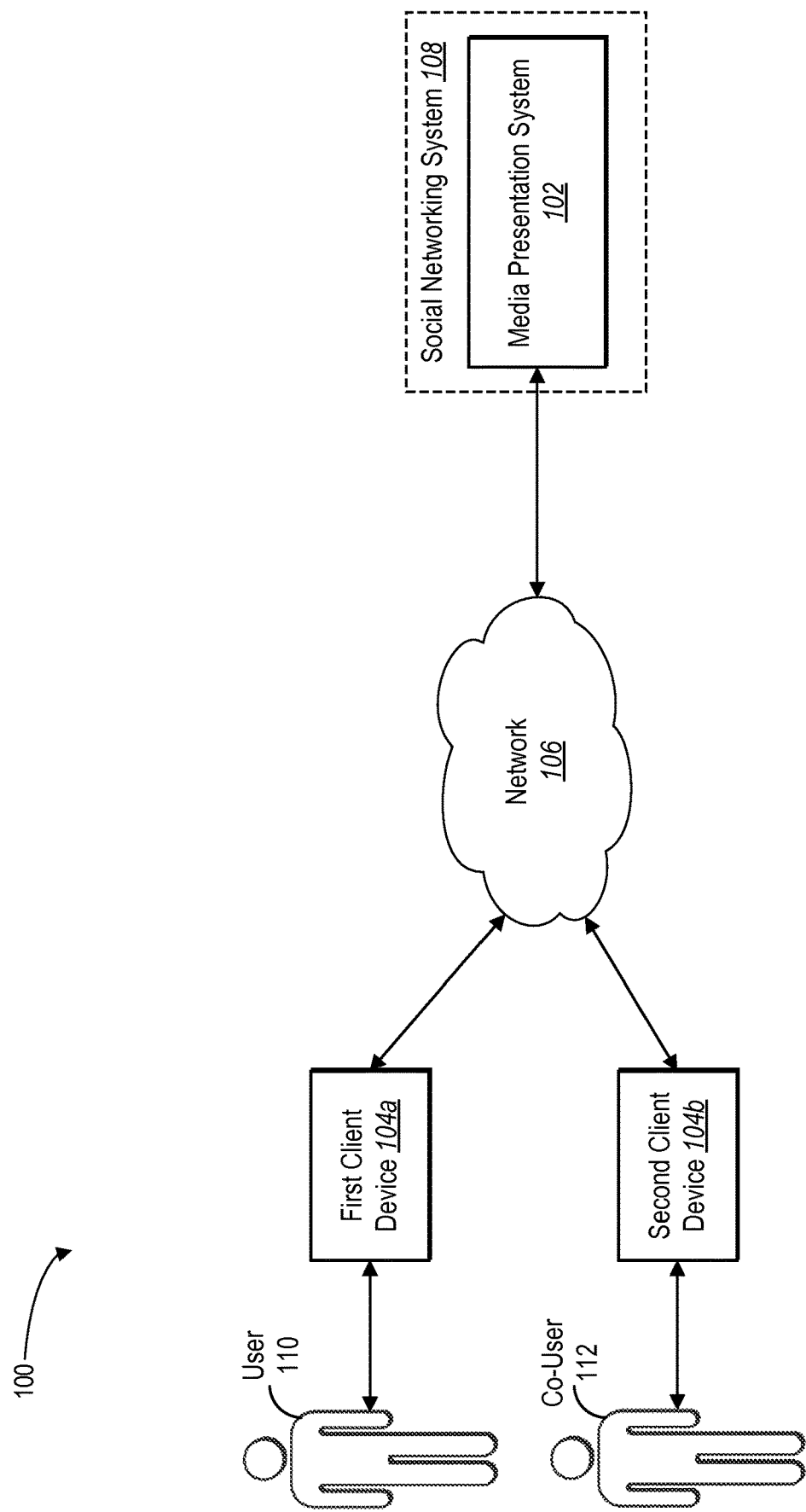
FIG. 1 illustrates a schematic diagram of a communication system in accordance with one or more embodiments described herein.

Embodiments disclosed herein provide benefits and/or solve one or more of the abovementioned or other problems in the art with a media presentation system that improves a user's experience for creating and participating in collaborative multimedia conversations with other users. In particular, the media presentation system easily allows a user to receive, view, contribute to, edit, report, filter, and/or create media presentation. Additionally, in one or more embodiments, the media presentation system provides an intuitive graphical user interface that allows a user to efficiently navigate, view, create, contribute to, and otherwise experience media presentations within a media presentation list.

In particular, one or more embodiments of the media presentation system may automatically create a media presentation based on related media segments. In another embodiment, the media presentation system may generate a credits list and/or participant list. Further, in some embodiments, the media presentation system may provide, to a user, a live streaming media segment captured by another user. In addition, the media presentation system may provide multiple live streaming media segment to one or more users. The media presentation system may also automatically generate and provide a significant act ("highlights") media presentation to users of the media presentation system. Further, in one or more embodiments, the media presentation system may censor a media segment in a media segment and/or media presentation for one or more users.

In addition to presenting several media presentations to the user, in some embodiments, the media presentation system can enable the user to start or otherwise create a media presentation. For instance, and as discussed briefly above, the media presentation system can assist the user in selecting which co-users can view the media presentation and/or which co-users can add to the media presentation. Further, the media presentation system may allow the user to approve, edit, or remove media segments added by the user or by other co-users to the media presentation.

Accordingly, one or more embodiments of the media presentation system overcome one or more of the disadvantages of conventional systems by providing systems and methods to allow users to create and share collaborative media presentations. As such, example embodiments of the media presentation system allow users to participate in collaborative media conversations in an intuitive and enjoyable manner. Moreover, one or more embodiments of the media presentation system provide a graphical user interface that eliminates user interface clutter and confusion inherent in conventional systems due to having duplicate copies of media and/or long lists of media, which require the user to spend significant amounts of time to manually experience the shared media content. In addition, and as will be describe in more detail below, example embodiments of a media presentation system can provide continued access to a collaborative media presentation for users to continue to enjoy and share, while at the same time overcoming user interface clutter (e.g., a user's media contribution is not simply erased to reduce clutter as with some conventional systems).

The term "media," as used herein refers to digital data that may be transmitted over a communication network. Examples of media include, but are not limited to, digital photos, digital video files, digital audio files, and/or streaming content. Accordingly, media may refer to images, video, audio, text, documents, animations, or any other audio/visual content that may be transmitted over a communication network. In addition, examples of media can include user-generated media (e.g., content that a user captures using a media capturing feature of a smart phone, such as digital photos or videos) as well as nonuser-generated media (e.g., content generated by a party other than a user, but to which the user has access).

The term "media segment," as used herein refers generally to a discrete portion of media. A media segment may include an image segment, video segment, and/or an audio segment. For example, a media segment may be an image segment that is displayed for a duration of time. As another example, a media segment may include a video clip or an audio clip.

As used herein, the term "media presentation" refers to a defined set of one or more media segments. For example, a media presentation can include a plurality of media segments contributed by one or more users. As such, in one or more embodiments, a media presentation can include a compilation of media segments composed by multiple users. For example, a media presentation may include a thread of related media segments captured by two or more users in a conversation with each other about a particular topic. Additionally, a media presentation can include a single media segment, provided by a user, to which other users can append one or more additional media segments (e.g., the creation of a new media presentation).

As used herein, the terms "interact" or "interacting" refer generally to any type of interface activity between a user and a client device. For example, interacting can include a user viewing, browsing, accessing, and/or otherwise experiencing video content. Moreover, interacting can include selecting elements on a client device, such as selecting menu options or graphical buttons to create a media presentation or add a media segment to an existing media presentation. For instance, a user can interact with a client device to capture a media segment, replay a captured media segment, approve a captured media segment, request a captured media segment be added to a media presentation, or cancel capture of a media segment. In one or more embodiments, a user can interact with a client device using one or more user input devices, such as a touch screen, touchpad, or mouse.

FIG. 1 illustrates an example embodiment of a communication system 100 (or simply, "system 100") in accordance with one or more embodiments described herein. As shown, the system 100 may include a media presentation system 102, a first client device 104a, and a second client device 104b (collectively "client devices 104"), that are communicatively coupled through a network 106. Although FIG. 1 illustrates a particular arrangement of the media presentation system 102, client devices 104, and the network 106, various additional arrangements are possible. For example, the client devices 104 may directly communicate with the media presentation system 102, bypassing the network 106.

Optionally, the system 100 may include a social networking system 108. When the system 100 includes the social networking system 108, the media presentation system 102 may be a part of the social networking system 108. In this manner, users of the social networking system 108 may be able to use the features and functionalities of the media presentation system 102 described herein. Alternatively, the media presentation system 102 and the social networking system 108 may be independent from each other, but still be able to communicate with each other via the network 106.

As mentioned above, the media presentation system 102, the client devices 104, and the social networking system 108 may communicate via the network 106. The network 106 may include one or more networks and may use one or more communications platforms or technologies suitable for transmitting data and/or communication signals. Additional details relating to the network 106 are explained below with reference to FIGS. 24-25.

As further illustrated in FIG. 1, a user 110 may interact with the first client device 104a and a co-user 112 may interact with the second client device 104b. The user 110 and/or the co-user 112 may be an individual (i.e., human user), a business, a group, or other entity. For sake of explanation, FIG. 1 illustrates only one user 110 and one co-user 112, however, it should be understood that system 100 may include any number of users, with each of the users interacting with the system 100 with one or more client devices. Likewise, it should be understood that the terms "user" and "co-user" are generally used for purposes of explanation, and that the user 110 and the co-user 112 are both simply users of the media presentation system 102.

As mentioned above, the user 110 and the co-user 112 may interact with client devices 104a and 104b, respectively, to communicate with the media presentation system 102 and/or social networking system 108. The client devices 104 may represent various types of client devices. For example, the client devices 104 can include: a mobile device such as a mobile telephone, a smartphone, a PDA, a tablet, a laptop; a non-mobile device such as a desktop or server; or any other type of computing device. In addition, a client device may include display devices such as televisions, LCD displays, LED displays, monitors, projectors, etc. Additional details and examples with respect to the client devices 104 are discussed below with respect to FIGS. 24-25.

As shown in FIG. 1 and as mentioned above, the system 100 can include the social networking system 108. In some embodiments, however, the system 100 does not include a social networking system 108. Nevertheless, the media presentation system 102, the user 110, and/or the co-user 112 may be associated with the social networking system 108. For example, the user 110 may authorize the media presentation system 102 to access the social networking system 108 to obtain information about the user 110, such as the user's profile, social networking contacts, and affinity to each social networking contact. The media presentation system 102 may also use the social networking system 108 to share media presentations among users of the media presentation system 102. For instance, a user may compose and/or initiate a media presentation from the social networking system 108. Further, the user 110 many post a media presentation on a newsfeed of a social networking user who is connected to the user 110 via the media presentation system 102 and/or social networking system 108.

As briefly discussed above, the system 100 includes the media presentation system 102. In general, the media presentation system 102 facilitates the generation and distribution of media presentations. The media presentation system 102 further enables the user 110 to share media presentations with the co-user 112, as well as receive shared media presentations from the co-user 112.

Regardless of the particular components or arrangement of components of the system 100, the system 100 generally allows users of the system to create, edit, filter, report, and/or share media presentations that include media segments contributed from multiple users. As a non-limiting overview example, the co-user 112 may capture media on the second client device 104b (e.g., a digital video) and create a media presentation that includes the captured media as a media segment. The co-user 112 can then share the media presentation with the user 110 via the media presentation system 102. For example, the media presentation system 102 can provide the media presentation to the first client device 104a to present the media presentation to the user 110.

Figure 2:
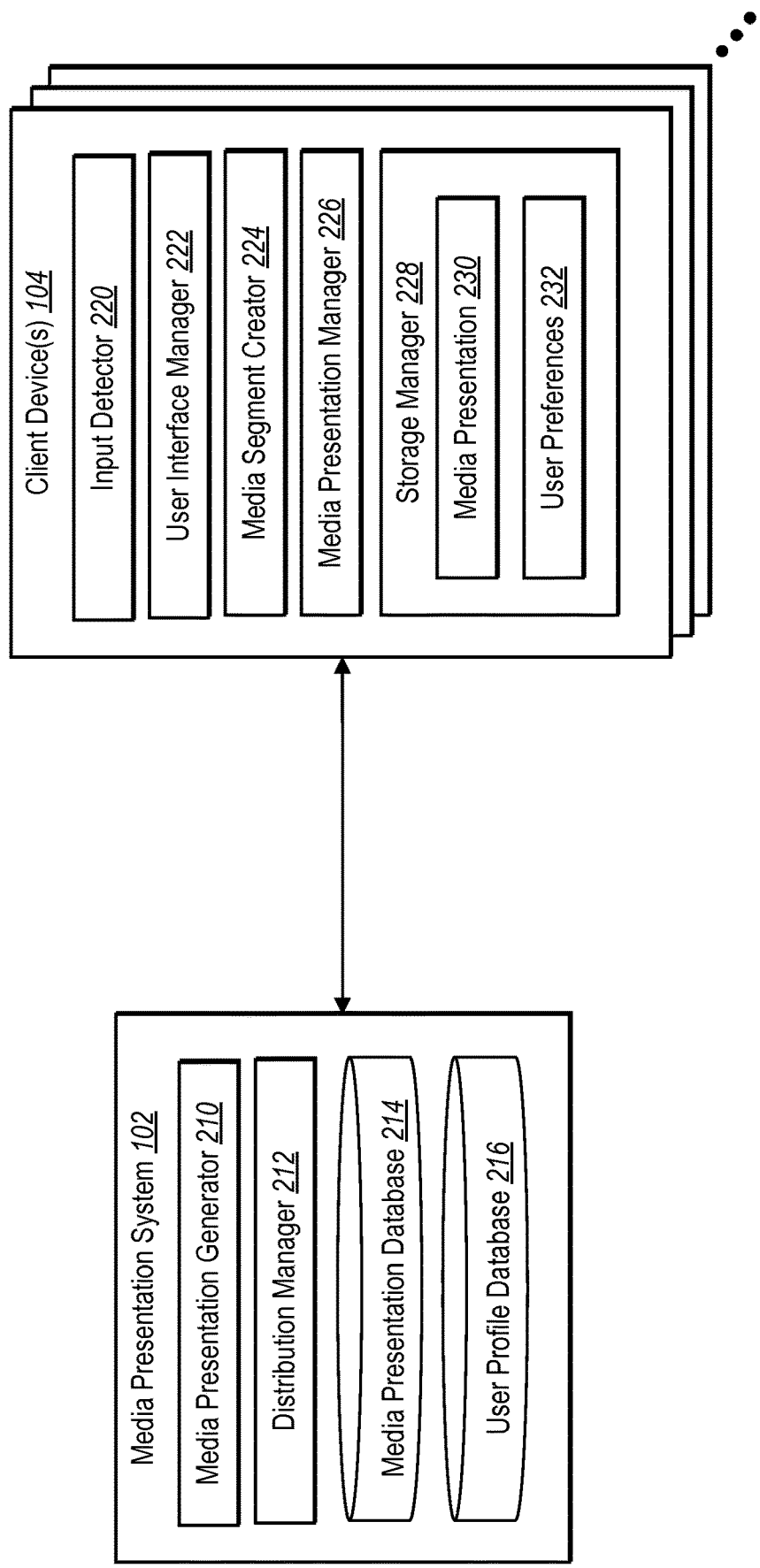
FIG. 2 illustrates a schematic diagram of a media presentation system in communication with one or more client devices in accordance with one or more embodiments described herein.

FIG. 2 illustrates a schematic diagram of a media presentation system 102 in communication with one or more client devices 104. The media presentation system 102 in FIG. 2 can represent one or more embodiments of the media presentation system 102 discussed above with reference to FIG. 1. Similarly, the client device 104 shown in FIG. 2 may represent one or more embodiments of the first client device 104a and/or the second client device 104b discussed above with reference to FIG. 1. For example, the media presentation system 102 and the client device 104 in FIG. 2 can be part of the communication system 100 illustrated in FIG. 1.

As illustrated in FIG. 2, the media presentation system 102 can include, but is not limited to, a media presentation generator 210, a distribution manager 212, a media presentation database 214, and a user profile database 216. In general, the media presentation generator 210 can receive media segments from the client device(s) 104 and use the media segments to generate new or updated media presentations. The distribution manager 212 can provide media presentations to one or more users of the media presentation system 102 via the client device(s) 104. The media presentation database 214 can maintain a plurality of media presentations and/or media segments, and the user profile database 216 can maintain user information for users of the media presentation system 102.

Each component of the media presentation system 102 may be implemented using a computing device including at least one processor executing instructions that cause the media presentation system 102 to perform the processes described herein. In some embodiments, the components of the media presentation system 102 can be implemented by a single server device, or across multiple server devices. Although a particular number of components are shown in FIG. 2, the media presentation system 102 can include more components or can combine the components into fewer components (such as a single component), as may be desirable for a particular embodiment.

As briefly mentioned above, and as illustrated in FIG. 2, the media presentation system 102 may include a media presentation generator 210. The media presentation generator 210 may create a new media presentation or generate an updated media presentation, as described below. The media presentation generator 210 may also communicate with the media presentation database 214, which may store media presentations and/or media segments.

In one or more embodiments, for example, the media presentation generator 210 may generate a media presentation when the media presentation system 102 receives one or more media segments from the client device 104. For example, a user may request, on the client device 104, to create a new media presentation or add a media segment to an existing media presentation. In response, the client device 104 may capture a media segment, and then send the media segment to the media presentation system 102 to create a new media presentation or to add to an existing media presentation.

To illustrate, the media presentation system 102 may receive a media segment from the first client device 104a. The media segment may include an indication that identifies the media segment as a new media presentation or identifies the media segment as corresponding to an existing media presentation. For example, a media segment may include metadata that identifies the media segment as part of a new media presentation or as part of an existing media presentation. For instance, in the event a user, via the first client device 104a, submits a media segment intended to be the first media segment of a new media presentation, the metadata can include identification data that is null or identification data that otherwise indicates the media segment is not associated with any existing media presentation. On the other hand, when a user submits a media segment that is intended to be associated with an existing media presentation, the metadata can include identification data that uniquely references the existing media presentation.

Accordingly, after the media presentation system 102 receives a media segment, the media presentation generator 210 may determine that the media segment is not associated with an existing media presentation, and in response, the media presentation generator 210 may generate a new media presentation that includes the received media segment. As part of creating a new media presentation, for example, the media presentation generator 210 can associate identification data with the media presentation that the media presentation system 102 can use to identify the media presentation, as well as associate other properties or settings with the media presentation, as will be further described below.

In some embodiments, upon creating a media presentation, the media presentation generator 210 can create a media presentation file to store information and metadata for the media presentation. The file may include data structures such as one or more tables, arrays, databases, etc. Further, the media presentation generator 210 may store the media presentation file in the media presentation database 214 in connection with the media presentation.

The media presentation file can include information, such as a user ID corresponding to the user that created the file. In addition, the media presentation file can include links or pointers to media segments included in the media presentation (e.g., the location of a media segment stored within the media presentation database 214 and/or a third-party database). Further, the media presentation file can include information about each media segment, such as which users contributed each media segment, which users are associated with each media segment (e.g., tagged, identified in, etc.), the order each media segment should be presented on the client device 104 (e.g., play list order), a image that represent each file (e.g., a frame from the media segment, a user selected image, a default image, etc.), and/or information about each media segment (e.g., likes, shares, views, etc.). In this manner, the media presentation generator 210 may create a media presentation by associating and/or threading a number of media segments together.

Further, the media presentation file can include permission and authorization information. For example, the media presentation file may indicate which users are authorized to view and which users are permitted to contribute to the media presentation. As another example, the media presentation file can indicate which users can modify media segments within the media presentation and/or remove the media presentation from the media presentation system 102.

In addition to determining a media segment is not associated with an existing media presentation, the media presentation generator 210 can determine that a received media segment is associated with an existing media presentation. Based on determining that a media segment is associated with an existing media presentation, the media presentation generator 210 may update the existing media presentation to include the received media segment.

In one or more embodiments, the media presentation generator 210 may append the received media segment to one or more media segments corresponding to a media presentation. Specifically, the media presentation system 102 may receive a media segment from a client device 104. Further, the media presentation system 102 may identify the received media segment as belonging to an existing media presentation. Next, the media presentation generator 210 may append the received media file to the identified media presentation.

In some example embodiments, the media presentation generator 210 may append a media segment to a media presentation by updating the media presentation file associated with the media presentation. For example, upon the media presentation system 102 receiving a media segment that is to be appended or added to an existing media presentation, the media presentation generator 210 may update the media presentation file to point to the received media segment. For instance, the media presentation generator 210 may add a link or pointer to the location the received media segment is stored in the media presentation database 214. Accordingly, each time a media presentation is updated (e.g., a media segment is added, removed, or modified), the media presentation generator 210 may update the media presentation file corresponding to the media presentation.

Because, in some embodiments, the media presentation generator 210 generates media presentations by linking media segments together (e.g., in a media presentation file), the media presentation generator 210 may include the same media segment in numerous media presentations without storing duplicate portions of the same media segment on the media presentation system 102 or on client devices. In other words, more than one media presentation file may link or point to the same media segment. For example, a user can user the same media segment in several media presentations, and the media presentation system 102 may only store the media segment once. As another example, multiple users may include the same media segment (e.g., a popular or trending media segment) in several different media presentations, and the media presentation system 102 may link to the same media segment in each of the several media presentations.

In an alternate embodiment, upon receiving a media segment that the media presentation system 102 identifies as corresponding to an existing media presentation, the media presentation generator 210 may create a new media presentation that creates a new content file that includes the existing media presentation content as well as the received media segment content. In this manner, each time a media segment is modified, updated, and/or removed, the media presentation generator 210 may create a new media presentation content file. Further, the media presentation generator 210 may overwrite or remove one or more previous versions of a media presentation content file when a media presentation is updated.

Additionally, the media presentation generator 210 may create both an updated media presentation file as well as an updated content file each time the media presentation generator 210 updates a media presentation with another media segment. For example, the updated media presentation file may point to the updated content file, as it is stored on the media presentation system 102. For example, the media presentation file may include a single link that points to the media presentation content file stored on the media presentation system 102.

As mentioned above, the media presentation system 102 includes a distribution manager 212. In general, the distribution manager 212 sends media presentations to users of the media presentation system 102. Once the distribution manager 212 determines to whom to distribute a media presentation, the distribution manager 212 may send the media presentation.

As described above, each media presentation may be associated with a media presentation file. The distribution manager 212 may send the media presentation file to the client device 104. In some embodiments, the distribution manager 212 may send the media presentation file in connection with one or more media segments that belong to a media presentation. For example, the distribution manager 212 may send a minimum of media segment (e.g., the first media segment, the first three media segments, all media segment, etc.) or a maximum number of media segments (e.g., no more than three media segments, no more than 20 megabytes worth of media segment) to the client device 104 when sending the media presentation file. If the distribution manager 212 is sending an updated file to the client device 104, the distribution manager 212 may include any updated media segments.

Alternatively, the distribution manager 212 may send the media presentation file without any accompanying media segments. In this case, the client device 104 may request one or more media segments when a user, via the client device 104, requests access to a media presentation (e.g., the user provides an interaction that indicates the user wants to watch a media presentation). In this manner, the distribution manager 212 may send a media presentation file or updates to a media presentation file without sending larger media segment files to the client device 104. Then when the client device 104 requests one or more media segments for a media presentation, the media presentation may send or stream the media segments to the client device 104.

To illustrate, the distribution manager 212 sends a media presentation file to client device 104 for a media presentation having a number of media segments. When a user on the client device views the media presentation and/or activates the media presentation (described below), the client device 104 may accesses the media presentation file and identify the media segments to request from the media presentation system 102. For instance, based on the media presentation file, the client device 104 may request that the distribution manager 212 send or stream the first media segment. As such, the distribution manager 212 accesses the media segments, for example, from the media presentation database 214, and provides the first media segment to the client device 104. While the user continues to watch the first media segment, the client device may, based on the media presentation file, identify a second media segment as being the next segment in the media presentation, and request the media presentation system 102 send the second media segment. Again, upon receiving the request, the distribution manager 212 may provide the second media segment to the client device 104. As such, the client device 104 may receive each media segment upon request, which may help a user preserve data transfer limits associated with the client device 104.

As mentioned above, in some example embodiments, the media presentation system 102 may create a single file for a media presentation rather than logically linking together numerous media segments. In these embodiments, when a client device 104 requests the media presentation, the distribution manager 212 may access the media presentation in the media presentation database 214 and provide the media presentation, or a portion thereof to the client device 104. Further, rather than sending the entire media presentation, the distribution manager 212 may stream relevant portions of the media presentation to the client device 104 upon the client device sending a request for the media presentation.

Additionally, or alternatively, upon the media presentation system 102 receiving a media segment from a client device that is to be added or appended an existing media presentation, the media presentation system 102 may distribute the received media segment to other client devices that currently include the media presentation. Specifically, in one or more embodiments, after the media presentation system 102 identifies the media presentation to which the received media segment corresponds, the distribution manager 212 may identify the client devices (or users associated with the client devices) that have the existing media presentation and send the media segment to the identified client devices. In addition, as described above, the media presentation system may generate instructions to append a received media segment to an existing media presentation. In this case, the distribution manager 212 may send the instructions along with the newly received media segment to the identified client devices.

Further, the distribution manager 212 can distribute media segments and/or media presentations through a variety of distribution channels. For example, in addition to distributing media presentations to users of the media presentation system 102, in some example embodiments, the distribution manager 212 can distribute media presentations to another system, such as a social networking system, a messaging application, and/or other systems or applications. For instance, the distribution manager 212 may distribute a media presentation that a user creates through a social networking system to one or more of the user's social networking connections (e.g., directly or through a plug-in that integrates the media presentation system 102 in the social networking system). In some cases, the distribution manager 212 may post a media presentation on the newsfeeds of one or more social networking users connected to the users via the social networking system. In some example embodiments, the media presentation system 102 may allows other users to compose (e.g., create a media segment or media presentation) or reply (e.g., add a media segment) to a media presentation via the social networking system.

As shown in FIG. 2 the media presentation system 102 includes a media presentation database 214. The media presentation database 214 may store media segments and/or media presentations. The media presentation database 214 can also store metadata associated with media presentations, such as the number of users that have accessed or viewed each media presentation, the creator or contributors of each media presentation, date information associated with each media presentation, authorization information, user preference information, and any other information associated with media presentations.

In addition to the media presentation database 214, and as shown in FIG. 2, the media presentation system 102 can include the user profile database 216. The media profile database 216 may store user information corresponding to each user in the media presentation system 102. The user profile database 216 may include a user profile for each user of the media presentation system 102. A user profile may include, but is not limited to, biographic information, demographic information, behavioral information, social information, or other types of descriptive information, such as work experience, educational history, hobbies or preferences, interests, affinities, and/or location information. As described above, user profile information may be linked to corresponding profile information for a user stored by a social networking system.

In addition to storing user information, the user profile database 216 may store user relationship information between users with the media presentation system 102. The user relationship information may indicate users who have similar or common work experience, group memberships, hobbies, educational history, and/or are in any way related or share common attributes. The user relationship information may also include user-defined relationships between different users and content (e.g., user defined friends, groups, etc.).

Further, the user profile database 216 may store preference setting information associated with each user. For example, the media presentation system call allow a user to set default preferences (e.g., via a user preference setting interface). Example user preference settings can relate to user-defined default sharing preferences to apply to media presentations that a user creates. In one or more embodiments, for example, a user can define default preferences to apply to media presentations based on characteristic of a co-user, such as age, or based on other characteristic or combination of characteristics of a co-user and/or the media presentation.

In addition to the above, in one or more embodiments, a user can set user preferences on a user-per-user basis. For example, a user can individually select one or more users that are authorized to append media segments to media presentations created by the user. In addition, the user can select one or more users that can view, edit, remove, and/or forward media presentations the user creates. For instance, a supervisor user (e.g., parent user) can setup or otherwise manage a junior user's preference settings (e.g., a child user) such that the supervisor user always can view media presentations created by the child user, as well as having authorization to edit, remove, or otherwise manage media presentations or media segments the junior user creates. In one or more embodiments, the supervisor user can lock the junior user's preference settings with respect to the supervisor user (e.g., with a password).

Returning to FIG. 2, the media presentation system 102 may communicate with any number of client device(s) 104. For purposes of explanation, only one client device 104 will be described, but it is understood that the principles described can be applied to a plurality of client devices associated with any number of users. As illustrated in FIG. 2, the client device 104 can include, but is not limited to, a user input detector 220, a user interface manager 222, a media segment creator 224, a media presentation manager 226, and a storage manager 228.

Each component of the client device 104 may be implemented using a computing device including at least one processor executing instructions that cause the client device 104 to perform the processes described herein. In one or more embodiments, the various components are implemented using one or more applications installed and running on the client device 104. In some embodiments, the components of the client device 104 can be implemented by a client device alone, or across multiple computing devices. Although a particular number of components are shown in FIG. 2, the client device 104 can include more components or can combine the components into fewer components (such as a single component), as may be desirable for a particular implementation.

The user input detector 220 can detect user interactions with a user interface to determine user input (e.g., detecting a touch gesture on a touch screen corresponding to an interactive element of the user interface). More specifically, the user input detector 220 can detect, identify, and/or receive user interactions and translate user interactions into a user input (e.g., a user command or request). As referred to herein, a "user interaction" means a single interaction, or combination of interactions, received from a user by way of one or more input devices. In some embodiments, the user input detector 220 can translate a combination of user interactions as a single user input and/or translate a single user interaction into multiple user inputs.

For example, the user input detector 220 can detect a user interaction from a keyboard, mouse, touch screen, or any other input device. In the event a touch screen is used as an input device, the user input detector 220 can detect one or more touch gestures (e.g., swipe gestures, tap gestures, pinch gestures, or reverse pinch gestures) that a user provides to the touch screen. In one or more embodiments, a user can provide one or more touch gestures in relation to and/or directed at one or more graphical objects, items, or elements of a user interface presented on a touch screen. The user input detector 220 may additionally, or alternatively, receive data representative of a user interaction. For example, the user input detector 220 can receive one or more user configurable parameters from a user, one or more user commands from a user, and/or any other suitable user input.

As mentioned above, client device 104 can include a user interface manager 222. In one or more embodiments, the user interface manager 222 can utilize user input and/or other data received from a user (or source simulating user input) to manage, control, and/or facilitate the use of a user interface. In general, the user interface manager 222 can facilitate the presentation (e.g., by way of a display screen associated with a client device 104) of a graphical user interface (or simply "user interface") for purposes of allowing a user to access the features and benefits of the media presentation system 102. In particular, and in response to the user input (e.g., detected by the user interface detector 220), the user interface manager 222 can allow a user to control a user interface to view, navigate, browse, search, edit, contribute to, share, re-share, and/or otherwise experience media presentations. Further, the user interface manager 222 can display graphical elements that a user interacts with in navigating media presentations in a media presentation list as well as capturing a media segment to include in a media presentation.

To illustrate, the user interface manager 222 can provide a user interface that facilitates the display of one or more media presentations and/or graphical elements on the client device 104 (e.g., on a display screen). In one or more embodiments, the user interface manager 222 can present a user interface as a user navigates within a media presentation list. Further, the user interface manager 222 can change the display of the user interface as a user scrolls through a media presentation list, by providing one or more swipe gestures to a touch screen as described above.

In one or more embodiments, the user interface manager 222 can display a thumbnail or preview of a media presentation to represent to the media presentation. For example, the user interface manager 222 can display an image (e.g., a representative frame) from a media presentation, such as the first image of media segment to represent the media presentation. Alternatively, the user interface manager 222 may display the image of the last played frame or first unplayed frame to represent the media presentation.

In some example embodiments, a user can interact with a media presentation list by providing, via a touch screen displaying a user interface, one or more vertical swipe gestures directed toward the media presentation list, as will be further discussed below with respect to below figures. In alternative embodiments, the user interface manager 222 can allow a user to navigate a media presentation list using other navigation techniques, such as flipping through media presentations (e.g., turning a graphical representation of a page with each page corresponding to a different media presentation).

In addition to allowing a user to manually navigate or browse a media presentation list, the user interface manager 222 can present a media presentation to the user. In particular, the user interface manager 222 can play a media presentation, including one or more media segments, on the display of the client device 104. As described below, the media presentation manager 226 may provide media segments and/or media presentations for the user interface manager 222 to display.

In one or more embodiments of the user interface manager 222 can cause the client device 104 to present a search interface that allows a user search for specific media presentations based on a variety of user input that may relate to characteristics of media presentations. In one or more embodiments, for example, a user can search for media presentations based on media presentation creator (e.g., a username, contact information, phone number, email address, or other identifier), media presentation content (e.g., users tagged in the presentation, topic of presentation), title of a media presentation, date associated with a media presentation, and/or any other identifiable characteristic of a media presentation. For example, the user interface manager 222 can provide a query input field, a display of suggested search terms, and/or provide a modified feed of media presentations based on resultant media presentations identified in response to the user's search query.

In addition to allowing a user to browse, search or otherwise navigate a plurality of media presentations within a media presentation list, in some example embodiments, the user interface manager 222 may present a notification to a user when a media presentation is posted or updated. The interface manager 222 may present the notification as an alert, message, banner, icon, sound, etc. Further, the interface manager 222 may only display a limited number of notifications as well as display notifications for only certain media presentations, such as for media presentations that the user is participating in, or from co-users whom the user is following, etc.

In some example embodiments, the interface manager 222 may display a live image or video currently being captured by the client device 104. For example, when a user is capturing a media segment, the interface manager 222 may display the media segment as the media segment is being captured. The interface manager 222 may also display user interface elements on the display in connecting with the user capturing a media segment.

As illustrated in FIG. 2 and as mentioned above, the client device 104 includes a media segment creator 224. In general, the media segment creator 224 assists a user in capturing or otherwise obtaining a media segment to add to a media presentation. For example, the media segment creator 224 can use the client device 104 to capture a media segment. Alternatively, the media segment creator 224 may assist a user in selecting a previously stored media segment.

To illustrate, in some example embodiments, the media segment creator 224 can use a camera and/or microphone (if present) on the client device 104 to capture an image, video, and/or audio. For instance, a user may capture a digital photo using the client device 104 or may record a video with audio using the client device 104. Further, the user can view or replay the captured media segment and choose to accept and share the media segment within a media presentation, or can delete or recapture the media segment.

Rather than capturing a new media segment, the user can use the media segment creator 224 to obtain an existing image, video, and/or audio segment to add to a media presentation. For example, the media segment creator 224 may allow a user to select a media segment stored on the user's client device. Additionally or alternatively, the media segment creator 224 may allow the user to select a media segment stored on a network device or online (e.g., a media segment accessible on cloud storage).

In some example embodiments, the media segment creator 224 can provide the ability for a user to edit and/or modify a captured video. For instance, the media segment creator 224 may allow a user to edit a captured image or video. Examples of editing include applying themes, coloring, modifying the runtime of a media segment, adding text or graphics, etc. To illustrate, the media segment creator 224 may facilitate one or more options for a user to add text to a media segment. As another illustration, the media segment creator 224 may allow a user to define the duration of a captured video, or extract a portion of a video to capture a media segment. Additional detail regarding editing a media segment or media presentation is described below in connection with FIG. 5.

Upon capturing a media segment, the media segment creator 224 may store the media segment on the client device 104 and/or on a network device or online (e.g., a media segment accessible on cloud storage). For example, the media segment creator 224 may store the media segment in the media presentation database 214, described below. Further, the media segment creator 224 may provide a copy of the media segment to the media presentation system 102, as described above.

As mentioned above, the media presentation system 102 includes a media presentation manager 226. In general, the media presentation manager 226 organizes media presentations within the media presentation list as well as organizes media segments within each media presentation. Further, the presentation manager 226 facilitates the presentation of one or more media presentations to a user in response to user input. In addition, the presentation manager 226 assists a user in managing media presentations. For example, the media presentation manager 226 can add media segments to a media presentation. Further, the media presentation manager 226 can enable the user to set conditions, permissions, and/or restrictions on media presentations. Additional detail regarding the media presentation manager 226 will now be provided.

The presentation manager 226 may organize media presentations within a media presentation list based on information received from the media presentation system 102. For example, the presentation manager 226 may arrange media presentations in the media presentation list according to recency of each media presentation, such as in a media presentation feed. To illustrate, when a new media presentation is shared with a user, or when a previously shared media presentation is updated, the presentation manager 226 may arrange the media presentation feed to display the new or updated media presentation before older media presentations. Alternatively, the presentation manager 226 may arrange or rank the media presentation list based on other criteria, such as media presentation title, creator, age of the media presentation, presentation length, contributors, number of contributors, indication as a favorite, etc. In some example embodiments, the presentation manager 226 can enable a user to define, through user preferences, how the presentation manager 226 organizes, arranges, and/or ranks the media presentation list.

In addition to organizing media presentations within a media presentation list, in some cases, the presentation manager 226 may organize media segments within a media presentation. For example, the may promote a popular media segment within a media presentation. The popularity can be based on popularity among a select group of users (e.g., friends of the user, co-users inn the same state or country as the user) or globally among all users of the media presentation system 102. Further, the presentation manager 226 may promote or prioritize a media segment that is sponsored or that advertises a product or service. In some cases, the prioritizing of the advertisement media segment may be based on the user's (or users similar to the user) interest in the product or service, as gathered from user profile information.

Further, the presentation manager 226 can also organize media segments within a media presentation. For example, the presentation manager 226 may move a media segment in a media presentation to the end of the media presentation based on the number of times a user views the media segment. For example, if a user views a media segment a threshold number of times, the presentation manager 226 may modify a media segment presentation order so that the media segment plays after other media segments in the media presentation that the user has viewed less. As another example, the presentation manager 226 may filter out a media segment from a media presentation that the user has viewed x number of times by the user. For instance, the presentation manager 226 may skip a frequently viewed media segment, or move the media segment to the end of the media presentation when the user has viewed the media segment a threshold number of times.

Further, the presentation manager 226 may update a media presentation upon receiving modifications and/or changes from either a user or the media presentation system 102. For example, if a user deletes, edits, or adds a media segment to a media presentation, the presentation manager 226 may reflect the deletion, edit, or addition to the media presentation in the media presentation list. In addition, the media presentation manager 226 can send information or data regarding the modification of the media presentation list to the media presentation system 102, and the media presentation system 102 can distribute the modification to other users. Similarly, when the media presentation system 102 sends an updated media segment to the client device 104, the presentation manager 226 may incorporate the updated media segments into corresponding media segments. Further, when the media presentation system 102 sends information to update or delete a media segment in a media presentation, the presentation manager 226 apply the modification to the media presentation.

While the presentation manager 226 generally provides a single media presentation list, in an alternate embodiment, the presentation manager 226 may provide numerous media presentation lists on the client device 104. For example, the presentation manager 226 may present a media presentation list of media presentations shared among friends and another media presentation list of media presentations shared among family members. To further illustrate, the presentation manager 226 may provide numerous media presentation lists that are arranged by category, theme, topic, creator, contributors, date created, etc.

In general, the presentation manager 226 only plays one media presentation at a time. For example, the presentation manager 226 may fully display one media presentation to the user at a time and thus plays the fully displayed media presentation. In some example embodiments, however, the presentation manager 226 may be able to display more than one media presentation to a user. In these embodiments, the presentation manager 226 may determine which media presentation(s) to play or allow the user to indicate which media presentation(s) to play.

Further, the presentation manager 226 may facilitate playing, pausing, skipping, and/or repeating, media segments, or portions of media segments, within a particular media presentation in response to user input. Specifically, in response to the media presentation system 102 detecting touch gestures, the media presentation manager 226 can provide navigational features based on the detected touch gesture. For example, if a user provides a right-to-left swipe gesture, the media presentation manager 226 can repeat the previously played media segment. As another example, if a user provides a tap gesture, the media presentation manager 226 can skip the remaining portion of the media segment currently playing and begin playing the next media segment in the media presentation. Thus, if a media presentation includes a number of media segments, the media presentation manager 226 can allow a user to quickly navigate among the media segments.

In additional example embodiments, in response to a user providing a double tap gesture, the media presentation manager 226 can pause the media presentation. In yet another example, if a user provides a left-to-right swipe gesture, the media presentation manager 226 can provide an information page regarding the current media segment or media presentation (e.g., information associated with the user that contributed a particular media segment, details of the media segment such as date created, length, etc.). The above example gestures are provided as examples only, and one or more embodiments can include the same or additional gestures associated with the same or other functionality, as described herein.

When the presentation manager 226 pauses or moves away form a media presentation due to user navigational input, the presentation manager 226 may display an image of the last played frame or next unplayed frame of the media presentation to represent the media presentation. In this manner, the user can visually see the current position of a media presentation that is not actively playing. Further, when a user navigates back to the paused media presentation, displaying an image of the last played frame or next unplayed frame of the media presentation can help the user transition back into the presentation of the media presentation as the presentation manager 226 resumes play of the media presentation.

As mentioned above, the media presentation system 102 may provide search functionality that allows a user to search or discover media presentations not currently shared with the user. For example, the presentation manager 226 may enable a user to discover popular, trending, or featured media presentations that users of the media presentation system 102 have made public. For instance, the presentation manager 226 may enable a "discover tab" that a user may select to view one or more popular, trending, or featured media presentations. In another instance, the presentation manager 226 may provide channels that allow users to discover different categories of media presentations, such as comedy, news, the arts, music, culture, etc. Further, the presentation manager 226 may allow a user to discover other media presentations by creator demographics (age, residency, nationality, topic, channel, category, recency, popularity (e.g., number of viewers), trends (e.g., within the last hour, 12 hours, 24-hours, or another specified amount of time), location, interests, etc.

In some instances, the media presentation system 102 may automatically generate discoverable media presentations. The user and/or the media presentation system 102 may specify an ephemeral or lasting discovery time period for media segments and/or media presentations, such as within the last hour, 12 hours, 24-hours, or another specified amount of time. In other instances, an administrator or editor (e.g., a human curator) associated with the media presentation system 102 or associated with a third-party (e.g., a social networking system or messaging application) may select one or more discoverable media segments and/or media presentations.

In addition to allowing users to search and discover other publicly available media presentations, in some example embodiments, the presentation manager 226 may enable a user to discover media presentations of other users of the media presentation system 102 that are in a specified proximity of the user. For example, if the user is at an event, the presentation manager 226 may allow the user to discover media presentations from other users at the event, as further described below. Further, the presentation manager 226 may enable a user to discover other users who are at, or have created a media presentation at a particular location, such as a park, school, point of interest, etc.

In one or more embodiments, the presentation manager 226 may provide a user with additional information about co-users of the media presentation system 102. For example, the presentation manager 226 may generate a list of co-users who have contributed to a media presentation, as further described below. Further, the presentation manager 226 may facilitate the user to see a list of other co-users within a media presentation. Upon selecting a co-user in a media presentation, the presentation manager 226 may present a user profile of the selected co-user to the user, as further described below.

The presentation manager 226 may also allow a user to tag as a favorite or mark media presentations or media segments within a media presentation, as further described below. For instance, the presentation manager 226 may compile a media presentation that includes media segments that the user has tagged as favorite media segments. The presentation manager 226 may enable the user to share the favorites media presentation with other users. Alternatively, the presentation manager 226 may not provide the option to a user to share the favorites media presentation with other users.

The presentation manager 226 can also allow a user to "like" individual media segments within a media presentation as well as "like" the media segment as a whole. By indicating a preference for one or more media segments within a media presentation, the creator of the media presentation can promote (e.g., move up) a well-liked media segment with a media presentation or remove a media segment altogether that receives little or no likes after a set number of views.

In addition to adding a "like" to a media segment or a media presentation, the presentation manager 226 may allow a user to preserve, or lock, a media presentation as it had been presented to the user. For example, if a user forwards a media presentation to a co-user to view the media presentation, by the time the co-user views the media presentation, the media presentation may have changed due to additional media segments being added to the media presentation. As such, in some example embodiments, the user may select particular media segments, or lock a media presentation as presented to the user, and share the selected or locked media presentation to co-users, or add the locked media presentation to their profile. In this manner, the user may provide the same media presentation to co-users without worry that the media presentation will change before the co-users have an opportunity to view the media presentation.

Along similar lines, the user may desire to view media segments within a media presentation from a set duration of time. As such, the presentation manager 226 may enable the user to filter which media segments the presentation manager 226 presents to the user. For example, the user may specify to view media segment from a media presentation that were added to the media presentation around a specific time period, such as media segments added in the last 24-hours, media segments added on January 24, or media segments added between 8:00 am on March 25 and 5:00 pm March 27.

In some example embodiments, the media presentation manager 226 may enable a user who creates or manages a media presentation to control the arrangement of media segments within the media presentation. For instance, the media presentation manager 226 may allow the user to indicate a specific presentation order for media segments in the media presentation.

In addition to a user indicating a presentation order, the media presentation manager 226 may allow a user to specify that a particular media segment be presented in a particular manner. For example, if the user includes an advertisement media segment in a media presentation, the user may specify that the advertisement media segment always be presented last in the media presentation, even when other co-users add media segments to the media presentation.

In some instances, the media presentation manager 226 may allow the user to specify if the media presentation should play media segments in a particular order, such as the media presentation playing media segments in the order in which the media segments were added, in reverse order, randomized. Additionally or alternatively, the media presentation manager 226 may enable a user who created the media presentation to instruct the media presentation manager 226 to always present specific media segments in the media presentation (e.g., the first media segment created by the user, a media segment that advertises a product, etc.), regardless of other rules and conditions imposed by the user.

Not only can a user that creates a media presentation provide preferences to the media presentation manager 226 for presenting a media presentation, a user who receives media presentations can specify viewing and presentation preferences. To illustrate, a user that receives one or more media presentations may specify to the media presentation manager 226 to play media presentations in a particular order (e.g., in the order in which the media segments were added, in reverse order, randomized). Further, the media presentation manager 226 may allow a user to specify that only media segments added in the last day, week, month, etc., be played when presenting the media presentation to the user. For instance, if a media presentation has fifty media segments, but only eight added in the last week, the media presentation manager 226 may allow the user to specify to display the last week of media segments when presenting the media presentation to the user. Similarly, the media presentation manager 226 may allow the user to request that the media presentation manager 226 only present media segments that meet a threshold number of likes from co-users (e.g., don't present any media segments that do not have over x likes after the first week and x+y likes after the second week).

In addition to enabling users to set presentation preferences, the media presentation manager 226 may provide a user with the ability to edit media presentations created or managed by the user. For example, the media presentation manager 226 may enable the user to remove one or more media segments from a media presentation. To illustrate, upon other co-users adding a media segment to a media presentation created by the user, the media presentation manager 226 can enable the user (i.e., the creator) to remove one of the media segments added by the other users. For example, the user may remove the media segment in response to viewing the segment and determining that the segment does not belong in the media presentation. Additionally or alternatively, the user may remove the segment in response to other users flagging the media segment for removal. For instance, one or more co-users may tag a media segment in the media presentation as inappropriate. In response, the user may review and remove the media segment using the media presentation manager 226.

The media presentation manager 226 may also enable a user who created a media presentation to specify which co-users can view the media presentation as well as which co-users can contribute (e.g., add a media segment) to the media presentation. More specifically, the media presentation manager 226 can enable the user to grant viewing access of the media presentation to one or more co-users. The user may grant access by selecting co-users such as individual co-users, a defined group of users (e.g., "friends," "family," "co-workers," "classmates," etc.), or the public at large to view the media presentation that the user created.

In some example embodiments, the media presentation manager 226 may provide the user a list of co-users to share a media presentation with based on the user's social networking contacts. For example, the media presentation manager 226 may interface with a social networking system to identify potential social networking users with whom the user can share a media presentation. In this manner, if a user views a media presentation that he or she likes, the user can easily share or re-share the media presentation with a preselected group of social networking contacts (g friends, family, co-workers, classmates, etc.). Further, in some instances, the media presentation manager 226 can share the media presentation via the social networking system if the user has selected one or more social networking users with which to share user-created media presentation.

In addition, the media presentation manager 226 can recommend other users with whom to share the media presentation based on a number of factors. For example, the media presentation manager 226 may recommend the user share a media presentation with co-users who are within a specified age range of the user. For example, if the user is a teenager, the authorization manager media presentation manager 226 may identify other teenagers and determine who among the identified teenagers are authorized to view the media presentation. In another embodiment, the media presentation manager 226 may identify the topic of the media presentation and recommend other users that share the same or similar topics. Further, the media presentation manager 226 may identify co-users who are proximate to the user.

Further, the user may specify that a media segment added to the media presentation satisfy a particular maturity rating level. For instance, based on the maturity rating level set by the user, the media presentation manager 226 may require that co-users post only media segments that are appropriate for all children 12 years of age and under. In another instance, the user may specify that co-users must be over 21 to view the media presentation and/or add a media segment to the media presentation. For instance, a co-user may need to authenticate (e.g., enter a password or otherwise verify themselves) before the co-user is shown the media presentation flagged with adult content.

Additionally, the media presentation manager 226 may allow a user who creates a media presentation to permit or authorize one or more co-users to edit media presentations created by the user. For example, if the user is an entity (e.g., a business, company, or corporation), the user may authorize one or more co-users to edit media presentations created by the entity, such as approving media segments that co-users want to add to the media presentation created by the entity or deleting media segments tagged as inappropriate. Additionally, the media presentation manager 226 can enable a user who has extended permission to one or more co-users to revoke permissions at any time, or to only grant authorization for a limited time (e.g., permission expires after one week, if not renewed).

In addition to allowing a user to grant co-user permission to manage media presentations the user creates, in some example embodiments, the media presentation manager 226 may provide analytics to a user regarding media segments in a media presentation. For example, the media presentation manager 226 may indicate to a user the number of co-users that have viewed a media presentation created by the user. As another example, the media presentation manager 226 may provide the user the number of times a media segment has been liked, skipped, hidden, muted, removed, and/or replayed. For instance, when a media segment has been hidden or removed a threshold number of times (e.g., over 20 times, or by 60% of co-users that have access to the media presentation, etc.), the media presentation manager 226 may suggest to the user to remove the media segment from the media presentation. The media presentation manager 226 may provide additional analytics to the user to assist the user in improving a media presentation shared with other users.

In some example embodiments, the presentation manager 226 may allow a user to report a media segment as inappropriate, as further described below. For example, a co-user may report that a media segment includes inappropriate content, such as content suitable only for adults. When a user flags a media segment as misappropriate, the presentation manager 226 may skip the media segment for the user that reported the media segment as inappropriate as well as for other co-users who have access to the media segment.

Similarly, the presentation manager 226 may also hide media segments within a media presentation that do not meet a maturity setting specified by a user, as further described below. For example, a user may indicate that he or she does not want to view any content that contains mature material above a certain rating. As such, the presentation manager 226 may automatically skip media segments that are flagged by the creator or the media segment or by other viewers of the media segment as containing mature material. The presentation manager 226 may indicate to the user that a media segment has been skipped. Alternatively, the presentation manager 226 may remove the inappropriate media segment from the media presentation presented to the user having the maturity rating enabled.

Along the same lines, the presentation manager 226 may enable a viewing user to hide a media segment from a media presentation that the user does not want to view when re-watching a media presentation. Similarly, the presentation manager 226 may enable a user to hide, or remove a media presentation altogether from the user's media presentation list. For example, the presentation manager 226 may present a media presentation that the user is not interested in viewing. In response, the user can select an option to archive, hide, and/or delete the media presentation from the user's media presentation list. The presentation manager 226 may then remove the media presentation from the user's media presentation list and not provide updates when other co-users add media segments to the removed media presentation.

FIG. 2 also illustrates a storage manager 228. The storage manager 228 may include media presentations 230 and user preferences 232. For example, the storage manager 228 may store media presentations shared with the user associated with the client device 104 as well as media presentation system created by the user. The storage manager 228 may communicate with the media presentation system 102 to send media segments, media presentations, and/or user information between the client device 104 and the media presentation system 102. For instance, the storage manager 228 may receive one or more media segments from the media presentation database 214. Similarly, the storage manager 228 may send user preferences to the user profile database 216 on the media presentation system 102.

The media presentation 102 may, in one or more embodiments, automatically create a media presentation 102 using media segments previously captured by users of the media presentation system 102. For example, multiple users may capture media segments using their respective client devices. The media presentation system 102 may then identify that one or more of the captured media segments are related, and combine the related media segments into a media presentation.

Figure 3:
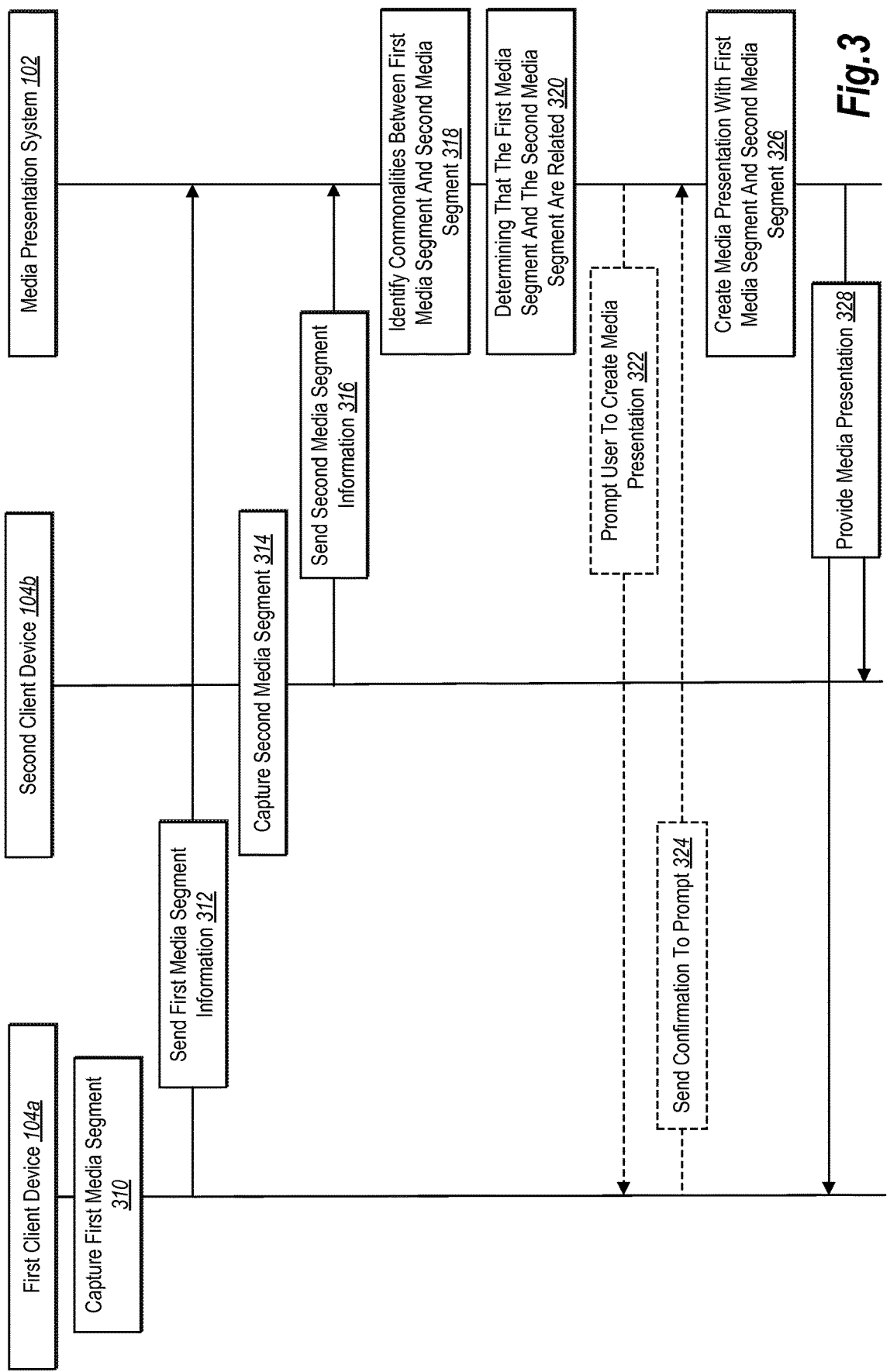
FIG. 3 illustrates a sequence-flow diagram showing multiple client devices in communication with the media presentation system in accordance with one or more embodiments.

To illustrate, FIG. 3 provides a sequence-flow diagram showing interactions between multiple client devices, such as the first client device 104a and the second client device 104b, and the media presentation system 102 in accordance with one or more embodiments. The first client device 104a and the second client device 104b may be example embodiments of the first client device 104a and the second client device 104b described with regard to FIG. 1. Further, the media presentation system 102 may correspond to the media presentation system 102 described herein.

The sequence-flow diagram may provide one example of the media presentation system 102 automatically generating a media presentation using previously captured media segments. As shown in step 310, the first client device may capture a first media segment. For example, a user using the first client device may capture a digital photo, record a video, capture an audio clip, etc. Upon capturing the first media segment, the first client device 104a may store the first media segment. The first client device 104a may store a captured media segment locally, such as in internal memory, or store the captured media segment externally, such as on a memory card or stick. Additionally or alternatively, the first client device may store a media segment remotely, such as on a cloud-based storage system. In one or more embodiments, instead of capturing the first media segment, a user can locate a previously captured media segment to use as the first media segment. For example, the first client device 104a may provide the user access to the first media segment, such as through a photo album or other application.

The first client device 104a may allow the user to associate information with the first media segment upon accessing the media segment. For example, the first client device 104a may allow the user to tag (e.g., hashtag, location tag, labels, etc.) the first media segment to indicate people, a location, an event, a topic, or other information associated with the first media segment. Further, the first client device 104a may allow the user to append annotations (e.g., description, comments, text, graphics, emojis, pictogram, etc.) to the first media segment.

In addition to a user associating information with the first media segment, the first client device 104a can derive information from the first media segment itself (e.g., auto-tag the media segment). For example, the first client device 104a may analyze the media segment to obtain additional information about the media segment, such as performing image recognition (described in additional detail below) to identify elements in the media segment, such as words, faces, objects, scenery, etc. After identifying elements in the first media segment, the first client device 104a may associate the identified elements (e.g., auto-tag people, locations, objects, words, etc.) with the first media segment. Information about the first media segment may include data about the media segment itself, such as the media segment's media type (e.g., image, video, and audio recording), size, resolution, frame rate, megapixels, creation date, modification date, tags, metadata and/or other data about the media segment.

Additionally, or in the alternative, the first client device 104a can send the first media segment itself to the media presentation system 102, and the media presentation system 102 may analyze the first media segment to obtain information with respect to the first media segment. For example, the media presentation system 102 can analyze the content of the first media segment, analyze data file attributes, and or other identifiable data or characteristics of the first media segment. In addition, as with the first client device 104a, the media presentation system 102 can associate the any information with the first media segment for later use by the media presentation system 102, as further described below.

Regardless of the source of the media segment information, the media presentation system 102 can maintain receive and/or maintain media segment information. For example, and as shown in FIG. 3, the first client device 104a may provide media segment information to the media presentation system 102. For instance, step 312 illustrates the first client device 104a sending information for the first media segment to the media presentation system 102. In one or more embodiments, only the first media segment information is sent to the media presentation system, while the first client device 104a maintains the media segment itself. Additionally, the first client device 104a can send both the first media segment and the information associated with the first media segment (e.g., within metadata of the first media segment).

Just as the user of the first client device 104a can capture a media segment, other users of the media presentation system 102 can also capture media segments. To illustrate, in step 314, another user can use the second client device 104b to capture a second media segment. In particular, a co-user using the second client device 104b may capture a second media segment. The second client device 104b may store as well as provide the user with access to the second media segment, as described above. Further, the second client device 104b may similarly collect, obtain, and send information associated with the second media segment to the media presentation system 102, as shown in step 316.

After collecting or otherwise obtaining information regarding various media segments from multiple client devices, the media presentation system 102 may compare the information associated with each of the various media segments to each other and identify potential commonalities between one or more media segments. To illustrate, step 318 shows the media presentation system 102 identifying commonalities between the first media segment and the second media segment. In particular, the media presentation system 102 may identify commonalities by comparing the information associated with the first media segment to the information associated with the second media segment to determine whether the information associated with the first media segment matches information associated with the second media segment.

In one or more embodiments, the media presentation system 102 can compare a single type of information between two or more media segments. For example, the media presentation system 102 may identify the first media segment and the second media segment were captured at the same location by comparing GPS information. As another example, the media presentation system 102 may identify if one or more annotations or tags between the first media segment and the second media segment match (e.g., both media segment share the same hashtag and/or location tag). Additionally, the media presentation system 102 may compare people (e.g., by way of tagging or recognition) in the first media segment with people in the second media segment to determine if a particular person is present in both the first media segment and the second media segment.

In addition to comparing a single type of information associated with media segments, the media presentation system 102 can compare a combination of information types to determine a commonality between the first media segment and the second media segment. For example, the media presentation system 102 can compare both GPS information as well as timestamp information to determine the first and second media segments were captured near the same location and at approximately the same time. Thus, based on the GPS information and the timestamp information matching or otherwise indicating a commonality (e.g., GPS and timestamp information that does not exactly match, but is within some threshold distance and time period, respectively), the media presentation system 102 can determine that the first media segment and the second media segment are related based on the identified commonality with the combination of information types (e.g., GPS and timestamp information).

The media presentation system 102 may also determine whether the user and the co-user (e.g., the users associated with the first and second client devices 104a and 104b) are connected via the media presentation system 102 or are otherwise socially connected (e.g., connected via a social networking system). Further, the media presentation system 102 may perform additional comparisons between the first media segment and the second media segment and/or the user and co-user of the first and second client devices to identify associations and commonalities that indicate a potential relation between the first media segment and the second media segment.

After identifying one or more commonalities between two media segments, as shown in step 320, the media presentation system 102 may make a determination whether the first media segment and the second media segment are related based on the identified commonalities. For example, the media presentation system 102 may determine that two media segments are related only upon determining that a minimum number of commonalities. For instance, the media presentation system 102 may require the identification of three (3) or more commonalities between two media segments before determining that the media segments are related. To illustrate, if the media presentation system 102 only matches GPS coordinates and time stamp information between two media segments, the media presentation system 102 may need to identify an additional commonality before determining that the two media segments are related. In such a case, for example, the media presentation system 102 may also identify that the users who captured the media segments are socially connected (e.g., on a social networking system), or need to match multiple tags (e.g., user-provided tags, hashtags, locations tags, etc.) between the two media segments before determining that the media segments are related.

In addition to determining a relation between two media segments based on a number of identified commonalities, the media presentation system 102 can also determine a relation between media segments by weighting the significance of commonality factors. For example, the media presentation system 102 can weight identified commonalities within a calculation or algorithm to determine a relationship score. Based on the relationship score, the media presentation 102 can determine if the two media presentations are related (e.g., when the relationship score exceed a defined value). In some instances, for example, the media presentation system 102 may apply different weighting to factors when determining whether two or more media segments are related. For example, the media presentation system 102 may decrease the significance of some identified commonalities, while increasing the significance of other identified commonalities. For example, the media presentation system 102 may place greater weight user-provided people tags compared to people tags based on a facial recognition analysis.

Once the media presentation system 102 determines that two media segments are related, the media presentation system 102 may optionally prompt the user, via the first client device 104a, to allow the media presentation system 102 to create a media presentation, as step 322 illustrates. In addition, or in the alternative to prompting the user, the media presentation system 102 may prompt the co-user to allow the media presentation system 102 to automatically create a media presentation based on related media segments. As part of prompting a user for approval to generate a media presentation, the media presentation system 102 may provide a preview of the media presentation to the user. For example, the media presentation system 102 may provide one or more still frame images or portions of each media segment to be included in the media presentation to the user. If the user grants approval, the user, via the first client device 104a, may send an indication of approval to the media presentation system 102 to create the media presentation, as shown in step 324.

In step 326, the media presentation system 102 may create or generate the media presentation using the first media segment and the second media segment. In some cases, the media presentation system 102 may automatically generate a media presentation based on two or more media segments that the media presentation system 102 identifies as related without first seeking user approval. For example, once the media presentation system 102 determines that a one or more media segments are related, the media presentation system 102 may generate a media presentation that includes the one or more related media segments.

After creating a media presentation that includes one or more related media segments, the media presentation system 102 can send the media presentation to the client devices associated with each of the one or more related media segments included in the media presentation (e.g., the user and the co-user associated with the first client device 104a and the second client device 104b). As shown in step 328, the media presentation system 102 may provide the media presentation to the user and co-user via the first client device 104a and the second client device 104b. The user and/or co-user may then decide to further share (e.g., re-share) the media presentation with other users, such as selected users or a preselected group of users (e.g., friends, family, neighbors, classmates, coworkers, etc.). For instance, if only the user receives the media presentation, the user may decide to share the media presentation with co-user and/or other co-users connected to the user via the media presentation system 102. In one or more embodiments, the media presentation system 102 may automatically send the media presentation to one or more other users identified in the media segments (e.g., tagged users) and/or one or more other users connected to the user and/or co-user of the first client device 104a and second client device 104b (e.g., per a user settings and preferences).

The following detailed example illustrates how the media presentation system 102 may automatically generate a media presentation based on identified related media segments. Two friends, Ellie and Clara, are going to a party on a Friday night, where they will meet up with other friends. While getting ready for the party, during the party, and after the party, Ellie and Clara take a number of pictures and videos with their mobile phones. When capturing photos and videos, Ellie and Clara often tag each other and other friends in the photos and videos. Ellie and Clara also add a hashtag to the pictures and videos, such as #Ellie&Clara. Further, other friends of Ellie and Clara also take pictures and videos at the party.

The media presentation system 102 may receive information corresponding to each picture and video that Ellie and Clara capture. Using the information, the media presentation system 102 may identify matches between many of them (match factors such as location, descriptions, tags, capture time, etc.) and determine that a number of them are related. The media presentation system 102 may also determine that pictures and videos captured by other friends at the party are related to pictures and videos taken by Ellie and/or Clara. Using a group of related pictures and videos, the media presentation system 102 may automatically create a media presentation and send the created media presentation to Ellie and/or Clara. For instance, the media presentation system 102 may send a notification to Clara that a new media presentation is in her media presentation list. The media presentation system 102 may ask or prompt Clara whether she would like to share the media presentation with Ellie and/or with other co-users, such as friends at the party.

Further, the media presentation system 102 may allow Clara to edit the media presentation before sharing it with other users. In some cases, the media presentation system 102 may give other co-users the ability to edit their own media segments included in the media presentation. As shown in this example, the media presentation system 102 may automatically generate a media presentation based on related content captured by multiple users.

As another example, Ellie and Clara may be participating in a video conversation with each other. Other friends may also join in the conversation. The media presentation system 102 may identify various related video segments from the video conversation and automatically generate a media presentation. Ellie and/or Clara may then share the media presentation with others.

Although in some cases the users may be connected and know each other, in other examples implementations, a media presentation can include media segments from user's that are not previously connected. For example, the media presentation system 102 may identify a number of users, possibly unconnected users (e.g., the users are not connected within the media presentation system 102 or within a social networking system) that are at the same location or participating in similar activities. In response, the media presentation system 102 may generate a media presentation based on related media segments captured by these users. To illustrate, a group of users of the media presentation system 102 may be spending a Sunday afternoon at Delores Park in San Francisco, Calif. Each user may capture one or more media segments. The media presentation system 102 may identify the captured media segments as being related and automatically generate a media presentation to share with the group of users at the park. One will appreciate that a variety of situations between users can cause the media presentation system 102 to automatically create media presentations based on related media segments.

Figure 4:
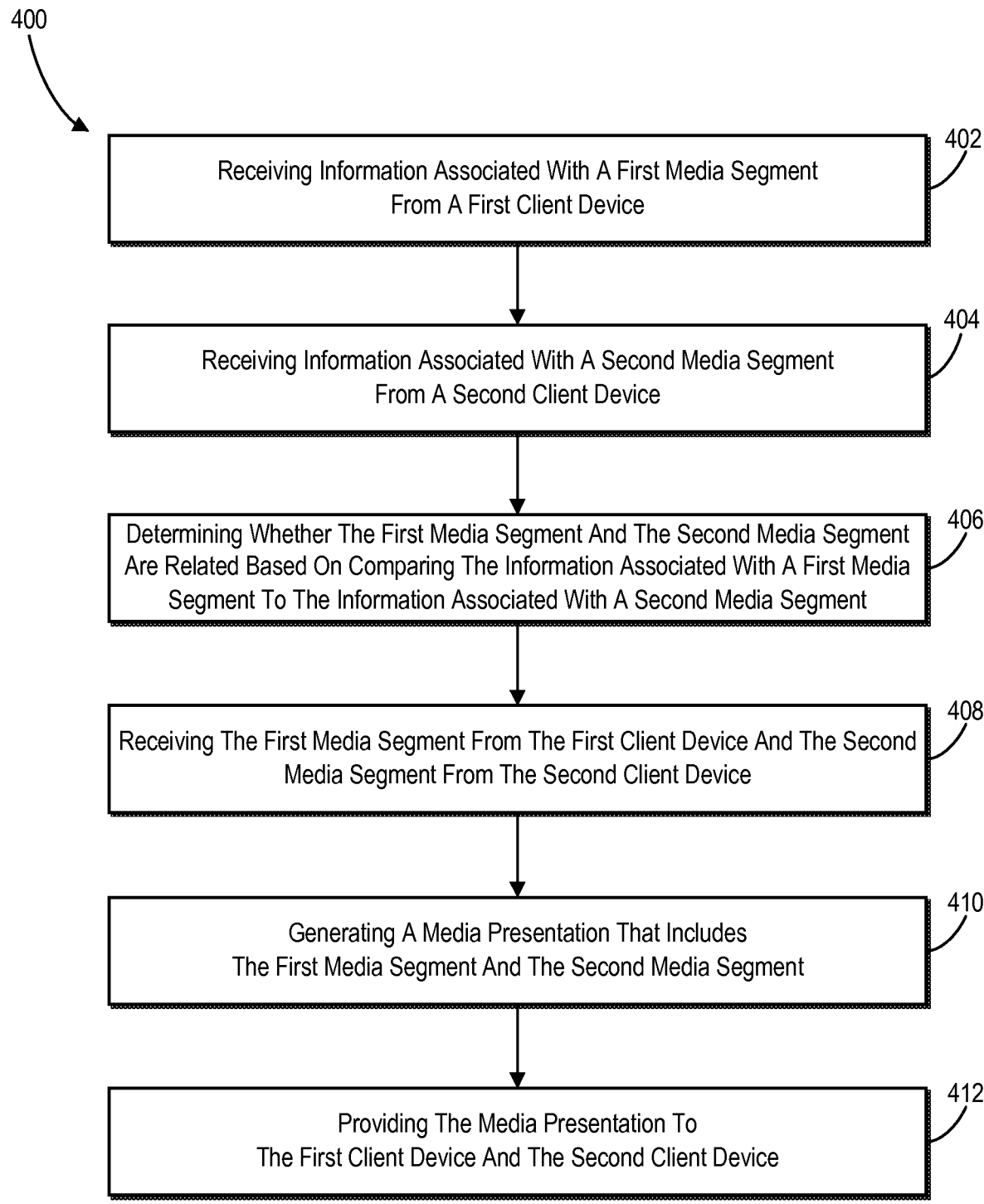
FIG. 4 illustrates a flowchart of a method for automatically creating a media presentation based on related media segments in accordance with one or more embodiments.

FIG. 4 illustrates a flowchart of a method 400 for automatically creating a media presentation based on related media segments in accordance with one or more embodiments. The method 400 includes an act 402 of receiving information associated with a first media segment from a first client device. The method 400 also includes an act 404 of receiving information associated with a second media segment from a second client device. The method 400 further includes an act 406 of determining whether the first media segment and the second media segment are related based on comparing the information associated with a first media segment to the information associated with a second media segment. In addition, the method 400 includes an act 408 of receiving the first media segment from the first client device and the second media segment from the second client device. The method 400 also includes an act 410 of generating a media presentation that includes the first media segment and the second media segment. Further, the method 400 includes the act 412 of providing the media presentation to the first client device and the second client device.

Figure 5:
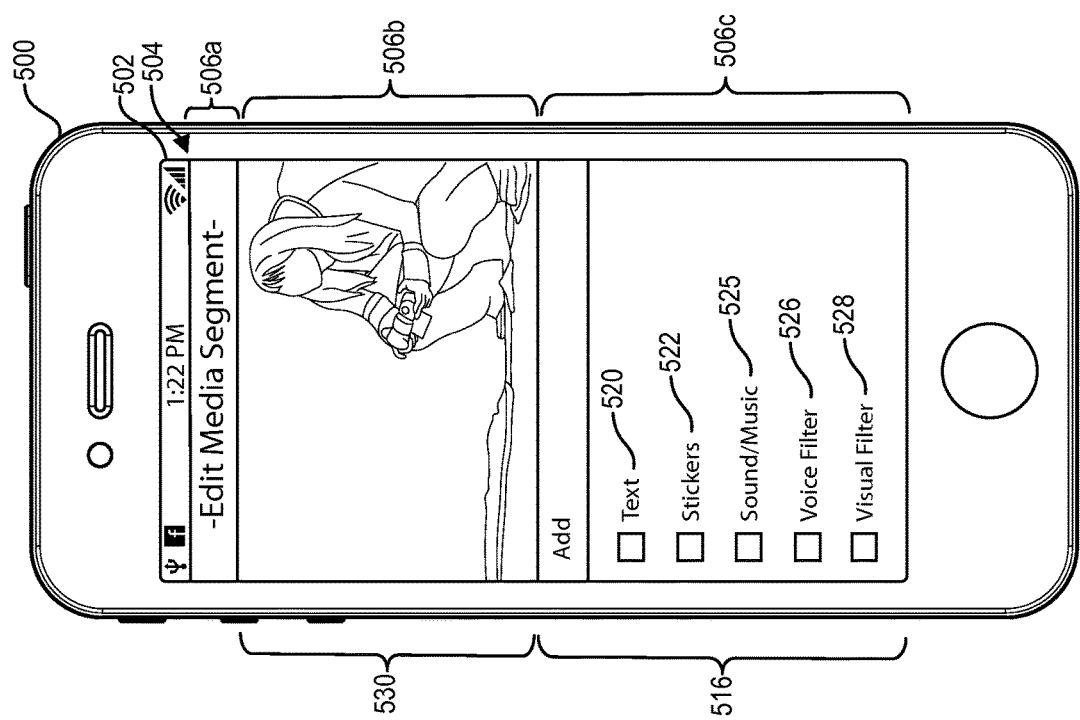
FIG. 5 illustrates an exemplary graphical user interface showing an example media presentation in accordance with one or more embodiments.

With reference now to FIG. 5, and as briefly mentioned above, the media presentation system 102 may allow a user to edit a media segment (e.g., a captured media segment prior to inclusion in a media presentation, a user's media segment in a media presentation, or another user's media segment in a media presentation based on receiving authorization from the other user). To illustrate, FIG. 5 shows a client device 500 that can present a graphical user interface 502 (or "GUI 502") by way of a touch screen 504. In some instances, the GUI 502 can be a graphical user interface for a mobile application. For example, the client device 500 can execute an application that facilitates interactions with the media presentation system 102 described in connection with FIG. 1.

Further, the client device 500 illustrated in FIG. 5 may be an example embodiment of the first client device 104a or the second client device 104b described in connection with FIG. 1. For example, the user 110 may use the client device 500 to interact with the media presentation system 102 via a mobile media presentation or social networking application. Further, while the computing device of FIG. 5 illustrates a mobile device, one will appreciate that a media presentation application may be executed on other types of computing devices, such as the computing and client devices described below in connection with FIGS. 24-25.

The GUI 502 may include one or more graphical user interface areas that display content to a user. As shown in FIG. 5, the GUI 502 may include a first graphical user interface area 506a (or "first area 506a"), a second graphical user interface area 506b (or "second area 506b"), and a third graphical user interface area 506c (or "third area 506c"). It should be noted that the client device 500 may include any number of graphical user interface areas. In addition, the first area 506a, second area 506b, and the third area 506c may move each within the GUI 502 and, in some cases, move out of the GUI 502. For example, a user may scroll or navigate within the GUI 502 to view more of the third area 506c, which in turn moves the first area 506a beyond the visible area of the GUI 502). As another example, the client device 500 may only display the one or two graphical user interface areas at one time.

As shown in FIG. 5, the client device 500 may enable to the user to edit a media segment. In general, the client device 500 and/or the media presentation system 102 may provide one or more editing tools for a user to perform edits on a media segment. It should be noted that while FIG. 5 describes the client device 500 providing editing functionality to a user, the media presentation system 102, independent of, or in connection with the client device 500 can provide editing functionality to a user.

As illustrated in FIG. 5, the client device 500 may display, in the first area 506a, a header that indicates to the user that the client device 500 is in editing mode. For example, as shown in FIG. 5, the first area 506a displays the text "Edit Media Segment." In some embodiments, the first area 506a may include various headers that provide a user with navigational functionality. For instance, the first area 506a may indicate different menus, modes, settings, or screen views as described herein. Alternatively, in some embodiments, the client device 500 does not include a first graphical user interface area that provides a user with header information, rather the first graphical user interface area can include content that relates to media segments and media presentations.

As further illustrated in FIG. 5, the second area 506b of the client device 500 displays a media segment 530. For example, the media segment 530 may be an image segment and/or a video segment. Below the media segment 530, the client device may display editing options 516 in the third area 506c. The client device 500 may present editing options 516 to a user to assist the user in editing one or more media segments.

The editing options 516 may include a variety of options to a user to edit a media segment. For example, as illustrated in FIG. 5, the editing options 516 may include options to add various editing effects such as text, stickers, sound/music, voice filters, and visual filters, which are discussed below. It should be appreciated that the editing options 516 may include other options, such as cropping, reducing redeye, resizing, rotating, trimming, retouching, etc. Further, each editing option 520-526 in FIG. 5 may include additional options that allow a user to refine the editing effect. Upon a user selecting an initial editing option, for example, the client device 500 may display additional editing options related to the initial selected editing option (e.g., in the third area 506c).

As further illustrated in FIG. 5, the client device can present various editing options 516 to the user. For example, the text option 520 may allow a user to add text to a media segment. For example, a user may add text over a portion or a media segment, such as adding a title, a comment, or other words and/or textual graphics to a media segment. In addition, the text option 520 may allow a user to add a text slide to a portion of a media segment. For example, the text option 520 may allow a user to insert a text slide before, during, or after a media segment.

In addition to the text option 520, the sticker option 522 may allow a user to add one or more stickers to a media segment. Stickers include ideograms, smileys, pictographs, and other images. Stickers may also include frames or boarders around a media segment, or other graphics that visually interact with content within a media segment. Further, stickers may include custom images and graphics created by users. In some instances, a user may purchase stickers from a store, library, or sticker repository. For example, a user may buy an individual sticker, or buy a package of stickers as an in-app purchase.

In one or more embodiments, when a user the sticker option 522, the client device 500 may provide a number of stickers from which to choose. After selecting a sticker, the client device 500 may provide options to the user to adjust the size of the sticker, the position of the sticker on the media segment, etc. Further, the client device 500 may automatically detect a location for a sticker and/or change the position of a sticker within a media segment. For instance, if the sticker is a hat that is placed on a user's head, the client device 500 may reposition the hat to remain atop the user's head as the position of the user changes within a media segment (e.g., a video media segment).

In some example embodiments, the client device 500 may suggest stickers to add based content within the media segment 530 (e.g., detected through image recognition) and or based on meta-data associated with the media segment (e.g., location, time, tags, etc.). For example, the client device 500 may detect that the media segment is related to a particular theme (e.g., ocean, mountains, party). To illustrate, the client device 500 may recognize (e.g., through image recognition) two people in the media segment (e.g., a couple), as well as recognize that the media segment shows the couple on their wedding day. Upon the user selecting the sticker option 522, the client device 500 may recommend a sticker of a heart-shaped frame to place around the couple.

In addition to the sticker option 522, the sound/music option 524 may allow a user to add audio to a media segment. When a user selects the sound/music option 524, the client device 500 may provide the user with a numbers of sounds or audio segments from which to choose. Further, the client device 500 may provide the user with an interface to select another audio segment, such as selecting a song stored on the client device 500, dialog, or sound effects (e.g., background noise, traffic, nature sounds, etc.). Further, the client device 500 can allow the user to capture sound using the client device 500, such as enabling the user to add a voice over to a media segment.

The voice filter option 526 may provide the user with the ability to change audio attributes of the audio within a media segment. More specifically, the filter option 526 may allow a user to change the pitch, tone, speed, reverberation, flanging, etc. of audio within a media segment. For example, a user may apply a voice filter that causes a speaker in a media segment to sound like he or she has inhaled helium or has a sore throat. As another example, applying a voice filter may cause a voice audio to sound like a particular celebrity, a child, a robot, a musical instrument, a witch, a chipmunk, etc.

In addition to the voice filter option 526, the client device 500 can provide a visual filter option 528, as illustrated in FIG. 5. For example, the visual filter option 528 may include options to change to color, brightness, contrast, hue, shading, blur, lighting, texture, etc. of a media segment. For instance, upon selecting the visual filter option, 528, the client device 500 may assist the user in applying a visual filter, such as changing the media segment, or a portion thereof, to black and white. In some example embodiments, the client device 500 may suggest visual filters to apply based content within the media segment 530 (e.g., detected through image recognition) and or based on meta-data associated with the media segment (e.g., location, time, tags, etc.).

One will appreciate that the client device 500 may assist the user in applying a variety of visual filters, as well as other editing options, to a media segment.

With many of the editing options, the client device 500 can also allow the user to specify the duration of the editing effect, such as how long to display a text slide on the media segment. In addition, the client device 500 may allow a user to apply editing effects to multiple media segments. For instance, the client device 500 may allow a user to add a text overlay (e.g., annotations) or a song that spans multiple media segments. Further, the client device 500 may provide a user with a preview as the user tentatively selects different edition options. The preview of the edited media segment may appear in the second area 540b. For example, if the user adds a text overlay to the media segment 530, the text may appear on the media segment 530 in the first area 540a.

Figure 6:
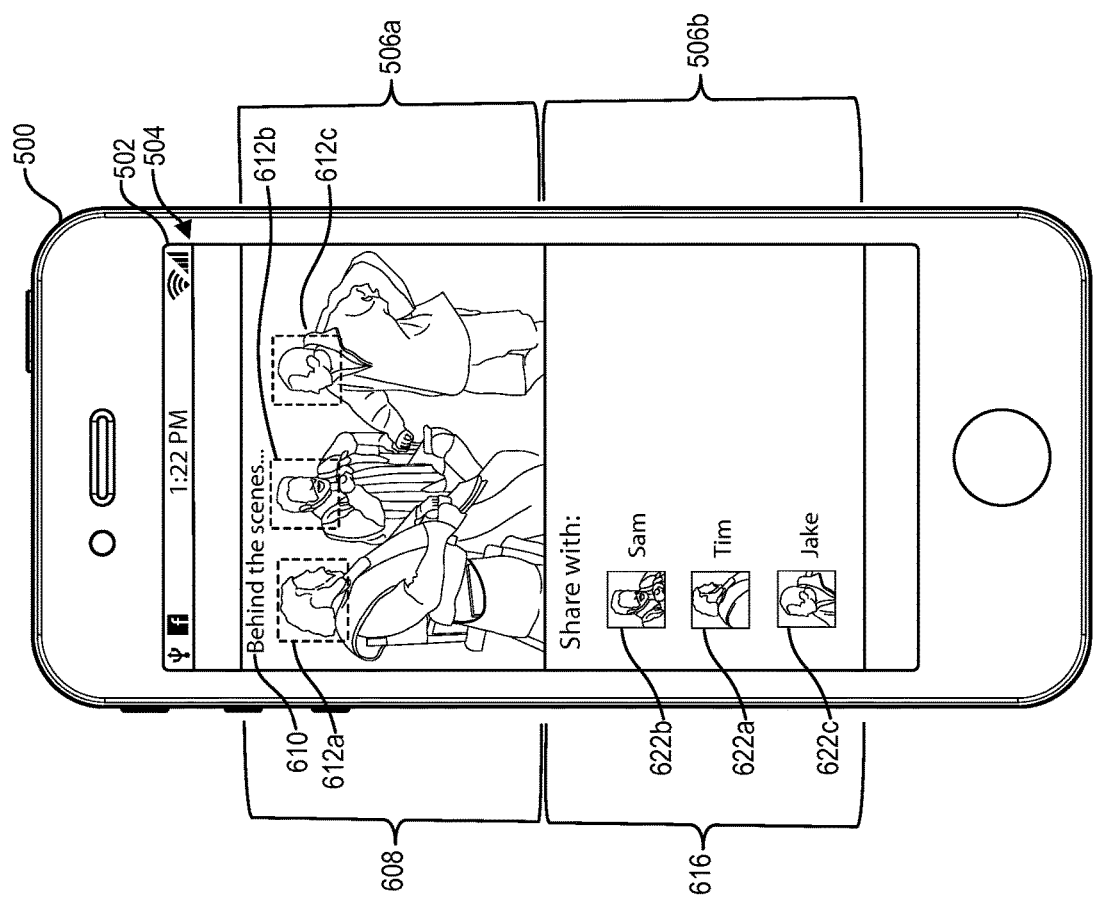
FIG. 6 illustrates an exemplary graphical user interface of an example process of applying facial recognition to a media presentation in accordance with one or more embodiments.

In addition to editing media segments, one or more embodiments of media presentation system can perform an image recognition analysis to identify various content elements within a media segment in the process of creating a media presentation. For example, the client device 500 and/or the media presentation system 102 may perform image recognition to identify elements in a media segment, such as words, faces, objects, etc. To illustrate by way of example, FIG. 6 shows the client device 500 applying facial recognition to a media segment 608. While FIG. 6 describes the client device 500 performing facial recognition, one will appreciate that the client device 500 may recognize other objects, such as animals, landmarks, symbols, etc., as well as recognize characters and words using optical character recognition (OCR).

Further, while FIG. 6 illustrates a client device 500 to detect elements in a media segment, the media presentation system 102 may also detect elements in a media segment. To illustrate, the client device 500 and the media presentation system 102 may work in tandem to identify elements in a media segment. For example, the client device 500 may identify one or more faces in a media segment, send an image of the one or more faces to the media presentation system 102. The media presentation system 102 may compare the one or more faces to a database of known faces and return the identity of the one or more faces to the client device 500. Alternatively, the client device 500 may send a media segment to the media presentation system 102 to have the media presentation system 102 perform element recognition on the media segment.

As shown in FIG. 6, a media segment may be presented on the client device 500. The client device 500 displayed in FIG. 6 may be one embodiment of the client device 500 illustrated in FIG. 5. As such, the client device 500 may include a GUI 502 that displays various views by way of the touch screen 504. Further, the GUI 502 shown in FIG. 6 may include the first area 506*a* and the second area 506*b*, as described above.

The first graphical user interface area 506*a* may include a media presentation 608 that includes one or more media segments. For example, as shown in FIG. 6, one or the media segments in the media presentation 608 may include a video or picture of a director (Jake) talking to two actors (Sam and Tim) on a film set for a medieval-type movie. The client device 500 may use facial recognition to detect the faces of Sam 612*a*, Tim 612*b*, and Jake 612*c* in the media presentation 608.

Based on the people and/or objects recognized in a media presentation, the client device 500 may recommend, to a user operating the client device 500, co-users with whom the user should share the media presentation. For example, as shown in FIG. 6, the client device 500 may display one or more sharing options 616 in the second area 506*b*. The sharing options 616 may display a list of co-users corresponding to people recognized in the media presentation 608. For instance, the client device 500 may display sharing options 616 that recommend the user share the media presentation 608 with Sam 622*a*, Tim 622*b*, and/or Jake 622*c*.

If the client device 500 recognizes an object in the media presentation 608, the media presentation system 102 may, in some embodiments, recommend that the user share the media presentation 608 with a co-user or a group of co-users that associate with the object. For example, the client device 500 may recognize a football team's logo and/or a football player's jersey in a media presentation. In response, the client device 500 may recommend that a user share the media presentation with a co-user that associates with the football team, or a group dedicated to the football team.

In providing the recommendations with whom to share a media presentation, the client device 500 may limit the scope of which co-users to recommend based on a user's connections. For example, the client device 500 may limit recommendations to co-users and/or groups to whom the user is connected via the media presentation system 102 or otherwise socially connected (e.g., connected via a social networking system). Further, the client device 500 may recommend that the user share the media segment with users connected one or more co-users identified in the media segment. Similarly, the client device 500 may also determine co-users with whom to share a media presentation based on the people and/or objects recognized in a media presentation. For example, if the client device 500 recognizes a celebrity, the client device 500 may recommend that the user share the media presentation with a group associated with the celebrity.

In addition to providing recommendations based on elements recognized in a media presentation, in some example embodiments, the client device 500 may use recognition of people and/or objects to organize a media presentation within a user's media presentation list. For example, if the client device 500 recognizes a sports star in a media presentation for which a user has indicated a preference (e.g., likes), the client device 500 may prioritize the media presentation that includes the sports star in the user's media presentation list. Similarly, the client device 500 may use recognized elements to organize a media segment within a media presentation. For instance, after recognizing the sports star in a media segment within a media presentation, the media presentation system 102 may prioritize the media segment within the media presentation, such as to the beginning of the media presentation.

In another example, the client device 500 may group similar media segments together in a media presentation based on commonly identified elements. For example, the client device 500 may identify a common object in multiple media segments within a media presentation, and group those media segments together in the media presentation. As another example, the client device 500 may group all media segments within a media presentation together that include the user of the client device 500.

In a similar manner, the client device 500 may recognize common elements from media segments across a user's media presentation list and generate a new media presentation to include the common element. For example, the user may have several media presentations in their media presentation list. Around half of the media presentations may have one or more media segments that include a friend of the user. The client device 500 may recognize the friend in each of the media presentations and organize the media segments that include the friend into a new media presentation.

Figure 7:
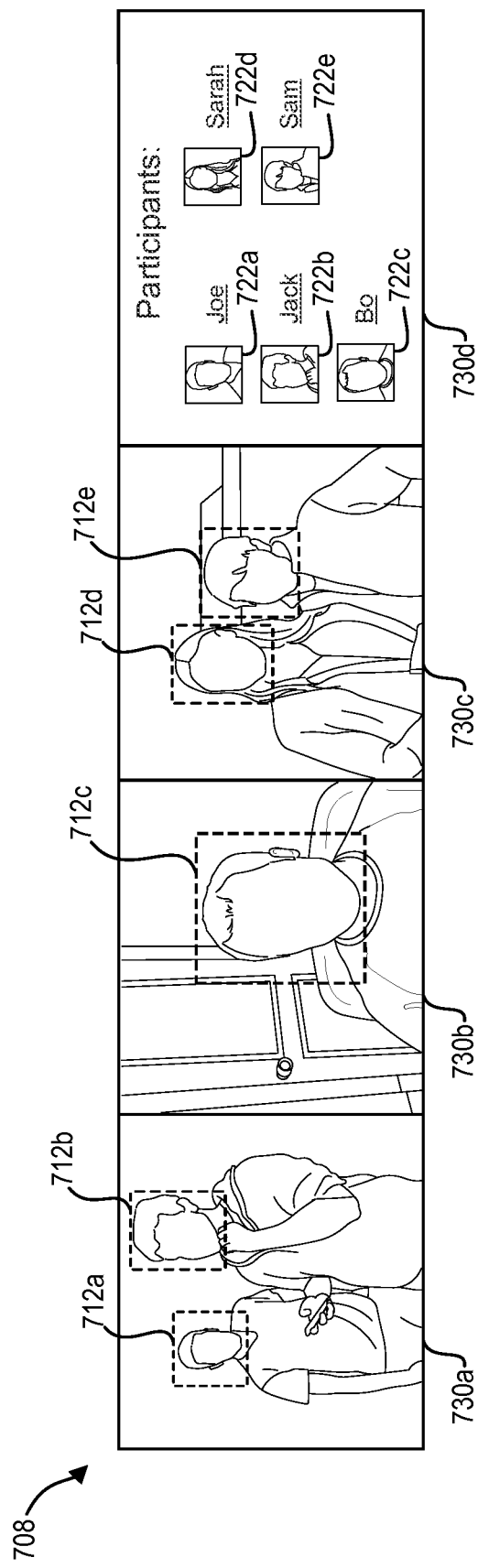
FIG. 7 illustrates a media presentation that includes a list of participant in accordance with one or more embodiments.

In addition to the above examples, a client device may use facial recognition to generate a media segment to add to a media presentation that lists the identified participants in a media presentation. To illustrate, FIG. 7 displays a media presentation 708 that includes at least (3) three media segments 730*a-c*. The first media segment 730*a* shows two people talking (Joe and Jack), where one person is talking on his phone (Jack). The second media segment 730*b* shows a person (Bo) sitting in a chair. The third media segment 703*c* shows a mother (Sarah) and a child (Sam) standing near each other.

A client device and/or the media presentation system 102 may recognize faces in each of the first three media segments. For instance, the client device and/or the media presentation system 102 may recognize the faces of Joe 712*a* and Jack 712*b* in the first media segment 703*a*, the face of Bo 722*c* in the second media segment 703*b*, and the faces of Sarah 722*d* and Sam 722*e* in third media segment 730*c*.

Based on detecting the faces of Joe 712*a*, Jack 712*b*, Bo 722*c*, Sarah 722*d*, and Sam 722*e* in the media presentation 708, the client device and/or media presentation system 102 may generate a fourth media segment 730*d* that lists all the participates identified in the media presentation 708. For example, the fourth media segment 730*d* may show a listing displaying an image and name for each of Joe 712*a*, Jack 712*b*, Bo 722*c*, Sarah 722*d*, and Sam 722*e*. In addition, the fourth media segment 730*d* may include participates who are tagged by a user or co-user as being a participant in the media segment 708.

The client device and/or media presentation system 102 can append the fourth media segment 730d to the media presentation 708. In this manner, the client device may display the fourth media segment 730d showing participants in the media presentation 708 at the end of the media presentation 708. Alternatively, a client device may display the list of participants separate from the first three media segments in the media presentation 708. For example, the client device may show the first three media segments in a first graphical user interface area while displaying the fourth media segment of participants in a second graphical user interface area.

The fourth media segment 730d may be interactive. In other words, a user may be able to select the picture or name of a participant in the fourth media segment 730d. Upon selecting a participant's picture or name, the client device may replay a media segment that includes the participant. In some cases, the fourth media segment 730d may display, in addition to a participant's name or image, an option for the user to replay a segment(s) that includes the particular participant. For example, a user may select a replay option associated with Bo 722c, and in response, the client device may replay the second media segment 730b that includes Bo. Alternatively, upon a user selecting a participant's picture or name, the client device 730d may provide the user with a profile of a participant, described in additional detail below.

While the fourth media segment 730d can present one or more participants identified or tagged in a media presentation, the fourth media segment 730d may also omit one or more participants despite identifying the participants. Participants may be omitted for a number of reasons. For instance, Sam 722e may be omitted because Sam's parent has set a user preference to exclude Sam from participant lists or because Sam is below a minimum required age. Similarly, Jack 722b may be omitted from the participant list because he has set his privacy settings that block him from being included in a participant list (or blocked in a participant list if the user is not one of his connections). Bo 722c may be omitted because he is not a user of the media presentation system 102. Alternatively, Bo may be listed, but selecting Bo's name or picture does not link to his user profile or other information about himself because he is not a user of the media presentation system 102.

As another example, Joe 722a may not be listed in the participant list because the client device and/or media presentation system could not recognize Joe and because another user did not tag Joe. Alternatively, rather than not listing Joe, the client device could show Joe's face 712a in the participant's list. Then, if another user recognizes and tags Joe, the client device can list Joe's name by his picture.

Figure 8:
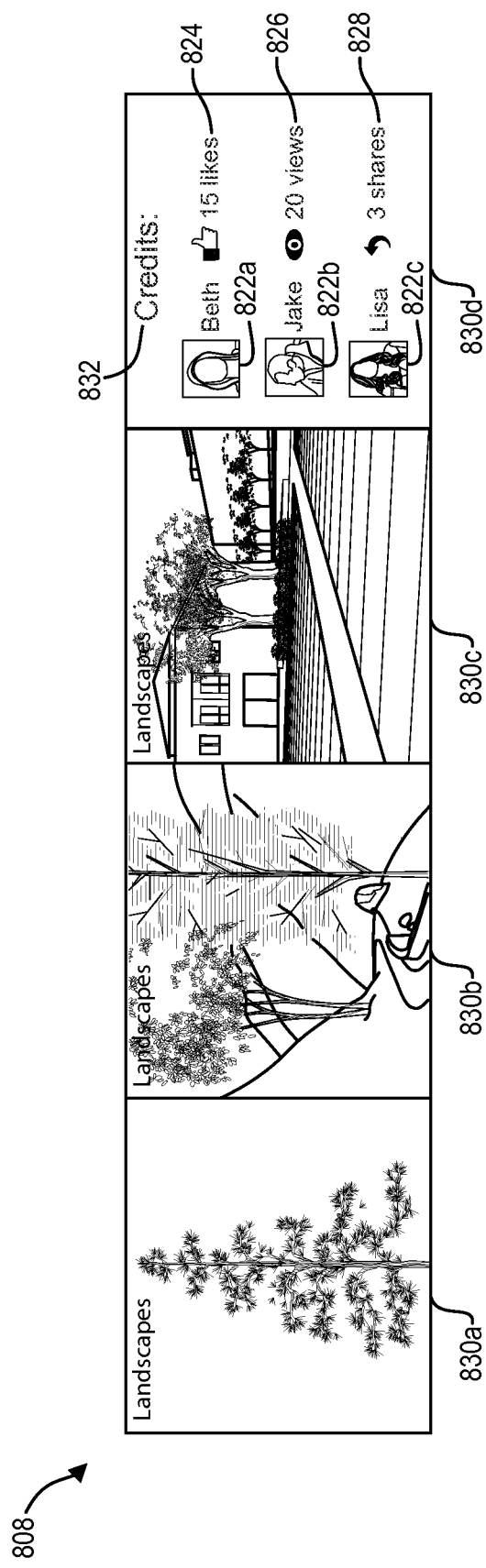
FIG. 8 illustrates a media presentation that includes a credits media segment in accordance with one or more embodiments.

In a similar manner to a client device displaying a participant list, the client device may additionally, or in the alternative, display a credits list appended to or in connection with a media presentation. To illustrate, FIG. 8 illustrates a media presentation 808, which includes at least (3) media segments 830a-c and credits 832 (shown as part of the fourth media segment 830d in FIG. 8). In general, the credits 832 can display users who contributed a media segment to a media presentation. For instance, the credits 832 can display a user's name next to a corresponding picture displayed next to their name. Further, the credits 832 can display a thumbnail (e.g., an image or clip) of the media segment provided by the user.

A client device may display the credits 832 at the end of a media presentation. For example, as shown in FIG. 8, the credits 832 are included in a fourth media segment 830d appended to the end of the media presentation 808. After a client device plays through the first three media segments 830a-c, the client device may present the user with the credits 832. The client device may pause on the credits 832 for a set amount of time (e.g., 5 seconds, 10 seconds, 20 seconds, 2 seconds per name displayed, 3 seconds per media segment included in the media presentation, etc.) or may display the credits until the user provides navigational input (e.g., replay media segment advance to the next media segment, or return to the media presentation list.)

Additionally or alternatively, the client device may provide the credits in a separate graphical user interface area from the media presentation 808. For example, the client device may present the media presentation 808 in a first graphical user interface area and display the credits in a second graphical user interface area. Thus, in some cases, the client device may provide a media segment and credits corresponding to the media presentation at the same time. Further, the client device may initially hide or truncate the credits, and later provide the credits to a user upon the user selecting a graphical option within the graphical user interface of the client device to display or expand the credits.

Additionally, the credits 832 may appear as an image segment or a video segment. For instance, the credits 832 may appear as image segment (e.g., a slide) that displays contributing users in the media presentation, as shown in FIG. 8. In some cases, the credits may include multiple images (e.g., appear as multiple slides), and/or be navigable (e.g., scrollable) by a user on a client device. Alternatively, the credits 832 may appear as a video segment that scrolls through a list of contributing users to a media presentation. Whether the credits appear as an image segment or a video segment may depend on a number of factors, such as the number of media segments in the media presentation or the number of contributing users. Further, the credit may appear as a combination of image and video segments, such as a video segment that presents a list of contributing users, followed by an image segment that provides the option to replay the media presentation or share the media presentation with other co-users.

As mentioned above, the credits 832 may include a list of users that contributed to a media segment. To illustrate, FIG. 8 shows Beth 822a, Jake 822b, and Lisa 822c. More specifically, FIG. 8 displays images and name of Beth 822a, Jake 822b, and Lisa 822c. While not illustrated, the credits 832 may also display a thumbnail (e.g., an image or clip) of the media segment(s) contributed by each user. For example, the credits 832 may display an image extracted from the media segment, a portion of the media segment (e.g., 3-seconds from the media segment or a number of still images taken from the media segment), or the media segment itself within the credits next to the contributing users (e.g., a thumbnail-sized version of the media segment). Further, rather that displaying the image of each contributing user, the credits 832 may display the thumbnails of each media segment in a media presentation.

The credits 832 may list users in an order that corresponds to the order that media segments were presented in the media presentation. For example, when a client device presents the first media segment 830a first (added by Beth 722a), the second media segment 830b (added by Jake 722b), and then the third media segment 830c (added by Lisa 722c), the credits would list the contributors ordered as Beth 722a, Jake 722b, and Lisa 722c. Ordering the credits 832 based on media segment order may assist a viewer watching a media presentation to connect which media segment was provided by which user.

In another example embodiment, the credits 832 may present the order of contributing users in another manner. For example, the credits 832 may list contributing users alphabetically by first name, last name, or username. As another example, the credits 832 may list users based on the number of media segments a user contributed to a media presentation. For example, the credits may list Beth 722*a* first because she contributed three media segment, while Jake 722*b* and Lisa 772*c* provided only one or two media segment to a media presentation. In another example, the credits 832 may list Beth 722*a* first because she was the initiator of the media presentation. One will appreciate that a number of methods, or combinations thereof, may be employed to order contributing users within the credits 832.

When ordering the credits based on when a media segment is presented in a media presentation, displaying a thumbnail of each media segment instead of a user's picture may more intuitive to a viewing user because the credits appear to be a story board of the media presentation that also provide information about each media segment's contributor (e.g., name and possibly picture). In some instances, however, a user could be listed multiple times if the user contributes several media segments to a media presentation. In these instances, the credits 832 may group media segment thumbnails together in order of first appearance, or in some other order, such as by the initiator of the media presentation and/or number of media segments provided by each user.

Further, the credits 832 may provide information and/or statistics for a media presentation. For instance, the credits 832 may provide the ability for a user viewing a media presentation to see the number of likes 824, views 826, and shares 828 for a media presentation. For example, as shown in FIG. 8, the media presentation 808 may have 15 likes, 20 views, and 3 shares. In addition, the credits 832 may provide information and/or statistics for individual media segment within a media presentation. As an example, upon a user selecting Lisa 822*c*, the credits 832 may display the number of likes, views, and shares for the media segment provided by Lisa. As another example, the credits 832 may provide information and/or statistics next to each contributing user displayed in the credits 832.

In connection with displaying the number of likes, views, and shares for a media segment or the media presentation, the credits 832 may provide a user with the ability to like, share, comment on a media segment or the media presentation, mark a media segment as a favorite, report a media segment as inappropriate, leave a message to the co-user that provided a particular media segment, etc. For example, after watching a media presentation, the credits 832 may provide a user with the ability to indicate that he or she likes the media presentation as a whole and/or likes one or more particular media segments from within the media presentation. In addition, by selecting a co-user in the credits 832, a user can send the selected co-user a message.

As another example, a media presentation may include twelve (12) media segments and a user may desire to share four (4) of the twelve (12) media segments with a co-user. Using the credits 832, the user may select the four (4) media segments to share, and the media presentation system 102 can share the selected media segments as a new media presentation to other co-users. As a note, sharing selected media segments may be dependent on permissions set by the co-users who posted the selected media segments and/or their relation to the user.

In addition to displaying contributing users, the credits 832 may also provide options that allow a user to further interact with media segments within the media presentation. For example, the credits 832 may provide a user with the option to replay a particular segment from within the media presentation. To illustrate, the credits 832 may display a contributing user and/or a thumbnail of a media segment provided by the contributing user. Upon a user selecting the contributing user and/or thumbnail from the credits 832, the client device may replay the media segment. For instance, if a user taps and holds a thumbnail via the touch screen of a client device, the client device may replay the media segment as long as the user is holding the touch screen. In another instance, a client device may present the media segment to the user along with controls that allows the user to pause the media segment, replay the media segment, or return to the credits 832.

Further, in some example embodiments, the credits 832 may provide options that allow a user to interact with contributing users. To illustrate, the credits 832 may display the names and images of contributing users, such as Beth 822*a*, Jake 822*b*, and Lisa 822*c*, as shown in FIG. 8. Upon selecting one of the users (e.g., selecting their picture and/or name), the credits 832 may link to the co-users' profile. In other words, upon selecting a contributing user's name or picture, a client device may display a user's profile information. The client device may display the user's profile information in place of the credits, or in addition to the credits, such as in a separate graphical user interface area.

Whether the client device displays a user's profile information in place of or in addition to the credits may depend on the capabilities of the client device (e.g., screen size, processing power, network connection speed, etc.) and/or user preference. For example, if the client device is a monitor or television, the client device may display graphical user interface areas that include media segments from a media presentation, credits from the media presentation, as well as a user's profile of a contributing user, all within the display. Alternatively, if the client device is a smaller mobile display, the client device may display only one or two graphical user interface areas on the display.

In addition to displaying a list of contributing users, the credits 832 may include users that have been tagged or recognized in the media presentation (e.g., participants). For example, for each media segment, the credits 832 can include a listing of which users participated in the media segment. In some example embodiments, the credits may include a slide for each media segment where each slide includes information about the media segment, such as the user that provided the media segment, any users tagged/included in the media segment, and statistics for the media segment (e.g., likes, views, shares, etc.).

Figure 9:
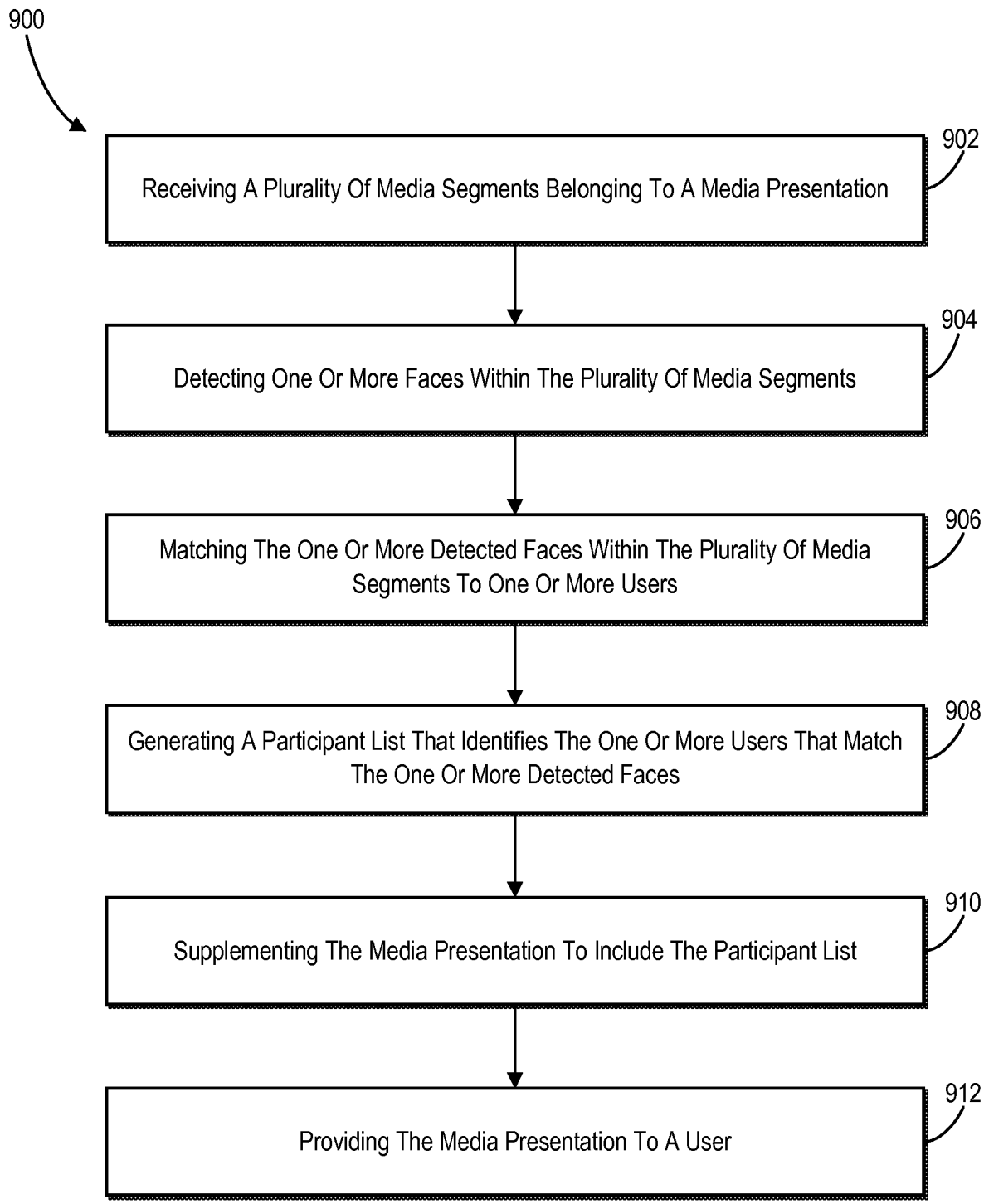
FIG. 9 illustrates a flowchart of a method for generating a participant list in accordance with one or more embodiments.

FIG. 9 illustrates a flowchart of a method 900 for generating a participant list in accordance with one or more embodiments. The method 900 includes an act 902 receiving a plurality of media segments belonging to a media presentation. The method 900 also includes an act 908 of detecting one or more faces within the plurality of media segments. The method 900 further includes an act 906 of matching the one or more detected faces within the plurality of media segments to one or more users. In addition, the method 900 includes an act 908 of generating a participant list that identifies the one or more users that match the one or more detected faces. The method 900 also includes an act 910 of supplementing the media presentation to include the participant list. Further, the method 900 includes the act 912 of providing the media presentation to a user.

Figure 10B:
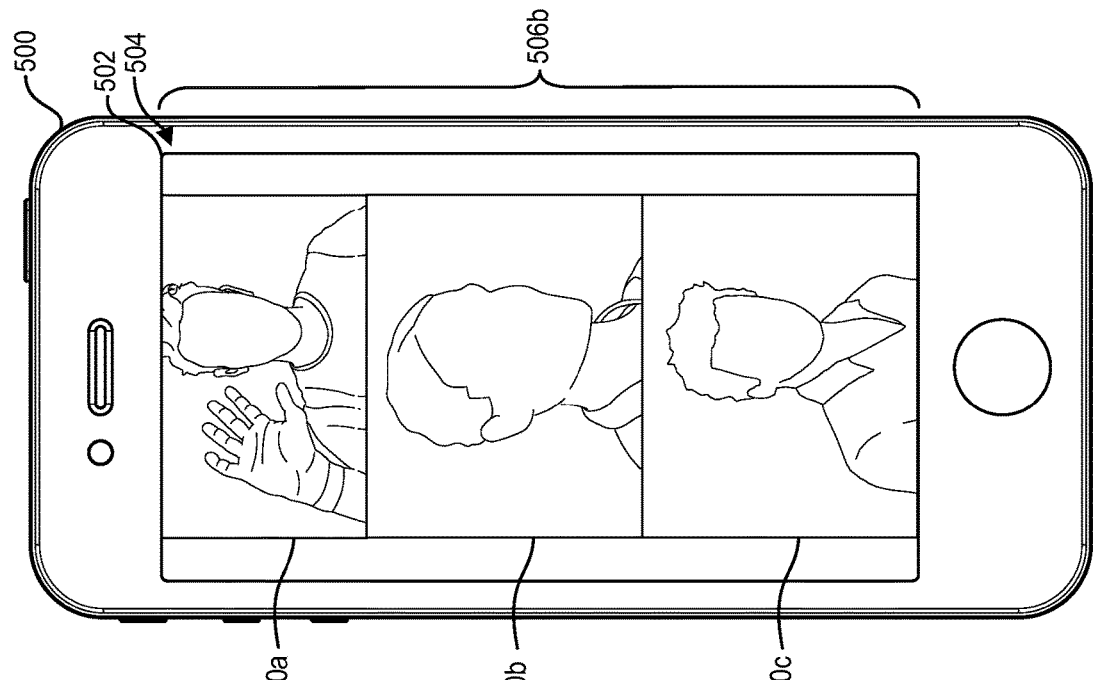
FIGS. 10A-10B illustrate exemplary graphical user interfaces showing a user profile in accordance with one or more embodiments.
Figure 10A:
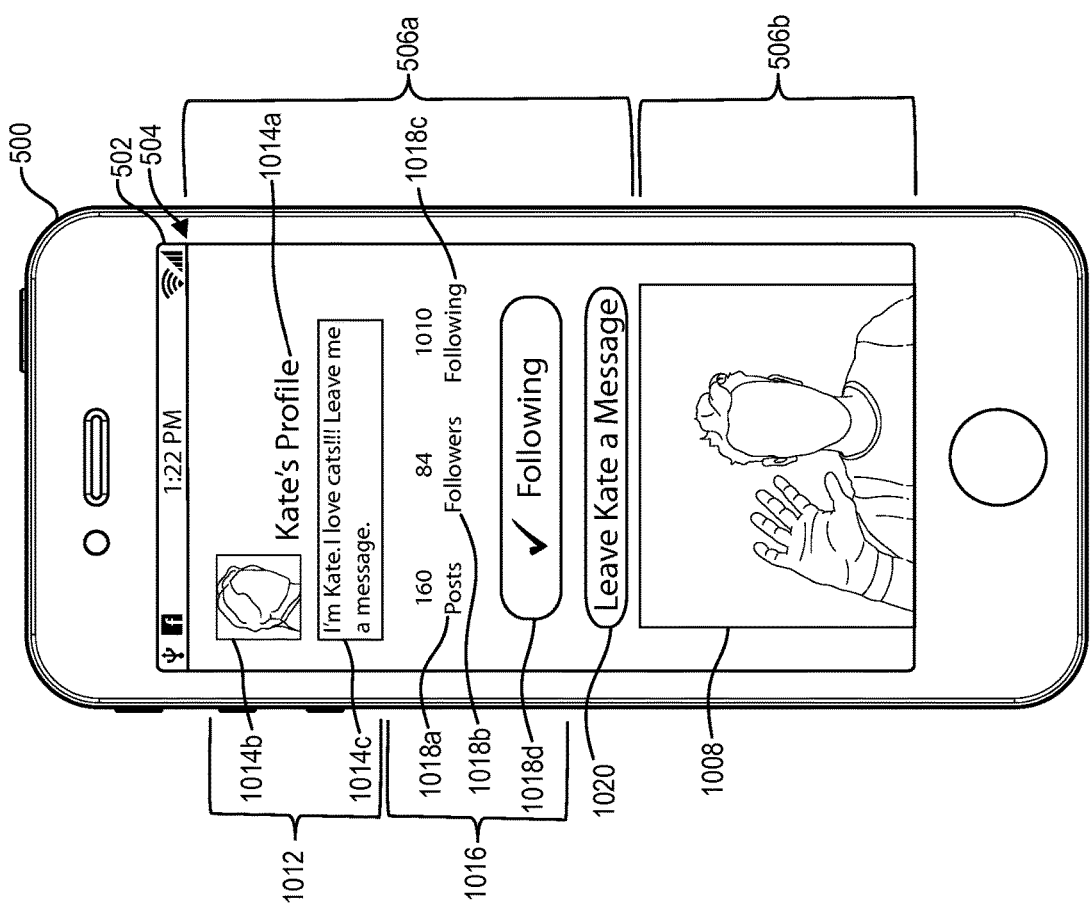

As mentioned above, users of the media presentation system 102 can have user profiles with the media presentation system 102. To illustrate, FIGS. 10A-B show an example user profile displayed on a client device 500 in accordance with one or more embodiments (FIG. 10B is an extension of FIG. 10A, such as if a user scrolls down). The client device 500 displayed in FIGS. 10A-B may be one embodiment of the client device 500 illustrated in FIG. 5. As such, the client device 500 may include a GUI 502 that displays various views by way of the touch screen 504. Further, the client device may include the first area 506a and the second area 506b described above.

In particular, FIGS. 10A-B show the user profile of a user with the name Kate. As illustrated in FIG. 10A, the client device 500 may display, in a first area 506a, a header area 1012 that provides information about Kate. For example, the header area 1012 may display Kate's name 1014a (or a username, nickname, etc.) along with a picture 1014b of Kate. The header area 1012 may also include a message area 1014c, where Kate can leave messages for co-users viewing her user profile. The message area 1014c may display text, graphics (e.g., emojis), and/or website links provided by Kate. The message area 1014c may also include one or more media segments that Kate leaves for viewers of her profile page. Further, the header area 1012 may additionally include other information, such as contact information for Kate.

The first area 506a may also include social information 1016 associated with the user. Examples of social information 1016 include the number of posts 1018a (e.g., media segments) Kate has provided, the number of Kate's followers 1018b, as well as the number of users that Kate is following 1018c. Further, the social information 1016 may include a selectable follow option 1018d to follow or unfollow Kate. As shown in FIG. 10A, the user viewing Kate's profile is currently following Kate and selecting the selectable following option would cause the use to unfollow Kate. The social information 1018 may also include a listing of other social networking systems to which Kate belongs.

In addition, the first area 506a may include one or more other selectable graphical elements. For example, FIG. 10A illustrates a media message option 1020 that a user can select to leave Kate a message (e.g., in the form of an image media segment or video media segment). Upon selecting the media message option 1020, the client device 500 may allow a user to leave a media segment message for Kate. For example, the client device 500 may allow the user to capture a digital photo, record a video, and/or leave an audio message for Kate.

Depending on a user's (e.g., Kate) privacy settings and/or preferences, a co-user may not be able to leave a message for the user. For instance, a co-user that is not directly connected, or only remotely connected to Kate may not be able to select the media message option. Further, depending on the type of connection a co-user has with Kate, the co-user may be limited in the type of message (e.g., audio, picture, or video message), the length of the message, or the number of messages the co-user is able to leave.

As an example of co-users leaving messages for a user, when a user has a birthday, co-users can access the user's profile and leave a birthday message for the user. The birthday messages may be viewable to other users or may be limited such that only the user may view the message. Further, the client device 500 may prioritize birthday messages based on factors such as, when the message was left, connections between co-users that leave messages and the user, if the user has previously viewed the message, if the user has liked or favored a message, etc.

When a user leaves a message, the client device 500 may display the message in the second area 506b (shown in both FIGS. 10A-B) as part of a media presentation. For example, when a user leaves a message (e.g., a message segments) for Kate, the client device 500 displays the message within the media presentation 1008. When Kate accesses her user profile, she may be able to view the media presentation 1008 of message left for her by co-users. For example, Kate may be able to view messages 1030a-d (shown in FIG. 10B) left for her by other co-users. When multiple messages are available, the client device 500 may present the messages in single presentation (e.g., individually playing through each message). In an alternative embodiment, the client device 500 may display the multiple messages in a vertical or horizontal grouping. Further, the client device 500 may display thumbnails or previews of each message, and when a user selects a thumbnail, the client device 500 may expand and play the message.

While a co-user who leaves a message on a user's profile (e.g., Kate's profile) is generally able to view messages that they themselves leave for the user (e.g., to replay, recapture, accept, etc.), in some cases the co-user may be able to view messages that other co-users have left for the user (e.g., view other messages left for Kate). The co-user's ability to access messages that other co-users have left for another user may be dependent on a number of factors. For example, when another co-user leaves a message, the other co-user may indicate that other co-users are allowed to view the message (e.g., all users able to view Kate's user profile can view the message). In some cases, a co-user leaving a message for Kate may allow co-users to view the message depending on if the other co-users are directly connected to Kate (e.g., followers of Kate and/or people Kate is following). As another example, a message that a co-user leaves for Kate may not be accessible to other co-users unless Kate allows the other co-users to access the message. In some cases, both the creator of the message and Kate both need to approve granting co-users access to the message before other co-users are granted access to a message left by the co-user.

In some alternative embodiments, the media presentation 1008 may include media segments that the user (e.g., Kate) has posted on the media presentation system 102. For example, the media segments 1030a-c may include media segments that Kate added to one or more media presentations. In this manner, a co-user viewing Kate's user profile may be able to access and play one or more media segment 1030a-c added by Kate.

When a client device 500 provides a media presentation that includes media segments provided by a user (e.g., Kate), the client device 500 may limit a co-user's access to one or more of the media segments within the media presentation based on a number of factors. For example, the client device 500 may limit a co-user's access based on: whether the co-user is directly or tangentially connected to Kate; Kate's privacy settings; whether Kate has indicated that a particular media segment should or should not be accessible by other co-users; and/or whether the co-user is in a media segment included in the media presentation. To illustrate, Kate may allow "close friends" to view all media segments, allow family members to view all media segment that include any family members, and allow the public to only access a select number of media segments designated as public.

Further, when a client device 500 provides a media presentation that includes media segments provided by a user (e.g., Kate), the client device 500 may display the media segments in a consolidated manner (e.g., merge all the media segments into a seemingly single media presentation) or display each media segment independently. As described above, the client device 500 may present media segment within a user's profile in a vertical or horizontal layout or arrangement. Further, the client device 500 may display thumbnails of the media segment that expand and play upon selection (or not play depending on Kate's permissions and preferences).

Further, the client device 500 may organize media segments added by the user (e.g., Kate) in a number of ways. For example, the client device 500 may organize the media segments chronologically, by topic and tags, or by people within each media segment. To illustrate, for each co-user viewing Kate's profile, the client device 500 may intelligently sort media segments to first display media segments that include the particular co-user viewing Kate's profile, followed next by media segments that include friends of the particular co-user viewing Kate's profile, followed by media segments that include Kate, followed by other media segments provided by Kate. In this manner, the client device 500 can provide a unique experience to each co-user who views Kate's user profile.

Just as users of the media presentation system 102 can have user profiles, a company or business can similarly create a company profile. To illustrate, FIGS. 11A-B show an example company profile displayed on a client device 500 in accordance with one or more embodiments (FIG. 11B is an extension of FIG. 11A, such as if a user scrolls down on the client device 500). In particular, FIGS. 11A-B show a company profile for Solitude Camping. The client device 500 displayed in FIGS. 11A-B may be one embodiment of the client device 500 illustrated in FIG. 5. As such, the client device 500 may include a GUI 502 that displays various views by way of the touch screen 504. Further, the GUI may include the first area 506*a* and the second area 506*b*, described above.

As illustrated in FIG. 11A, the client device 500 may display, in the first area 506*a*, a header area 1112 that provides information about Solitude Camping. For example, the header 1114 may display a picture 1114*b*, image, or logo of a company along the company's name 1114*a* (i.e., Solitude Camping). The header area 1112 may also include a message left by the company, such as a brief statement introducing the company, the company's motto or mission statement, a message about recent events or promotions, etc. In addition, the header area 1112 may include other information, such as contact information for the company (e.g., address, website, phone number, email, etc.).

The client device 500 may also display social information 1116 associated with the company in the first area 506*a*. Social information 1116 may include an overall rating 1118*a* for the company, as provided by users of the media presentation system 102 (or obtained from multiple sources). As FIG. 11A illustrates, Solitude Camping has a rating of 4.5 stars out of 5 stars, based on feedback from 500+ users. Social information 1116 may also include an indication of a company's social footprint and presence. For instance, as shown in FIG. 11A, the social information 1116 includes the total number of users 1118*b* that "like" or follow Solitude Camping. Social information 1116 may also include other social information associated with a company, such as social networking systems to which the company belongs.

In addition to displaying social information 1116, the client device 500 may allow a user visiting the company profile to provide social feedback for a company. For example, the client device 500 may enable a user to rate Solitude Camping. To illustrate, a user may provide his or her rating of Solitude Camping to the company profile by selecting a corresponding number of the stars that represents the user's opinion of Solitude Camping. As another example, a user may user the client device 500 to like or follow Solitude Camping, thus adding to Solitude Camping's social footprint and presence.

In addition to displaying a header area 1112 and social information 1116, the client device 500 may display reviews, comments, and/or testimonials provided by users of the media presentation system 102 in the first area 506*a*. For example, a user viewing a company's user profile may select the message option 1120 labeled "Add Review." In response, the client device 500 may assist the user in capturing a media segment. In some cases, a user may leave a message about the company in general. In other cases, a user may leave a message regarding a product or service offered by the company.

In some example embodiments, before a user can leave a media segment review for a company, the user may need to provide additional input regarding the nature of the review. For instance, the user may need to specify whether the review is a general review, a review for a product, or a review for a service offered by the company. Further, when possible, the user may provide information to further help the media presentation system 102 categorize a media segment review. For example, the user may identify the exact product for which the user is providing a review.

As shown in FIGS. 11A-B, the client device 500 may display a plurality of media segment reviews 1130*a-c* (or collectively "media segment reviews 1130") as part of the company profile. The media segment reviews 1130 may be part of a media presentation, or may be independent of a media presentation. The media segment reviews 1130 may be reviews left by users. Additionally, the media segment reviews 1130 may include review directed towards products and/or services offered by Solitude Camping. For example, the client device 500 may display a media segment review for a 3-person tent (e.g., media segment 1130*a*) or a lantern (media segment 1130*c*).

The client device 500 may provide the media segment reviews 1130 in a variety of ways. For example, the client device 500 may provide individual messages organized in a horizontal and/or vertical manner, as shown in FIG. 11B. For instance, the client device 500 may display a group of messages, such as messages 1130*a-d*, in a vertical layout. A user may scroll up and down in the second area 506*b* to view different media segment reviews 1130 left by users. Further, the client device 500 may provide thumbnails or previews of each media segment reviews 1130, as described above in connection with a user's profile. Each thumbnail may show a representative image signaling to a user what a media segment review is about. When a user selects a thumbnail, the client device 500 may expand and play the select media segment review.

The client device 500 may organize the media segment reviews 1130 based on a number of factors. For example, the client device 500 may present the most recent media segment reviews 1130 first. As an additional example, the client device 500 may organize the media segment reviews 1130 based on category. For instance, the client device 500 may separate general reviews from product and service reviews. The client device 500 may further organize the product and service reviews (e.g., in a hierarchy manner) for example, based on product department, product category, product type, and products themselves.

In some example embodiments, the client device 500 may not initially display the media segment reviews 1130. Rather, the client device 500 may list various categories or groupings, which may be broad, narrow, or hierarchal. Upon selecting a listing, the client device 500 may display one or more media segment reviews 1130 that are associated with the listing. For example, upon selecting a listing of "Tent Reviews," the client device 500 may present a user with the media segment review 1130a.

A company's profile may be accessible to the public. Further, a company may have limited rights in restricting which users can access their profile, view media segment reviews 1130, or leave the reviews on the company's profile. Accordingly, most users of the media presentation system 102 can access the company's profile, view media segment reviews 1130 displayed on the company's profile, and even leave a media segment review. In this manner, company profiles may be different from a user profile in that a company has little control over user access while a user has much greater control over user access.

The media presentation system 102 may keep or promote media segment reviews 1130 that are found helpful, and remove media segment reviews 1130 that are inappropriate and/or unhelpful. In some example embodiments, the media presentation system 102 may determine to remove a media segment review when a threshold negative feedback level is satisfied. For example, when a number of users indicate dissatisfaction with a media segment review, the media presentation system 102 may remove the review. Similarly, when a threshold number of users like or find a media segment review helpful, the media presentation system 102 may promote the media segment review, such as by prominently displaying the media segment review on the company's profile.

Just as users of the media presentation system 102 can endorse or report a media segment review, the company can also endorse or report a media segment review. For example, a company may endorse a user's media segment review, such as when a user leaves a positive or useful review. In addition, the company may report a media segment review as inappropriate, offensive, distasteful, and/or unhelpful. While a company may be able to endorse or report a media segment review, however, the company itself may be unable to edit or modify the media segment reviews 1130. In some example embodiments, the media presentation system 102 may provide additional weight to a company's negative rating of a message (e.g., count as multiple votes) when determining whether to remove a media segment review as unhelpful or inappropriate.

Alternatively, in some embodiments, a company may be able to monitor and remove media segment reviews that the company finds inappropriate or unhelpful from the company's profile. Similarly, the company may promote media segment reviews on the company's profile that the company finds helpful to other users. In some cases, a company may not be able to promote or remove a media segment review until a condition has first been met, such as a period of time has passed since the media segment review was posted or a threshold number of ratings where left for a media segment review.

Besides displaying a media presentation or media segment reviews on a company's profile, the client device 500 may also display one or more additional media presentations and/or media segments on the company's profile. For example, the client device 400 may display a media presentation that includes promotional media segments provided by the company. As another example, the media presentation system 102 may identify media segments on the media presentation system 102 that identify the company (e.g., a user tags the company or the media presentation system 102 detects the company in the media segment). In response, the media presentation system 102 may add the media segment to a media presentation on the company's profile.

While FIGS. 11A-B illustrate a company profile shown on the media presentation system 102, in some example embodiments, the media presentation system 102 may provide one or more of the media presentations described above to a social networking system. For example, the media presentation system 102 may provide one or more media segment reviews to a social networking system for the social networking system to include on a social networking page associated with the company.

Additionally, in some embodiments, the company's profile in the media presentation system 102 and a social networking system may communicate with each other, such as to share company information with each other. For example, information about the company, as well as the company rating may be based in part from information and ratings listed on the company's social networking page. Further, in some example embodiments, the social networking system may allow customers of the company to leave review messages (e.g., review media segment) for a company via the social networking system.

As described in connection with FIG. 11 below, the media presentation system 102 may assist a user in automatically generating a media presentation. For instance, the media presentation system 102 may allow a user to generate a media presentation that includes media segments captured by multiple users at an event or common location. As an example, a user and other co-users may be at an event, such as a concert, wedding, school party, dinner event, etc., and the user may want to create a media presentation for the event and allow co-users at the event to contribute to the media presentation. The user may want to create a media presentation for the event, but the user may not be connected to other co-users at the event. Accordingly, the media presentation system 102 may allow the user in connecting with other co-users at the event, and thereby, create an event media presentation.

To illustrate, FIG. 12 displays a sequence-flow diagram showing interactions between a user, co-users, and the media presentation system 102 to generate an event media presentation. The sequence-flow diagram may provide one example of the media presentation system 102 assisting a user in generating a media presentation, as will be described below. The user 110, co-user 112, and the media presentation system 102 may examples of the user 110, co-users 112, and the media presentation system 102 described above with regard to FIG. 1.

In step 1210, the user 110 may send a request to the media presentation system 102 to initiate the creation of an event media presentation. For instance, the user 110 may use a client device to signal to the media presentation system 102 that the user 110 is at an event and that the user 110 would like to initiate a media presentation. In another instance, after recognizing that the user 110 is at an event, the media presentation system 102 may prompt the user 110 to initiate a media presentation with other co-users 112 also at the event. For example, the media presentation system 102 may send a message to the user 110 saying, "I notice you are at a concert. Would you like to create a media presentation for this event?"

Alternatively, the user 110 may start a media presentation, associate the media presentation with an event, and allow others at the event to add to the media presentation. For example, the user 110 may be at a graduation ceremony and capture a media segment at a graduation ceremony as part of a media presentation. The user 110 can tag the media presentation as belonging to the graduation ceremony. Further, the user 110 can set permission on the media presentation such that other users at the graduation ceremony are invited to add media segments to the media presentation, as described below.

In step 1212, the media presentation system 102 may determine if other users (e.g., co-users 112) are at the same event as the user. For example, the media presentation system 102 may identify users at the same location as the user. Additionally, the media presentation system 102 may communicate with the social networking system to determine that other users are also at the event.

In determining whether co-users 112 are at the same event as the user, the media presentation system 102 may determine if the user 110 is located at a specific venue, such as a concert hall, stadium, college campus, friend's house, outdoor event, office building, a park, auditorium, etc. (e.g., based on GPS information associated with the user's 120 device). Based on this information, the media presentation can determine if one or more co-users 112 are within a threshold proximity range of the user. The threshold proximity range may increase or decrease depending on the size of the venue. Alternately, or in the case that the media presentation system 102 cannot determine the event venue, the media presentation system 102 may determine if co-users 112 are within a default proximity range of a user 110 (e.g., 20 feet, 50 feet, 100 feet, 50 yards, 100 yards, etc.)

In step 1214, the media presentation system 102 may notify co-users 112 at the event that the user 110 has invited them to contribute to an event media presentation. For example, after determining which co-users 112 are at the event and/or proximate to the user, the media presentation system 102 may send an invitation to the identified co-users 112 at the event. The invitation may invite the identified co-user 112 to view and contribute to an event presentation initiated by the user.

In some embodiments, the user 110 may specify co-users 112 to which the media presentation system 102 should send the invitation. For example, after the media presentation system 102 determines which co-users 112 are at the same event as the user, the media presentation system 102 may present a list of co-users 112 to the user. The user 110 may select one or more co-users 112 from the list for the media presentation system 102 to invite. Alternatively or in addition, the user 110 may manually select co-users 112 to receive the invitation. For example, the user 110 may access a list indicating co-users 112 who are attending the event (e.g., co-users 112 who checked-in to the event or otherwise indicated their attendance, such as via a social networking system). As another example, the user 110 may select users from a contacts list.

In other embodiments, the media presentation system 102 may determine the co-users 112 that should receive an invitation. For example, the media presentation system 102 may send the invitation to all co-users 112 at the event, to a set number of co-users 112 closest to the user, to a random selection of co-users 112 at the event, to co-users 112 that shares similar demographics as the user 110 (e.g., similar ages), to co-users 112 that are tangentially connected to the user 110 (e.g., closeness to the user), to co-users 112 that regularly capture media segments, to notable co-users 112, etc. For instance, the media presentation system 102 may send the invitation to users who are positioned at different locations of an event such that the event media presentation will include media segments captured from a host of different perspectives and angles. One will appreciate that the media presentation system 102 may determine other methods for selecting which users to which to send the invitation.

In step 1216, one or more co-users 112 who receive an invitation can capture a media segment at the event. For example, a co-user 112 can use his or her client device to record a video clip or capture a digital photo. Upon capturing a media segment, the co-users 112 may share/send (e.g., via their client devices) the media segments to the media presentation system 102, shown in step 1218. For example, a client device associated with a co-user 112 may send the media segment to the media presentation system 102 and the media presentation system 102 can store the media segment in a database. The client device may also send a file to the media presentation system 102 that includes metadata about the media segment. For instance, the file can indicate that the media segment is associated with the event media presentation initiated by the user.

In some embodiments, the media presentation system 102 may check the media segment to verify that it corresponds to the event. For example, the media presentation system 102 may verify that the time and/or location of the media segment correspond to the location and time of the event. In alternative embodiments, the media presentation system 102 may allow co-users 112 to provide media segments regardless of when and where the media segments were captured. For example, a user 110 at a friend's party may request that co-users 112 provide media segments taken at the party as well as any media segments that feature their friend, regardless of when and where the media segments where captured.

After receiving one or more media segments from the user 110 and co-users 112 at the event, the media presentation system 102 can generate a media presentation for the event, as step 1220 illustrates. The media presentation system 102 can generate the event media presentation by organizing and linking the received media segments from the user 110 and co-users 112. As one example, the media presentation system 102 may organize and arrange the media segments in the event media presentation based on chronological order of when the media segments were captured. As another example, the media presentation system 102 may organize and arrange the media segments in the media presentation using another metric, such as the length of each media segment, the relationship between of the user and the co-user that captured a media segment, or even randomly.

In step 1222, the media presentation system 102 may optionally allow the user 110 to approve/edit media segments submitted from the co-users 112. For example, the user 110 may indicate (e.g., approve/disapprove) whether one or more media segments should be included in the media presentation. In some cases, the media presentation system 102 may automatically approve select media segments added to the media presentation, such as media segment from friends of the user 110 or users whom the user 110 has previously approved. Further, in allowing the user 110 to edit the media presentation, the media presentation system 102 may allow the user 110 to delete one or more media segments as well as reorder the media segments within the media presentation. The user 110 may also edit the media presentation as described above.

The media presentation system 102 may share the event media presentation with the user 110 and co-users 112 at the event, as shown in step 1224. The media presentation system 102 may share the event media presentation with co-users 112 who contributed to the media presentation as well as other co-user 112 who are present at the event who have not yet contributed. Further, the media presentation system 102 may preserve the event media presentation such that the users and co-users can access the media presentation, even after the event is over.

In some instances, the media presentation system 102 may allow the user 110 and/or co-users 112 to share the media presentation with other users of the media presentation system 102. For instance, the user 110 may share the media presentation with friends not at the event, even while other co-users at the event are still contributing to the event media presentation. In another instance, a co-user 112 may post the event media presentation on a social networking system and allow his or her friends to view, comment, and contribute to the media presentation.

In some embodiments, the event media presentation may be a foundation media presentation that spawns into various different media presentation system. For example, a user 110 shares the event media presentation with co-users that were not at the event after the event is over. When sharing the event media presentation, the media presentation system 102 may create a copy or version of the event media presentation to share between the user and co-users. Accordingly, the user and co-user can add media segments to and personalize the spawned version of the event media presentation. Other groups of users may user the event media presentation to spawn separate media presentations that include media segments that are also a part of the original event media presentation. In this manner, the media presentation system 102 may allow the event media presentation to serve a starting point for the user 110 and co-users 112 to create their own media presentation among their own set of friends and connections.

In some additional or alternative embodiments, the media presentation system 102 may obtain media segments already captured for an event. In other words, after the user 110 extends an invitation, or requests to initiate an event media presentation, the media presentation system 102 may compile media segments already captured by co-users 112 at the event. For example, if a user 110 arrives at a concert after the opening act and requests to initiate a media presentation for the concert, the media presentation system 102 may provide the user 110 with media segments showing the opening act to the user. These media segments may be detected automatically by the media presentation system 102 or provided by co-users at the event using the systems, methods and processes described above.

As briefly mentioned above, the media presentation system 102 may communicate with a social networking system or other system to collect information about an event and/or users at the event. For example, a social networking system may indicate to the media presentation system 102 where and when an event is occurring, the name of the event, participates who will be or are at the event, etc. In addition, the media presentation system 102 may obtain event and user information based on a user's or co-user's status on a social networking system or other status-broadcasting system (e.g., FACEBOOK, INSTAGRAM, etc.).

Further, when the media presentation system 102 communicates with an external system, such as a social networking system to determine when an event is occurring, as well as participants at the event, the media presentation system 102 may also provide the event media presentation to the social networking system. To illustrate, a user may set up a social networking system event for a family holiday barbeque. The user may allow the media presentation system 102 to access her information on the social networking system, including the event page. As such, the media presentation system 102 may identify the date, time, as well as attendees of the event. During the event, the media presentation system 102 may assist a user in creating an event media presentation. The media presentation system 102 may share the event media presentation with the user and co-users at the family holiday barbeque. The media presentation system 102 may also post a copy of the event media presentation on the event page in the social networking system.

In one or more embodiments, the media presentation system 102 may provide users with the ability to view a live action (or near live action) media segment of an event using their client device. For example, the media presentation system 102 may enable a user to stream a media segment of an event. Further, the media presentation system 102 may provide users with multiple live media segment streams of the event. The event may by a public event, such as a concert, sports event, parade, play, tour, festival, show, convention, expo, etc. Alternatively, the event may be a private event, such as dinner among friends, a party, a casual get-together, a business meeting, a reception, etc. While the event, in general, occurs at one location, in some embodiments, the event may occur across multiple locations (e.g., an opening night event for a movie occurring at multiple locations).

To illustrate, the media presentation system 102 can provide multiple live streaming media segments from an event, as shown in FIG. 13A. For example, FIG. 13A shows a baseball stadium 1300 that is hosting a baseball game. One or more users of the media presentation system 102 may be attending the baseball game at the baseball stadium 1300. As shown in FIG. 13A, users may be situated at different locations throughout the stadium. Users may include Jake 1312a, Sue 1312b, Mark 1312c, Lisa 1312d, and Rob 1312e (collectively referred to as "users 1312").

Each of the users 1312 may have access to a client device that is able to capture media segments. Further, one or more of the client devices may include the capability to automatically report a location of the client device to the media presentation system 102. For example, some of the client devices may use GPS and/or WI-FI to identify their location. Alternatively, a user may manually input his or her location. For instance, the user may identify on a stadium map where he or she is seated in the stadium. In another instance, the user can provide the venue and seat location to the media presentation system 102.

Regardless of how a client device determines its location, the client device may report its location to the media presentation system 102. For example, the users 1312 may each report their location within the baseball stadium 1300 to the media presentation system 102. Based on the location of each user, the media presentation system 102 may create a location map or schematic that shows each user's location relative to the baseball stadium 1300 and each other. To illustrate, and as shown in FIG. 13, Jake 1312a is located next to left field, Sue 1312b is near third base. Mark 1312c is behind home plate, Lisa 1312d is along the first base line, and Robert 1312d is located just beyond center field.

During the baseball game, one or more of the users 1312 can provide live streaming media segments to the media presentation system 102, and the media presentation system 102 may provide the live streaming media segments to other users of the media presentation system 102, as will described below. For example, at different times throughout the baseball game, Mark 1312c may use his client device to capture a live streaming media segment from behind home plate. For example, when a big hitter is at bat, when there is a play at home plate, when there is a conference on the pitcher's mound, etc. Other users 1312 may also capture live streaming media segments from their respective location within the baseball stadium 1300. Because the users 1312 are spread out within the baseball stadium, when more than one user provides a live streaming media segment captured at the same time, the media presentation system 102 can provide different angles and perspectives of the baseball game to other users of the media presentation system 102.

In addition to the users 1312 capturing and providing live streaming media segments to the media presentation system 102, the media presentation system 102 may also obtain live streaming media segments from a broadcaster, news crew, television network, professional photographer, or other entity filming/capturing the baseball game. As one example, a sports network may be filming the baseball game using a number of cameras, the media presentation system 102 may provide one or more of the camera feeds to users of the media presentation system 102 as live streaming media segments. As another example, most higher-level sports stadiums have a large video screen or "big screen" that shows live action and replays of a game. In this example, the media presentation system 102 may obtain the camera feed displayed on the video screen and provide it as a live streaming media segment.

A user at the baseball game may view one or more live streaming media segments provided by the media presentation system 102. In some embodiments, the media presentation system 102 may limit distribution of the live streaming media segments captured at the baseball game to only users at the game. For example, the live media segment that Mark 1312c captures may only be viewable to Jake 1312a, Sue 1312b, Lisa 1312d, and Rob 1312e. Alternatively or additionally, the media presentation system 102 may provide the live streaming media segments to other users of the media presentation system 102 not present at the baseball game. In some cases, the media presentation system 102 may allow others access to the media segment only after the game finishes, or after a threshold period time has passed since a live streaming media segment was captured (e.g., after a two-hour delay).

In some example embodiments, depending on a user's client device capabilities, a user may be able to view multiple live streaming media segments at the same time. For example, a client device can provide a split screen that allows a user to view multiple media segments at the same time. Further, a user may have a client device that allows for displaying a media segment in a media segment (e.g., picture-in-picture or P-in-P). Using a split screen or picture-in-picture, a user may be able to use their client device to both watch a co-users live streaming media segment while also capturing a live media segment stream that is being shared with other users.

To further illustrate, FIG. 13B shows a live streaming media presentation 1308 that includes multiple live streaming media segments 1330a-n of a baseball game captured by the users 1312 at the baseball game. For example, the second live streaming media segment 1330b, captured by Mark 1312c, shows a live view of the game from behind home plate and the nth live streaming media segment 1330n, captured by Lisa 1312d shows a live view of the pitcher. As mentioned above, the live streaming media presentation 1308 may also include live streaming media segments provided by sources other than the users 1312, such as a television network or a stadium camera feed. Accordingly, a user at the game can use his or her client device to access the live streaming media presentation 1308 and view live streaming media segments of the game that provide additional perspectives of the game to the user.

In some embodiments, the live streaming media presentation 1308 may include a media segment that shows a schematic or map of the event venue, as shown in the first media segment 1330a. As shown, the first media segment 1330a displays a map of the baseball stadium 1300. Specifically, the first media segment 1330a in FIG. 13B corresponds to the baseball stadium 1300 described with respect to FIG. 13A. Accordingly, the map in the first media segment 1330a may show the location of the users 1312 (e.g., Jake 1312a, Sue 1312b, Mark 1312c, Lisa 1312c, and Rob 1312e) with respect to their locations within the baseball stadium 1300.

The map in the first media segment 1330a may display the location of users currently capturing live media segments stream of the baseball game. Within the media segment 1330a, the media presentation system 102 may show an icon, picture, or other indicator that represents each user at their respective location. Thus, as shown in FIG. 13B, each of Jake 1312a, Sue 1312b, Mark 1312c, Lisa 1312c, and Rob 1312e are capturing a live media segment stream of the baseball game and providing the live streaming media segments to other users of the media presentation system 102. As users begin capturing the game, the media presentation system 102 may update the media segment 1330a to reflect the additional users. Similarly, as users that are currently capturing the game stop providing a live streaming media segment, the media presentation system 102 may remove them from the map in the first live streaming media segment 1330a.

In some example embodiments, the map in the first media segment 1330a may allow a user viewing the map to navigate to other live streaming media segments 1330a-n within the live streaming media presentation 1308. For example, a user at the game may view the first live streaming media segment 1330a and may select Mark's picture behind home plate. The user's client device may them display the second media segment 1330b (e.g., the media segment captured by Mark). Accordingly, if the user at the baseball game would like a different view of the game, the media presentation system 102 may allow the user to view the baseball game from a other perspectives, as provided by other users of the media presentation system 102 also at the baseball game. Further, as mentioned above, in some example embodiments, the media presentation system 102 may enable users not at the baseball game to experience the game from the perspective of one or more co-users who are at the game.

In some example embodiments, when a user is viewing a live streaming media segment, such as the second media segment 1330b being captured by Mark, the name and/or image of the user capturing the media segment may be shown within the media segment. For example, Mark's picture is shown in the bottom left corner of the second media segment 1330b in FIG. 13B. Alternatively or in addition, rather than displaying the user, the media segment may include a map of the baseball stadium along with an indication of the location where the media segment is being captured. For instance, the second media segment 1330b may display a map of the stadium with an indicator, such as a dot, behind home plate.

As mentioned above, in some example embodiments, the first live streaming media segment 1330a may display a map of the baseball stadium along with users currently capturing live media segment streams. In some example embodiments, the first media segment 1330a can show reduced versions (e.g., thumbnails) of the live streaming media segments corresponding to the location of each user. For instance, the map may show a smaller version of the second media segment 1330b on the map behind home plate. The map may also include a smaller version of the nth media segment 1330*n* near first base where Lisa is sitting.

The reduced or smaller version of a live streaming media segment may be a reduced-quality version of the live stream or one or more images showing the perspective from the particular location. Thus, rather than showing the users 1312 (or in addition to showing the users 1312) on the map, the first media segment 1330*a* shows the live streaming media segments overlaid on the map. Even in these embodiments, a user may still select one of the reduced-size live streaming media segment and the user's client device will take the user to the corresponding full size live streaming media segment.

In one or more embodiments, rather than the map in the first live streaming media segment 1330*a* displaying users who are actively capturing live streaming media segment, the map in the first media segment 1330*a* may display all users of the media presentation system 102 attending the baseball game regardless of whether they are capturing the a live media segment. When the map in the first media segment 1330*a* displays all users of the media presentation system 102 at the baseball game, the media presentation system 102 may allow a user to select a co-user and request that the co-user begin capturing the game. For example, Robert 1312*e*, who is seated near the outfield, may request that Lisa 1312*d* capture a live media segment of the picture. Upon Lisa 1312*d* capturing a media segment of the pitcher, the media presentation system 102 may provide Robert with the nth live streaming media segment 1330*n*. As another example, a user at a concert, who is near the back of an event center, may request that a co-user in the front row capture a media segment of the performer so that the user may better see a performer's face.

In some example embodiments, the media presentation system 102 may record the live streaming media presentation 1308 or store one or more live streaming media segments 1330*a-n*. The media presentation system 102 may allow a user to replay the media segments after the event is over. For example, the media presentation system 102 allow a user attending the game to later watch the replay of the live streaming media presentation. Further, in some cases, the media presentation system 102 may allow a user not at the baseball game access a portion or the entire replay of the live streaming media presentation 1308.

When replaying the live streaming media presentation 1308 or multiple live streaming media segments 1330*a-n*, the media presentation system 102 may align the multiple media segment together so that, even though not live, the user can watch the event from multiple perspectives, as if the user were watching the event live. For example, a user accessing multiple media segments taken at a concert may be able to not only re-watch a song, but also seamlessly switch between the streaming media segments and view the performer from different vantage points as if her or she were watching the streaming media segment live. In addition, a user replaying the media presentation 1308 may be able to view more than one recorded media segment as the same time, as described above.

Figure 14:
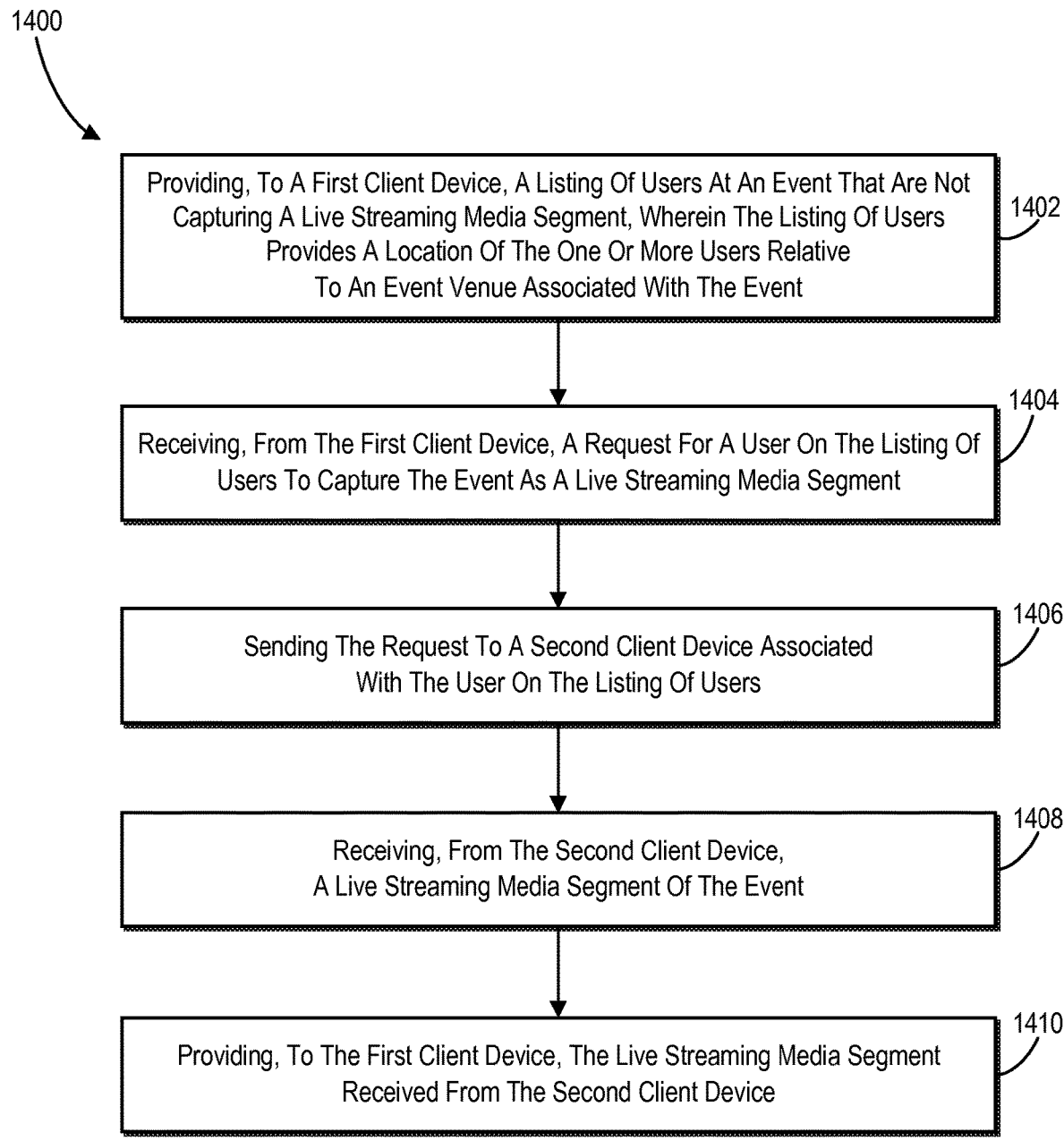
FIG. 14 illustrates a flowchart of a method for providing, to a user, a live streaming media segment captured by another user in accordance with one or more embodiments.

FIG. 14 illustrates a flowchart of a method 1400 for providing, to a user, a live streaming media segment captured by another user in accordance with one or more embodiments. The method 1400 includes an act 1402 of providing, to a first client device, a listing of users at an event that are not capturing a live streaming media segment, wherein the listing of users provides a location of the one or more users relative to an event venue associated with the event. The method 1400 also includes an act 1404 of receiving, from the first client device, a request for a user on the listing of users to capture the event as a live streaming media segment. The method 1400 further includes an act 1406 of sending the request to a second client device associated with the user on the listing of users. In addition, the method 1400 includes an act 1408 of receiving, from the second client device, a live streaming media segment of the event. The method 1400 also includes an act 1410 of providing, to the first client device, the live streaming media segment received from the second client device.

Figure 15A:
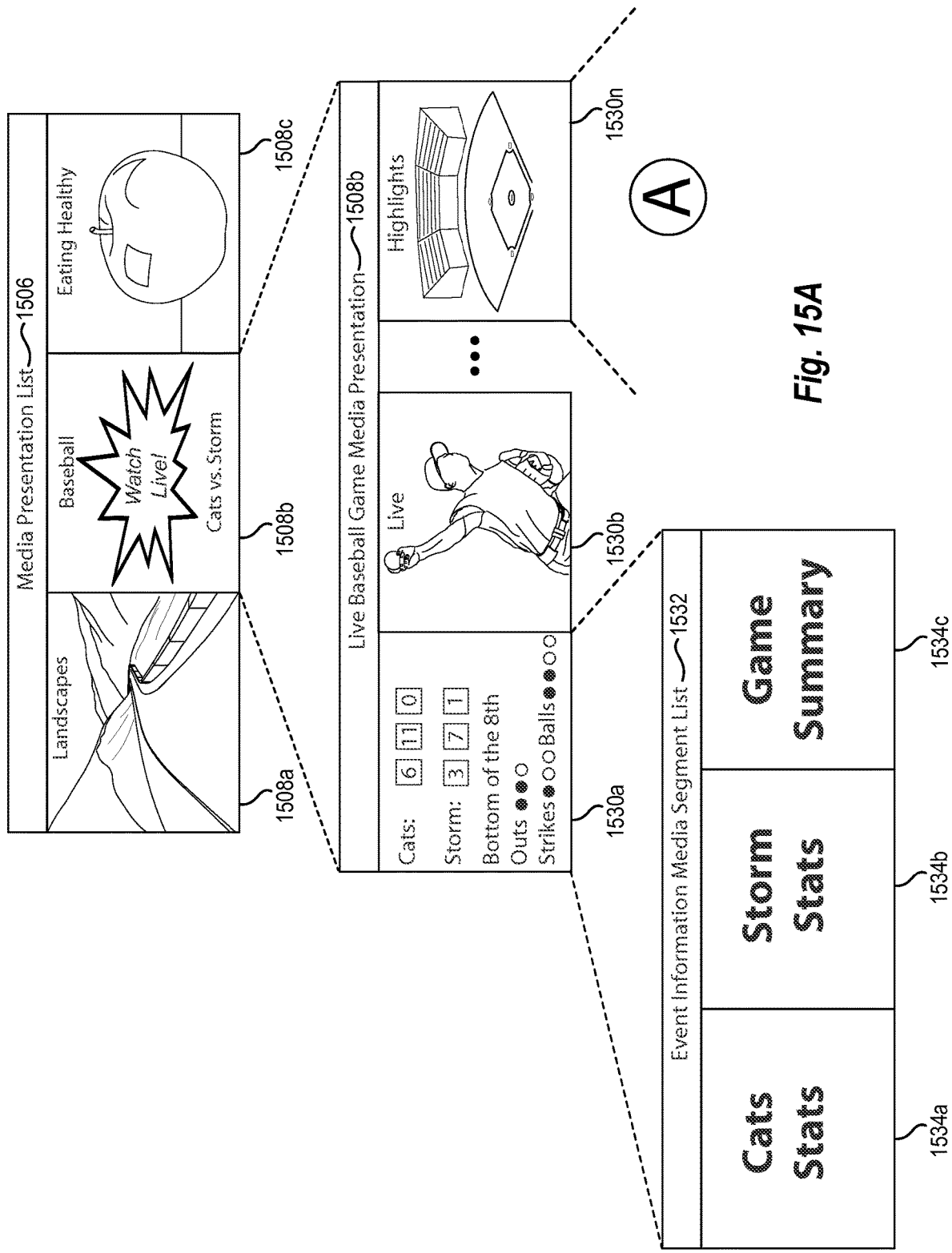
FIGS. 15A-B illustrate example media presentations including a media presentation of an event that provides a user with event information, live action, replays, and highlights in accordance with one or more embodiments.
Figure 15B:
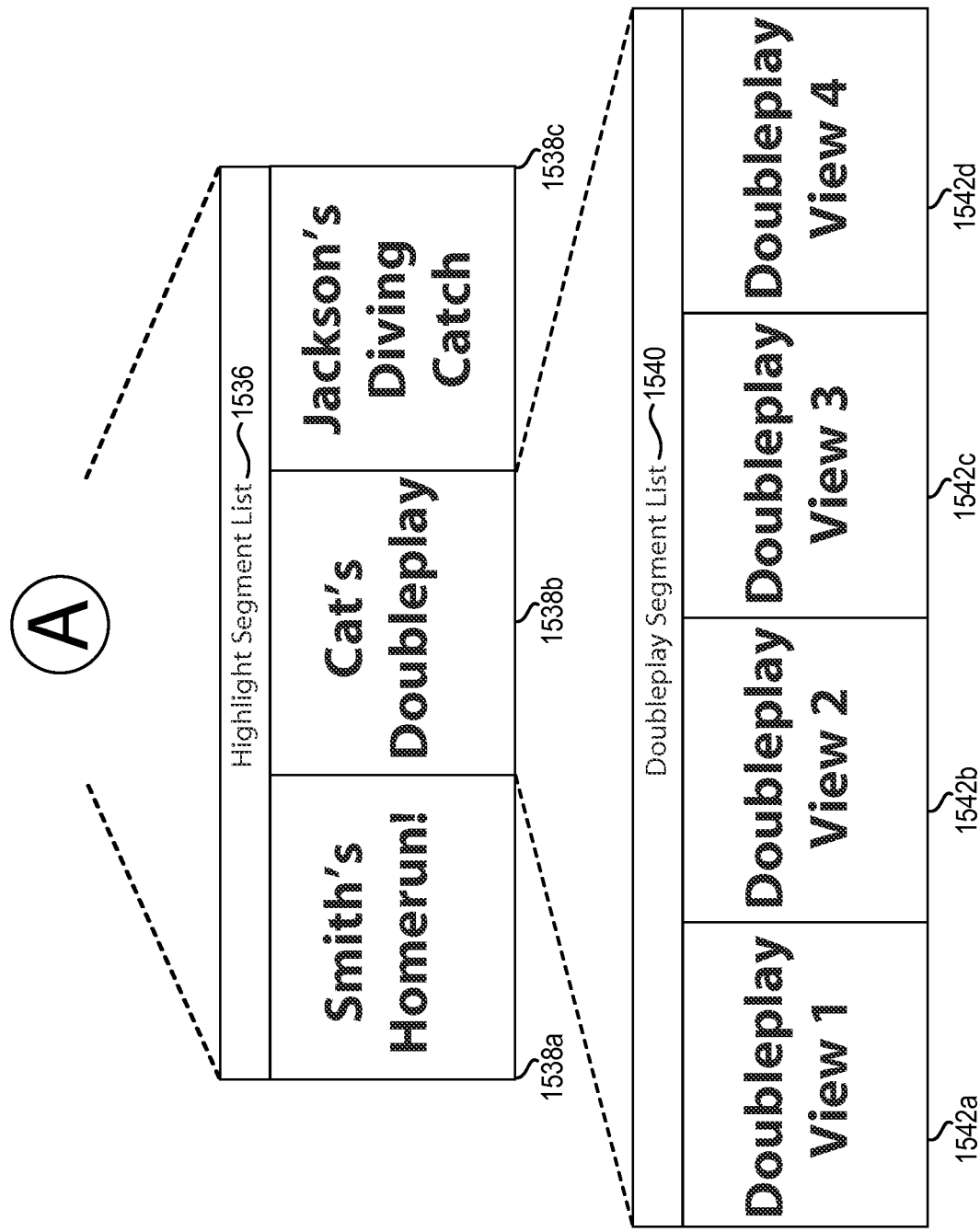

As mentioned above, one or more users of the media presentation system 102 not at an event may be able to view a live streaming media presentation of an event captured by co-users or third parties (e.g., a television network) at the event. To further illustrate, FIGS. 15A-B show a live streaming media presentation list 1506 that includes one or more media presentations 1508*a-c*. As shown, the first media presentation 1508*a* displays a media presentation that includes landscapes, the second media presentation 1508*b* includes a media presentation that includes a live baseball game, and the third media presentation 1508*c* displays media segments of healthy food.

A client device may present the first media presentation 1508*a* and the third media presentation 1508*c* to a user of the client device as described above. For example, the client device may play through each media segment in the first media presentation 1508*a* and the third media presentation 1508*c* when the user gives focus and/or attention to them. In other words, when a user on a client device scrolls or navigates to the first media presentation 1508*a*, the client device may present the media segments of landscapes from the first media presentation 1508.

The client device may present the second media presentation 1508*b*, however, differently from the first media presentation 1508*a* and the third media presentation 1508*c* because the second media presentation 1508*b* may be a live streaming media presentation. As described above, a live streaming media presentation may include one or more live streaming media segments of an event. Further, in some embodiments, a live streaming media segment may include media segments that are related to the event, as will be described below.

As shown in FIG. 15A, the second media presentation 1508*b* displays a notice or message announcing a live baseball game between the Cats and the Storm. When a user navigates to and views the second media presentation 1508*b*, for example on a client device, the client device may begin streaming live content. For example, the client device may begin playing a live streaming media segment corresponding to the baseball game. When multiple live media streams are available for an event, the user may switch between the various live streaming media segments within the live streaming media presentation 1508*b*, as described below. For instance, the client device may switch the display from the media presentation list 1506 to displaying one or more live streaming media segments 1530*a-n* from the second live streaming media presentation 1508*b*, as illustrated in FIG. 15A. Depending on the capabilities of the client device, the client device may be able to display more than one live streaming media segments from the second live streaming media presentation 1508*b* as the same time.

In some example embodiments, the client device can provide different presentation layouts that a user can select when viewing multiple live streaming media segments. For example, a user may select to have one media segment expand to fill the display of a client device. Alternatively, the user may have the client device stream all visible media segments at the same time. For example, of the client device has a large display screen, the client device may be able to stream a number of live streaming media segments at the same time.

In an alternative embodiment, the user may select an option to scale down each media segments such that all media segments are viewable at one time. Additionally, the user may select an option to view only a select number of media segments at one time. Further, when viewing multiple live streaming media segments at the same time, a client device may present a user with options to overlay one or more media segments on another media segment. For example, the user may select an option to overlay a reduced version the second live streaming media segment 1530a over another live streaming media segment. Additionally, when viewing multiple live streaming media segments at the same time, the client device may allow the user to select an audio stream to which to listen. Often however, a single audio stream will correspond to many, if not all, live streaming media segments (e.g., a radio broadcast of a baseball game).

As shown in FIG. 15A, the second live streaming media presentation 2408b for the baseball game may include a first live streaming media segment 1530a, a second live streaming media segment 1530b, and a nth live streaming media segment 1530n. Each live streaming media segment may represent a type of live streaming media segment that a client device may display to a user. For example, the first live streaming media segment 1530a may include information about the baseball game. The second live streaming media segment 1530b may include live action from the baseball game. The nth live streaming media segment 1430n may include highlights and replays from the baseball game.

The first live streaming media segment 1530a may be an event information media segment and may dynamically update to provide current game information to a user about the baseball game (e.g., a live "scoreboard"). As shown in FIG. 15A, the first live streaming media segment 1530a shows game information, such as the current score, the number of hits, the number of errors, as well as the current status of the baseball game. For other sporting events, the first live streaming media segment 1530a may display the time remaining, time-outs, current progress of the game, etc.

Further, depending on the type of event, the first live streaming media segment 1530a may display different types information. For instance, in the case that the live event is a concert or performance, the first live streaming media segment 1530a may display the performer(s) currently on stage, the song or number being performed, current lyrics, who performed previously, who is scheduled to perform next, and/or information about the venue or the performers themself. One will appreciate that an event information media segment may include a variety of information that a user may find beneficial.

In some embodiments, the first live streaming media segment 1530a may expand to include additional event information media segments. For instance, upon a user selecting an option on a client device to expand the first live streaming media segment 1530a, the client device may present the user with a list of event information media segments 1532. For example, FIG. 15 shows the list of event information media segments 1532 including a first event information media segment 1534a, a second event information media segment 1434b, and a third event information media segment 1534c. The event information media segments 1534a-c may provide additional information regarding the baseball game. For example, the first event information media segment 1534a shows statistics for the Cats, such as a list of players and their statistics for the game, season, and/or careers. The second event information media segment 1534b may show similar statistics for the Storm. Further, the third event information media segment 1534c may display a game summary.

In some example embodiments, when a user is viewing one or more live streaming media segments 1530a-n, the media presentation system 102 may provide an information media segment as overlay across, above, adjacent to, etc., the one or more media segments that includes information about the event. For example, a client device may display an event information media segment (e.g., the first live streaming media segment 1230a) adjacent to, or above another live streaming media segment. The event information media segment may remain in place on the display of the client device even with a user switches the other live streaming media segments the user is viewing (e.g., other live streaming events scroll under the event information media segment). In addition, the client device may provide the user with options that allows the user to hide, resize, and/or reposition the first live streaming media segment 1530a. Further, the client device may provide the user with options to specify what information is included in the event information media segment, such as teams playing the baseball game, the score, and/or other game information, as described above.

Returning to the second live streaming media presentation 1508b, the second live streaming media segment 1530b may display a live stream of the baseball game. The second live streaming media presentation 1508b may include any number of live streaming media segments that display live streams of the baseball game. The different live streaming media segments may provide a user with a different viewing experience of the baseball game. As described above in connection with FIGS. 13A-B, co-users at and/or third-party sources the baseball game may capture live media segment streams, and the media presentation system 102 may provide the live streaming media segments to the user to view.

The third live streaming media segment 1530c may be a highlight media segment and may display highlights of the baseball game. A user using a client device may select or focus on the third live streaming media segment 1530n, upon which, a client device may present the user with one or more highlight media segments. For example, FIG. 15B, which is a continuation of FIG. 15A, shows a highlight media segment list 1536 that the media presentation system 102 may provide to a user upon the user selecting the third live streaming media segment 1530n.

The highlight media segment list 1536 may include one or more highlight media segments, such as a first highlight media segment 1538a, a second highlight media segment 1538b, and a third highlight media segment 1538c. Each highlight media segment 1538a-c may represent a highlight in the baseball game. For example, the first highlight media segment 1538a, may highlight a player, Smith, hitting a homerun in the fifth inning. Further, each highlight media segment 1538a-c may provide an indication to content of the highlight. The indication may be an image, a video clip, text, and/or another type of indication.

When only one highlight media segment is available for a highlight, a client device may play the highlight media segment within the highlight media segment list 1236. Alternatively, when multiple highlight media segments are available for a highlight, a client device may provide a user with an additional list of media segments for the highlight. To illustrate, a client device may display an indication to the user that the second highlight media segment 1538 includes multiple highlight media segments for a double play by the Cats. Upon a user selecting (e.g., navigating to, giving focus, providing user input, etc.) the second highlight media segment 1538b, a client device may provide the user with a double play media segment list 1540.

As shown in FIG. 15B, the double play media segment list 1540 include four double play media segments 1542a-d. Each double play media segment may show the double play highlight from different users and/or different angles or perspectives. Accordingly, when a user selects the Cat's double play highlight (e.g., the second highlight media segment 1538b), a client device may allow a user to view and replay the double play from a number of angles and perspectives (e.g., captured from users located in various locations at the baseball stadium as described above).

In some embodiments, the media presentation system 102 may intelligently identify one or more highlights. To illustrate, the media presentation system 102 may detect that a significant event (e.g., a significant act) has occurred at the event. For instance, the media presentation system 102 may detect that a change in the game status has occurred. If the event is a baseball game, the media presentation system 102 can identify when a homerun, a double play, an error, or other major play occurs, for example, based on changes in the game information. If the event is a concert, the media presentation system 102 may detect when a particular song was performed. In some instances, the media presentation system 102 may user social media (e.g., hashtags, status updates, etc.) to determine at what time a significant event occurred.

In addition to determining the occurrence of a significant event, the media presentation system 102 may identify that one or more users or third-party sources at the event have captured the significant event. For example, after determining that a double play occurred at the baseball game between the Cats and the Storm (e.g., based on a change in the game information), the media presentation system 102 may identify that at least four users captured the double play as a media segment by matching a time period associated with the change in game information with a time period associated with the four media segments. In addition, the media presentation system 102 can analyze the media segments to further refine the portion of each media segment that corresponds with the significant event. Accordingly, the media presentation system 102 may add the four media segments to the double play media segment list 1540 shown in FIG. 15B.

Similarly, the media presentation system 102 may identify that an above average number of users are capturing a media segment at an event. For example, when a baseball player was up at bat for the last time in his career, or when a celebrity makes an unexpected appearance at an event, a larger-than-average number of users may have captured the event. When the media presentation system 102 detects an increase in the number of media segments, the media presentation system 102 may store the media segments as a highlight. Further, when the media presentation system 102 identifies the reason for the above-average interest and number of captured media segment at an event, the media presentation system 102 can create a label/title for the highlight media segments. Additionally or alternatively, the media presentation system 102 may allow users to provide information about the highlight media segments, such as providing a title for the highlight media segments.

In one or more embodiments, the media presentation system may remove or promote highlights within an event media presentation (e.g., the second live streaming media presentation 1508b). For example, the media presentation system 102 may promote or remove a highlight based on user feedback, such as user votes or ratings. If a highlight or a highlight media segment within a highlight receives a threshold number of negative feedback, the media presentation system 102 may remove the highlight or highlight media segment. The threshold may be a based on of the proportion of negative feedback votes to the number of views and/or the proportion of negative feedback votes to the number of positive feedback votes. Further, the media presentation system 102 may not remove or promote a highlight unless the highlight has a minimum number of feedback votes and/or views. For instance, the media presentation system 102 may determine to remove a highlight that has been viewed over 100 times, and has over 50 feedback votes, because over half of the feedback is negative.

Figure 16:
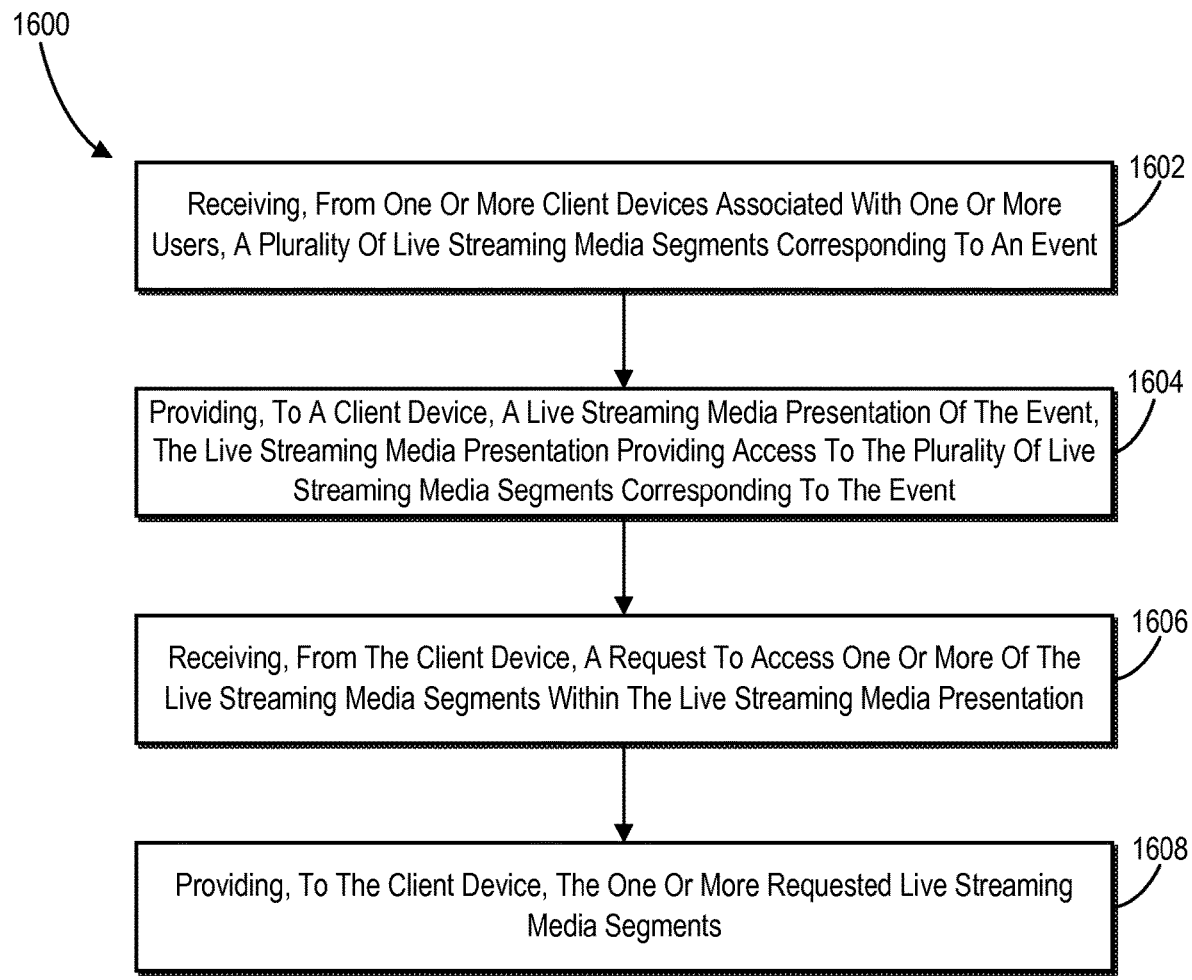
FIG. 16 illustrates a flowchart of a method 1600 for providing a live streaming media segment to a user in accordance with one or more embodiments.

FIG. 16 illustrates a flowchart of a method 1600 for providing a live streaming media segment to a user in accordance with one or more embodiments. The method 1600 includes an act 1602 of receiving, from one or more client devices associated with one or more users, a plurality of live streaming media segments corresponding to an event. The method 1600 also includes an act 1604 of providing, to a client device, a live streaming media presentation of the event, the live streaming media presentation providing access to the plurality of live streaming media segments corresponding to the event. The method 1600 further includes an act 1606 of receiving, from the client device, a request to access one or more of the live streaming media segments within the live streaming media presentation. In addition, the method 1600 includes an act 1608 of providing, to the client device, the one or more requested live streaming media segments.

Figure 17:
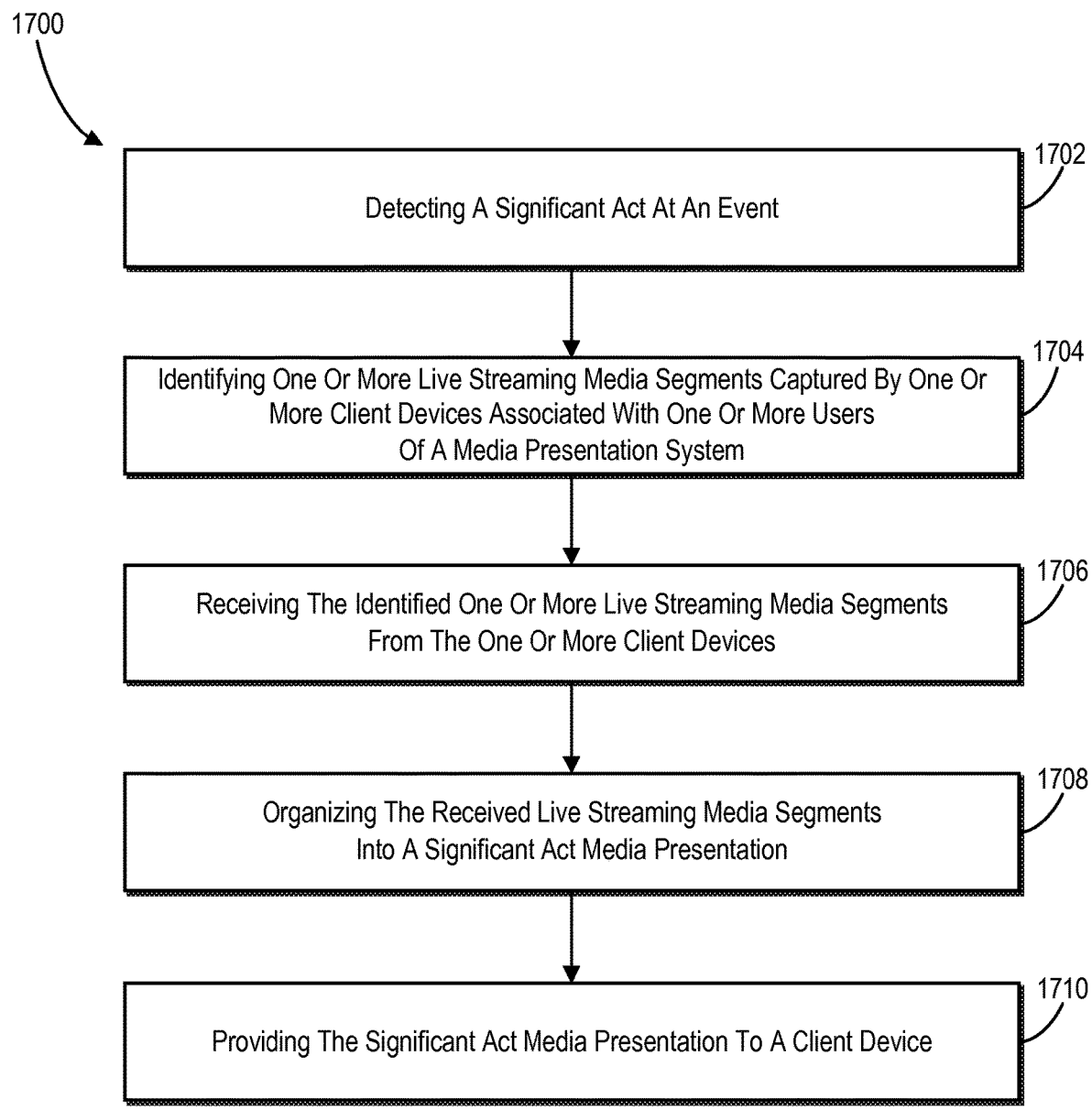
FIG. 17 illustrates a flowchart of a method for generating a significant act ("highlights") media presentation in accordance with one or more embodiments.

FIG. 17 illustrates a flowchart of a method 1700 for generating a significant act ("highlights") media presentation in accordance with one or more embodiments. The method 1700 includes an act 1702 of detecting a significant act at an event. The method 1700 also includes an act 1704 of identifying one or more live streaming media segments captured by one or more client devices associated with one or more users of a media presentation system. The method 1700 further includes an act 1706 of receiving the identified one or more live streaming media segments from the one or more client devices. In addition, the method 1700 includes an act 1708 of organizing the received live streaming media segments into a significant act media presentation. The method 1700 also includes an act 1710 of providing the significant act media presentation to a client device.

Figure 18:
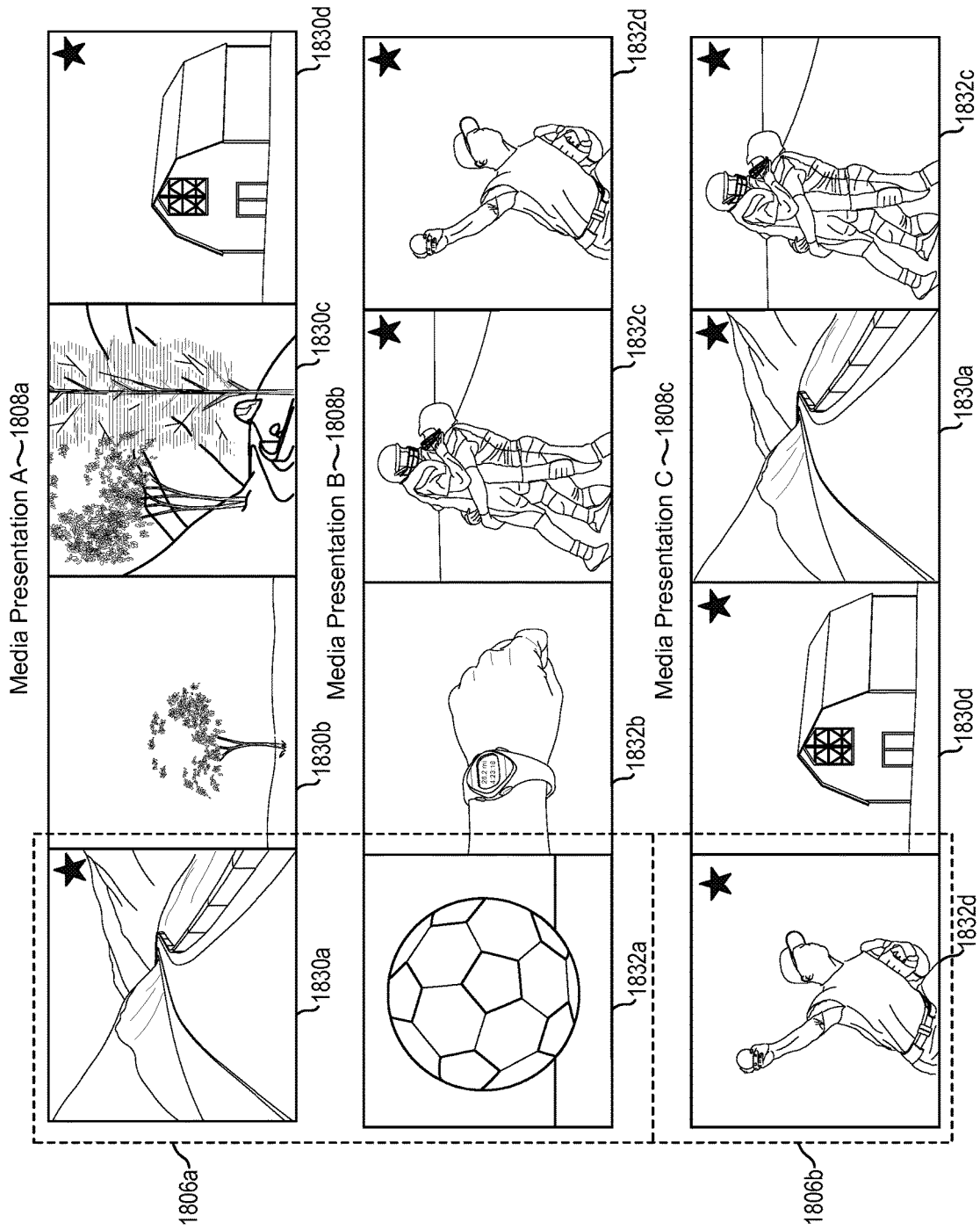
FIG. 18 illustrates the process of the media presentation system generating a favorites media presentation in accordance with one or more embodiments.

In some example embodiments, the media presentation system 102 may generate a "favorites" media presentation for a user. FIG. 18 illustrates an example embodiment where the media presentation system 102 generates a favorites media presentation. In particular, FIG. 18 illustrates Media Presentation A 1808a and Media Presentation B 1808b. As illustrated, Media Presentation A 1808a and Media Presentation B 1808b both include four (4) media segments. For example, Media Presentation A 1808a includes media segments 1830a-d that relate to landscapes and nature and Media Presentation B 1508b includes media segments 1832a-d that relate to sports.

Within each media presentation, a user can mark or tag a media segment as a "favorite." For example, as illustrated in FIG. 18, the user may mark the first media segment 1830a and the fourth media segment 1830d from Media Presentation A 1808a as favorites. The user may also mark the first media segment 1832c and the second media segment 1832d from Media Presentation B 1808b as favorites. As show in FIG. 18, media segments that are designated as favorites have stars in the top right corner of the media segment. Media segments that the user has not indicated as a favorite do not include stars. Alternatively, media segments that the user has not indicated as a favorite may display a hollow star in the top right corner. One will appreciate that a variety of methods may be employed for marking a media segment as a favorite and for indicating when a user has marked a media segment as a favorite. For instance, a client device may display a heart on media segments that a user has marked or tagged as a favorite.

The media presentation system 102 may automatically, or upon a user's request, create a favorites media presentation 1808c. The favorites media presentation 1808c may include one or more media segments that the user has marked as a favorite from across media presentations in a media presentation list. For instance, as shown in FIG. 18, Media Presentation C 1808c shows a media presentation that includes user-tagged media segments from Media Presentation A 1808a and Media Presentation B 1808b. Specifically, FIG. 18 illustrates that Media Presentation C 1808c includes the first media segment 1832a and the second media segment 1832b from Media Presentation A 1808a. Media Presentation C also includes the first media segment 1832a and the second media segment 1832b from Media Presentation B 1808b. Further, Media Presentation C 1808c may include other media segments that a user has marked as a favorite.

The media presentation system 102 may arrange the media segments in Media Presentation C 1808c based on a number of factors, such as by age, when the media segment was marked as a favorite, user preference, which user provided the media segment, general popularity, etc. In additional or alternative embodiments, the media presentation system 102 may allow a user to manually order or re-order media segments in the favorites media presentation.

Further, the media presentation system 102 may limit the number of favorites within the favorites media presentation or create multiple favorite media presentations based on different criteria. For example, the media presentation system 102 may only include favored media segments that are less than a threshold age (e.g., added in the last day or week) or threshold amount of time since a user marked the media segment as a favorite. In one or more additional embodiments, a favorite media presentation may include only a limited number of media segments in the favorites media presentation, such as ten (10) favored media segments. In another favorite media presentation, the media presentation system 102 may include all media segments marked as a favorite by the user regardless of date added, or number of other media segments in the presentation. In this case (or other cases), the media presentation system 102 may allow a user to unmark a media segment as a favorite within the favorite media presentation when the user no longer wants to include the media segment in the favorite media presentation.

After the media presentation system 102 creates one or more favorite media presentations, the media presentation system 102 may include the favorite media presentations in a user's media presentation list 1806 along with other media presentations shared with the user. To illustrate, before the media presentation system 102 creates Media Presentation C 1808c, a client device may only display Media Presentation B 1808c and Media Presentation B 1808b in the media presentation list 1806a. Upon creating a favorite media presentation, the client device may expand the media presentation list 1806a to further include the Media Presentation C 1808c as part of an expanded media presentation list 1806a-b.

In a similar manner, in one or more embodiments, the media presentation system 102 may automatically create other media presentations. As further described below, the media presentation system 102 may create a topical or categorical media presentation, an unplayed media presentation (e.g., unviewed media segments), and/or a popular, featured, or trending (e.g., within the last hour, 12 hours, 24-hours, or another specified amount of time) media presentation. The media presentation system 102 may generate each of these media presentations automatically, and/or upon a user's request.

Figure 19:
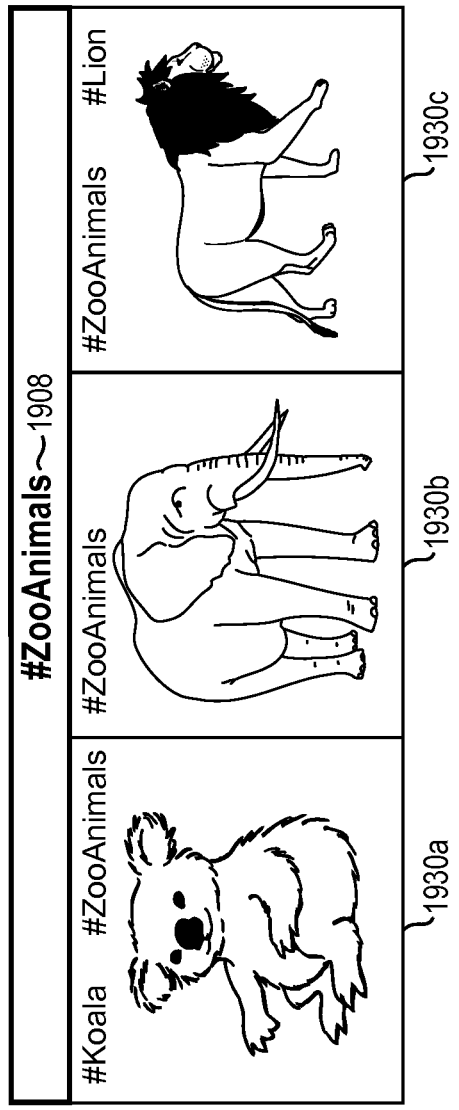
FIG. 19 illustrates an example media presentation that is filtered to include media segments sharing a common topic in accordance with one or more embodiments.

For example, and as shown in FIG. 19, the media presentation system 102 may generate a media presentation based on a topic or category selected by a user. For example, the user may request to view a media presentation that includes media segment of animals. The media presentation system 102 may search for media segments, within one or more of the user's media presentations or across the media presentation system 102 as a whole, for media segments that include animals. For instance, the media presentation system 102 may identify media segments that include #ZooAnimals.

To illustrate, FIG. 19 illustrates a media presentation 1908 that includes media segments 1930a-c of zoo animals. For example, the media presentation system 102 may search each media segment within the user's media presentation list to identify media segments that have been tagged as having the words "zoo animal" or being associated with a zoo animal. Additionally, the media presentation system 102 may search media segments within the media presentation list of co-users connected to the user to identify media segments that are associated with zoo animals. Further, in some cases, the media presentation system 102 may search media segments within the media presentation system 102 for media segments that are associated with zoo animals.

In addition, the media presentation system 102 may generate a media presentation of unplayed media segments from across a user's media presentation list. For example, the media presentation system 102 may compile an unplayed media presentation that includes currently unplayed media segments. The media presentation system 102 may include the unplayed media presentation in a user's media presentation list. The media presentation system 102 may also prioritize the unplayed media presentation in the user's media presentation list so the user first sees the unplayed media presentation upon returning and when viewing his or her media presentation list.

In some instances, the media presentation system 102 may limit media segments in the unplayed media presentation to media segments added since the user last logged in or accessed the user's media presentation list, unplayed media segments within a time period (e.g., the previous 24 hours, week, etc.) or to include all unplayed media segment in a user's media presentation list. Further, the media presentation system 102 may allow a user to configure the parameters to determine which unplayed media segments are included in the unplayed media presentation.

Further, the unplayed media presentation may provide a user with contextual navigation when playing an unplayed media segment. For instance, the media presentation system 102 may allow a user to navigate to the media presentation to which the unplayed media segment belongs, so that the user can view the unplayed media segment in the proper context. The media presentation system 102 may also provide the user the ability to return to the unplayed media presentation and resume watching other unplayed media segments.

After the user watches an unplayed media segment, whether in the unplayed media segment or in the media presentation to which the unplayed media segment belongs, the media presentation system 102 may remove the media segment from the unplayed media presentation. Alternatively, the media presentation system 102 may leave the unplayed media segment in the unplayed media presentation for a threshold period of time, such as 5 minutes, 30 minutes, an hour, 12 hours, a day, etc. In some cases, the media presentation system 102 may leave the unplayed media segment in the unplayed media presentation until the next time the users leaves and again access an application that facilitates interactions with the media presentation system 102.

In an additional embodiment, the media presentation system 102 may automatically generate a media presentation of media segments that are popular or trending across the media presentation system 102. In one example, the media presentation system 102 may create a popular media presentation using media segments within a user's media presentation list. In another example, the media presentation system 102 creates the popular media presentation based on media segments that are popular or tending based on interest of the user, what co-users associated with the user are viewing/liking, and/or media segments that are trending across the media presentation system 102.

Figure 20:
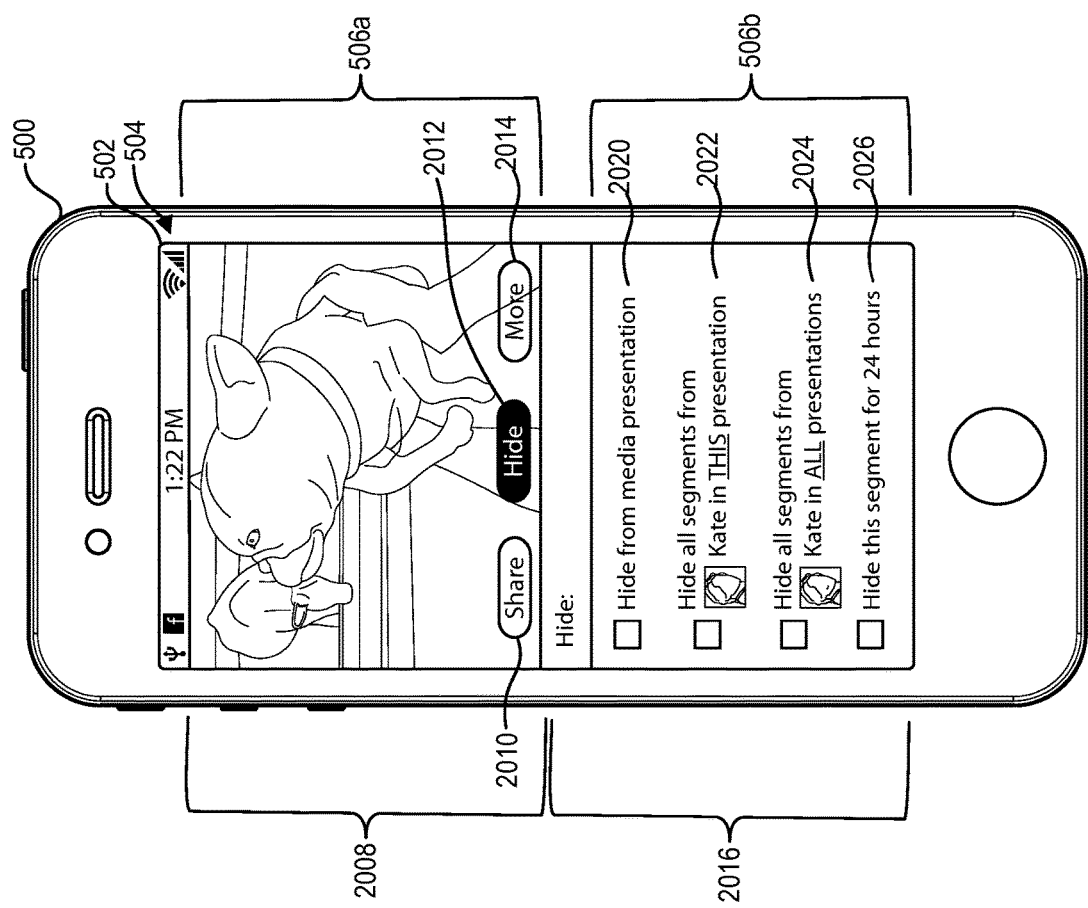
FIG. 20 illustrates an example embodiment of the media presentation system providing restriction options to a user within a media presentation on a client device in accordance with one or more embodiments.

As briefly discussed above, in one or more embodiments, the media presentation system 102 may provide one or more options to a user to restrict one or more media segments or media presentations from the user's media presentation list. To further illustrate, FIG. 20 shows an example embodiment of the media presentation system 102 providing restriction options to a user within a media presentation 2008 on a client device 500. The client device 500 displayed in FIG. 20 may be one embodiment of the client device 500 illustrated in FIG. 5. As such, the client device 500 may include a GUI 502 that displays various views by way of the touch screen 504. Further, the GUI 502 shown in FIG. 20 may include the first area 506a and the second area 506b, as described above.

As shown in FIG. 20, the first area 506a includes a media presentation 2008 and user options, such as a "share" option 2010, a "hide" option 2012, or a "more" option 2014. The client device 500 may present the user options as graphical user interface elements, such as graphical buttons, within the first graphical user interface area 2008. The client device 500 may hide the user option when the user has not provided user input (e.g., a tap or swipe) to the touchscreen 504 to the client device 500 for a minimum amount of time (e.g., one or two seconds).

When a user selects the share option 2010, the client device 500 may provide the user with a sharing interface to share the media segment or the media presentation with one or more co-users, as described above. For example, the client device 500 may display the sharing interface in the second area 506b (not shown). Similarly, when a user selects the more option 2014, the media presentation system 102 may present additional user options to the user, such as the option to the report inappropriate content, like the media segment, like the media presentation, and/or add a media segment to the media presentation. Upon selecting the more option 2014, the client device 500 may display a more options interface in the second area 506b (not shown) that includes one or more of the more options listed above.

Upon a user selecting the hide option 2012, the client device 500 may display a restrictions interface in the second area 506b, as illustrated in FIG. 20. The restrictions interface 2016 may include one or more additional options for a user to select that enables a user to hide, restrict, or otherwise block a media segment, media presentation, or co-user. As illustrated in FIG. 20, the user has selected the hide option 2012, which is indicated by the hide option being highlighted.

As further illustrated in FIG. 20, the second graphical user interface area 506b displays the restriction interface, that includes the option 2020 to hide the current media segment from the media presentation 2008, the option 2022 to hide all segments from a particular user (e.g., Kim) from the media presentation 2008, the option 2024 to hide/block all media segments from the particular user (e.g., Kim) in all media presentations within the user's media presentation list, or the option 2026 to hide the current media segment for a set time period (e.g., 24-hours, 1-week, etc.). One will appreciate that the media presentation system 102 may present, via the client device 500, an additional number of restriction options to a user, such as blocking all media presentations created by a particular co-user, unblocking a media segment or user, moving the co-user's media segments to the end of a media presentation, or skipping the co-user's media segment for a set number of plays of a media presentation.

In an alternative embodiment, rather than displaying the restriction interface in the second area 506b, the client device may apply a default restriction option upon the user selecting the hide option 2012. For example, the client device 500 may temporarily hide the media segment from the media presentation 2008 for 24-hours upon the user selecting the hide option 2012. Further, the default restriction option may change based on the number of times a particular media segment has been hidden and/or the number of time a co-user has been restricted. For example, upon the third time that the user selects the hide option 2012 for a particular media segment, the client device 500 may hide the media segment from the media presentation 2008. If the client device 500 detects a pattern of the user hiding media segments from a particular user (e.g., the user generally hides media segments from the particular user), the client device 500 may automatically, or with user consent, hide all media segments from that particular user.

Along the lines of hiding a media segment or media presentation, the media presentation system 102 may censor media segments and media presentations based on a user's censorship preferences. To illustrate, FIG. 21 displays a flow diagram showing a method 2100 of the media presentation system 102 censoring content. The media presentation system 1012 may censor a media segment or media presentation based on user feedback, as described below.

Figure 21:
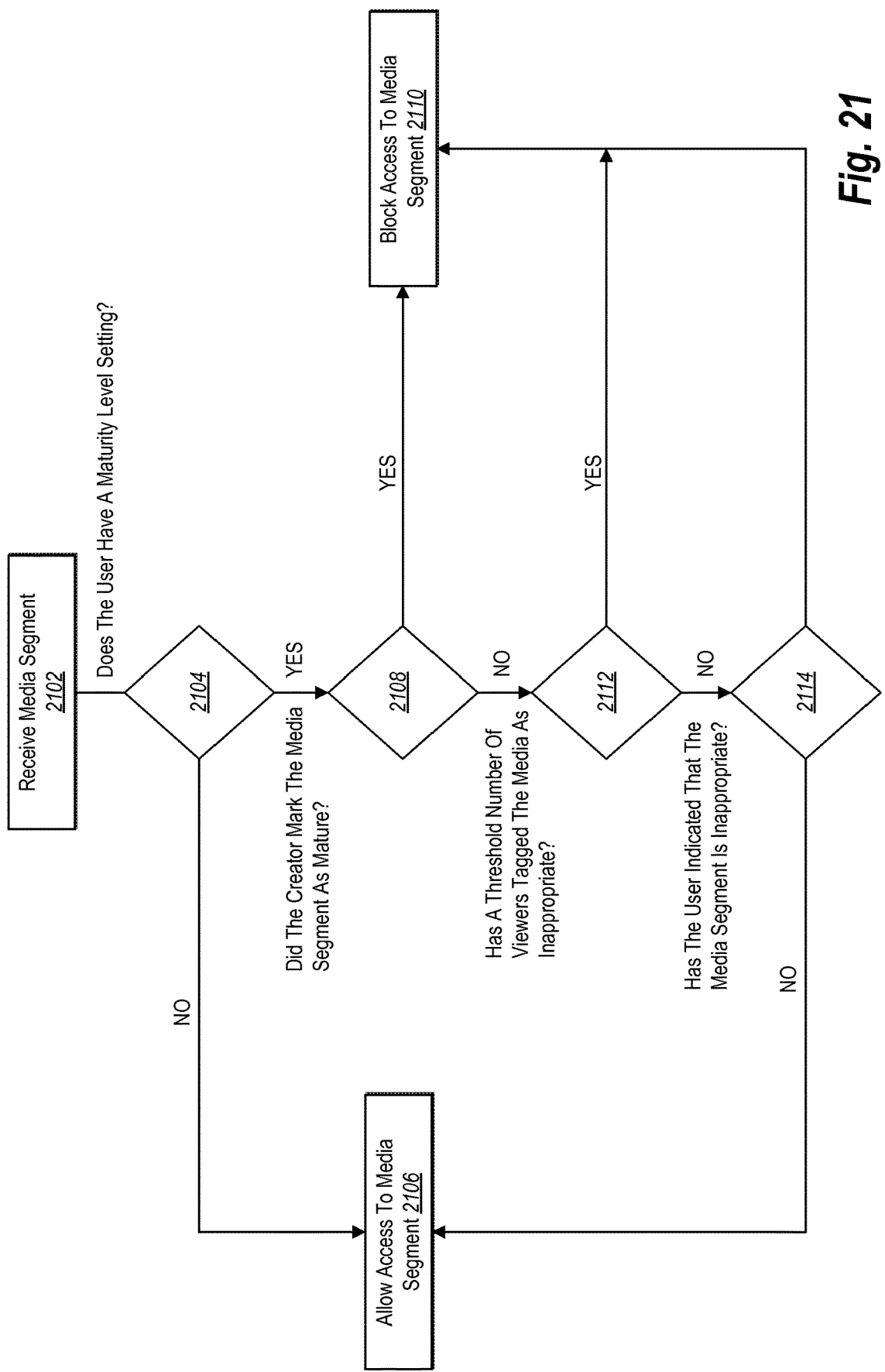
FIG. 21 illustrates a flowchart of a method for censoring a media segment in accordance with one or more embodiments.

For purposes of explanation, the media presentation system 102 performs the steps described in FIG. 21, however, a client device, such as the first client device 104a and the second client device 104b described with respect to FIG. 1, may equally perform the steps described in FIG. 21. Likewise, a client device and the media presentation system 102 may collectively perform the steps described in FIG. 21.

In step 2102, the media presentation system 102 may receive a media segment. For example, a media segment may be captured by a client device and sent to the media presentation system 102 as part of a media presentation. The media segment may include inappropriate content.

In step 2104, the media presentation system 102 may determine whether a user has a maturity level setting or preference in place. In other words, when a media segment is shared with a user, the media presentation system 102 may first check preferences for the user to determine if the media presentation system 102 should filter out content that the user has specified as inappropriate. For example, the media presentation system 102 may determine if a user has requested not to receive explicit content.

In some cases, the maturity level setting or explicit content filter may be automatically applied for a user. For example, users under the age of 21 may automatically have maturity level set to equal the user's current age. For instance, if a user is 15, the user may not be able to view content designated for users under the age of 16. In other cases, a parent, guardian, or administrator may specify the maturity level for another user. For instance, a company administrator may set a maturity level that blocks all inappropriate media segments received on company property.

If the user does not have a maturity level set (manually or automatically), the media presentation system 102 may allow the media segment to be presented to the user, as step 2106 indicates. For example, the media presentation system 102 may send the media segment to a client device associated with the user.

If the user does have a maturity rating, however, the media presentation system 102 may further analyze the media segment to determine if the media segment satisfies the maturity level set by the user. For example, as step 2108 illustrates, the media presentation system 102 may determine whether a user that created the media segment marked the media segment as being explicit or having a designated a maturity level. For instance, the user that created the media segment may indicate that the media segment is not appropriate for users under the age of 14. Further, the user that created the media segment may indicate that the media segment includes explicit content.

In some cases, the media presentation system 102 may analyze the media segment and detect the presence of mature content, such as inappropriate language, nudity, violence, etc. If the media presentation system 102 detects explicit content, the user that created the media presentation system 102 may recommend to a user that created the media segment to add a maturity warning or set a maturity age. Alternatively, the media presentation system 102 may automatically assign a maturity warning to the media segment.

If the creator of the media segment has marked the media segment as explicit, the media presentation system 102 may block the media segment from a user, as shown in step 2110. In particular, if the media segment is part of a media presentation, the media presentation system 102 may skip the media segment from playing in the media presentation or not even include the media segment in a media presentation when providing the media presentation to a user who has a maturity rating enabled. Further, in some cases, the media presentation system 102 may provide an indication to a user that a media segment has been blocked from the media presentation.

If the creator of the media segment has not marked the media segment as mature or inappropriate, the media presentation system 102 may determine whether a threshold number of viewers have tagged the media segment as inappropriate (e.g., crowd sourcing censorship), illustrated in step 2112. More specifically, the media presentation system 102 may identify the number of users that have hidden the media segment, blocked the media segment, or flagged the media segment as inappropriate (e.g., explicit, inappropriate for users under the age of x, contains mature content, etc.). The media presentation system 102 may compare the number of users that have hidden, blocked, or flagged the media segment and determine if the number is above a threshold. For example, if ten (10) users have reported a media segment as inappropriate, the media presentation system 102 may block the media segment from a user. The media presentation system 102 may also designate a media segment as inappropriate when a minimum percentage of viewers (e.g., 30% of viewers) have marked the segment as inappropriate. If a threshold number of users have marked the media segment as inappropriate, the media presentation system 102 may block the media segment from the user, as shown in step 2110.

In some embodiments, the media presentation system 102 may apply a sliding scale based on the number of users that flag a media segment as inappropriate to determine the appropriateness of a media segment for a given user. As a simplistic example, the media presentation system 102 may determine the age for which the media segment is appropriate based on the number of times users flagged a media segment as inappropriate. For instance, if a media segment has been flagged twelve (12) times for inappropriateness, the media presentation system 102 may determine that the media segment is inappropriate for users under the age of 12. If the media segment is then flagged as inappropriate twice more (i.e., fourteen (14) times total), the media presentation system 102 may determine that the media segment is inappropriate for users under the age of 14. One will appreciate that the media presentation system 102 can apply a different sliding scale rate between the number of times a media segment is marked as inappropriate and the maturity rating assigned to a media segment.

Similarly, the media presentation system 102 may consider the percentage of viewers who mark a media segment as inappropriate in relation to the total number of users that have viewed the media segment. For example, if a media segment has 1,000 counts of reported inappropriateness, the media presentation system 102 will likely determine that the media segment is marked inappropriate. If the media segment, however, has been viewed over one million times, the 1,000 counts of reported inappropriateness represents less than 0.1% of users who have viewed the media segment and the media segment may not be inappropriate. On the other hand, if over 30% of user who view a media segment report the media segment as inappropriate and the media segment has been viewed over 100 times, the media presentation system 102 may assign a maturity warning to the media segment.

If, however, a threshold number of users have not marked the media segment as inappropriate or mature for certain audiences such as the user, the media presentation system 102 may determine whether the user has tagged the media segment as inappropriate, as shown in step 2114. For example, the user may watch a media segment and determine that the user does not want to continue watching or re-watch the media segment. Accordingly, the user may personally mark or tag the media segment as inappropriate. Upon the user tagging the media segment as inappropriate, the media presentation system may block the media segment, as step 2110 illustrates. Otherwise, if the user has not marked the media segment as inappropriate, the media presentation system 102 may allow the user to access (e.g., play) the media segment, as step 2106 illustrates.

In one or more embodiments, the media presentation system 102 may also determine if co-users connected to the user have indicated that the media segment contains inappropriate content. For example, if a parent tags a media segment as inappropriate, the media presentation system 102 may block the media segment for both the parent as well as for their children (in the case that both users have access to the media segment or have the media segment on their own media presentation list). In some cases, a parent may mark a media segment as inappropriate for users under 18. In this case, the media presentation system 102 may block the media segment from any children the parent has that is under 18, but the media presentation system 102 may not block the media segment for any children the parent has over 18, or for the parent.

Similarly, in some embodiments, the media presentation system 102 may identify if friends, family, or other acquaintances have marked a media segment as inappropriate. The media presentation system 102 may give greater weight when co-users connected to a user have marked a media segment as inappropriate. For example, when two or more friends of a user mark a media segment as inappropriate, and the user has maturity ratings in place, the media presentation system 102 may block the media segment from being provided to the user.

Figure 22:
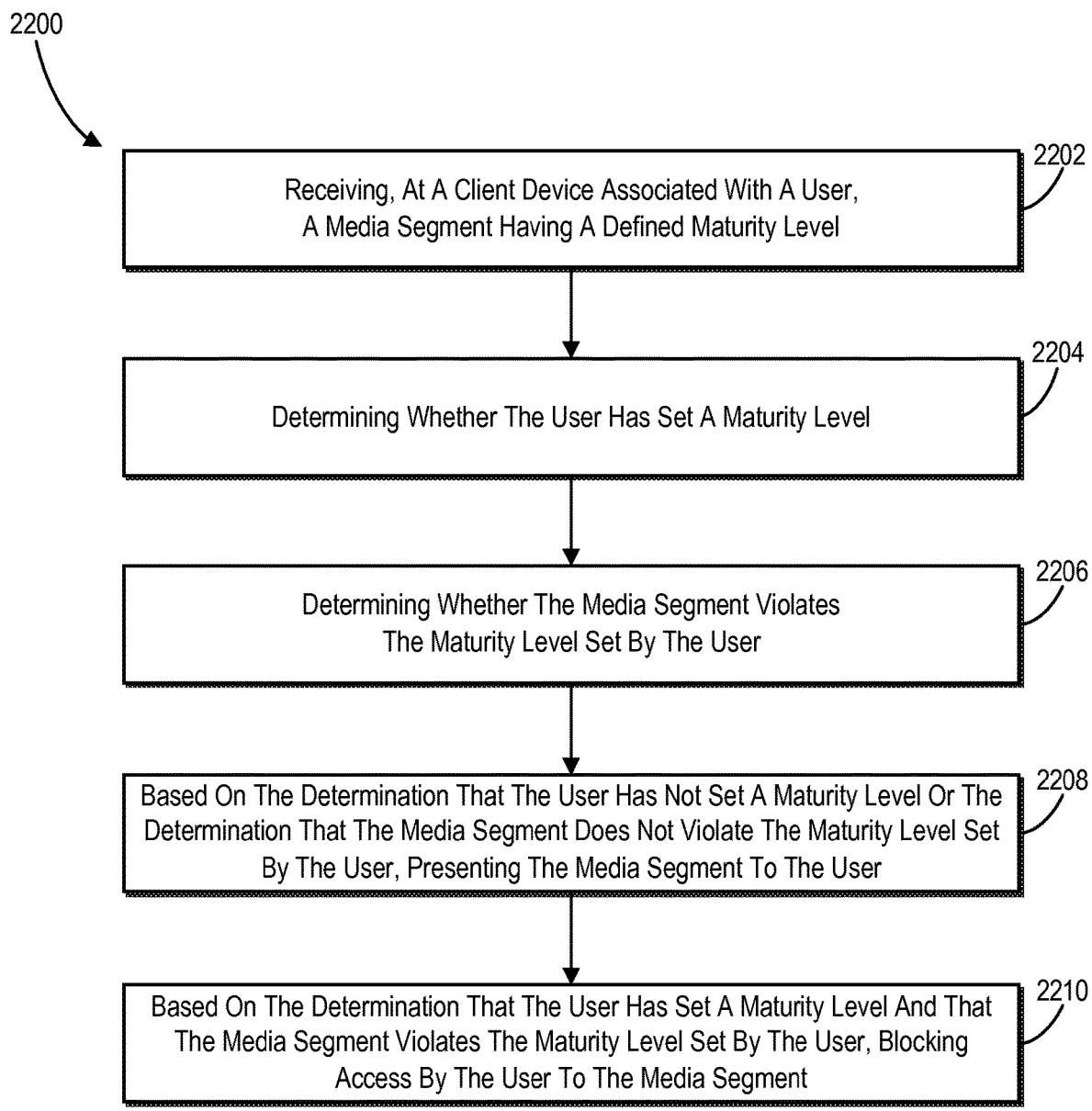
FIG. 22 illustrates another flowchart of a method for censoring a media segment in a media presentation in accordance with one or more embodiments.

FIG. 22 illustrates a flowchart of a method 2200 for censoring a media segment in a media presentation in accordance with one or more embodiments. The method 2200 includes an act 2202 of receiving, at a client device associated with a user, a media segment having a defined maturity level. The method 2200 also includes an act 2204 of determining whether the user has set a maturity level. The method 2200 further includes an act 2206 of determining whether the media segment violates the maturity level set by the user. In addition, based on the determination that the user has not set a maturity level or the determination that the media segment does not violate the maturity level set by the user, the method 2200 includes an act 2208 of presenting the media segment to the user. Based on the determination that the user has set a maturity level and that the media segment violates the maturity level set by the user, the method 2200 also includes an act 2210 of blocking access by the user to the media segment.

Figure 23:
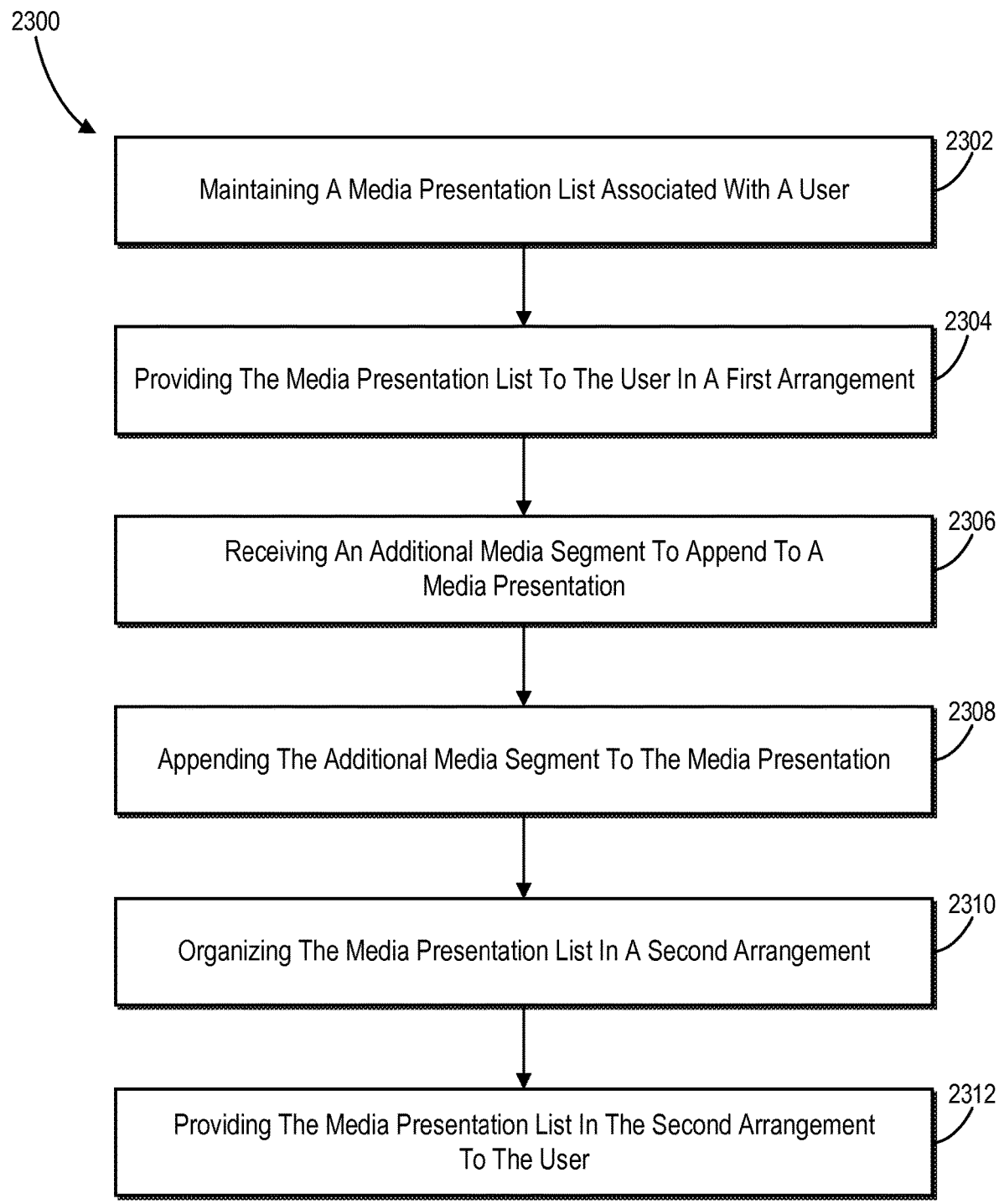
FIG. 23 illustrates flowchart of a method for arranging a media presentation list in accordance with one or more embodiments.

FIG. 23 illustrates a flowchart of a method 2300 for organizing a media presentation list in a media presentation in accordance with one or more embodiments. The method 2300 can be performed by the social networking system 108 and/or the media presentation system 102 described herein. To illustrate, the method 2300 includes an act 2302 of maintaining a media presentation list associated with a user. In particular, the act 2302 may involve maintaining a media presentation list associated with a user that comprises a plurality of media presentations, where each of the plurality of media presentations includes one or more media segments received from co-users. For example, the act 2300 may include storing information in a database that indicates which media presentations are associated with the user.

The method 2300 also includes an act 2304 of providing the media presentation list to the user in a first arrangement. In particular, the act 2304 may involve providing, to the user via a first client device 104a, the media presentation list having the plurality of media presentations organized in a first arrangement. For example, the act 2304 may involve organizing the media presentations in a first arrangement based on default settings set by the media presentation system 102, media presentation creation date, or media presentation modification date. Further, the act 2304 may involve sending a configuration file to the first client device 104a indicating the first arrangement of media presentations within the media presentation list.

In addition, the method 2300 includes an act 2306 of receiving an additional media segment to append to a media presentation. In particular, the act 2306 can involve receiving an additional media segment to append to a first media presentation of the plurality of media presentations. For example, the act 2306 may involve receiving a media segment from the first client device 104a, where a user 110 associated with the first client device 104a provided the media segment. The act 2306 may also involve receiving a media stream from a third-party, such as a news broadcast.

The method 2300 also includes an act 2308 of appending the additional media segment to the media presentation. In other words, the act 2308 may involve adding the media segment to other media segments in a media presentation. In some example embodiments, the act 2308 may also involve logically joining (e.g., within a media presentation database) the media segment received from client device (e.g., the first client device 104a) to other media segments in a corresponding media presentation within the media presentation list.

The method 2300 further includes an act 2310 of organizing the media presentations in a second arrangement. In particular, the act 2310 may involve organizing, based, at least in part, on appending the additional media segment to the first media presentation, the plurality of media presentations in a second arrangement within the media presentation list. For instance, the act 2310 may involve ranking each of the plurality of media presentations within the media presentation list (e.g., according to popularity, trendiness, topic, sponsorship, or recency) and organizing the plurality of media presentations within the media presentation of the plurality of media presentations based on the ranking of each of the plurality of media presentations. In addition, the act 2310 can involve identifying an attribute corresponding to the first client device, determining that a second media presentation from the plurality of media presentations is related to the identified attribute corresponding to the first client device 104a, where organizing the plurality of media presentations within the media presentation list further includes prioritizing the second media presentation within the second arrangement based on the determination that the second media presentation shares the identified attribute corresponding to the first client device.

The method 2300 also includes an act 2312 of providing the media organized presentation list in the second arrangement to the user. In particular, the act 2312 may involve providing, to the user via the first client device 104a, the media presentation list organized in the second arrangement. For example, the act 2312 may involve sending an updated configuration file to the first client device 104a that indicates the updated arrangement of the media presentations within the media presentation list.

In addition to the foregoing, embodiments of the present invention also can be described in terms of flowcharts comprising acts and steps in a method for accomplishing a particular result. For example, FIGS. 4, 9, 14, 16, 17, and 22-23, which are described above, illustrate flowcharts of exemplary methods in accordance with one or more embodiments of the present invention. The methods described in relation to FIGS. 4, 9, 14, 16, 17, and 22-23 can be performed with less or more steps/acts or the steps/acts can be performed in differing orders. Additionally, the steps/acts described herein can be repeated or performed in parallel with one another or in parallel with different instances of the same or similar steps/acts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 24:
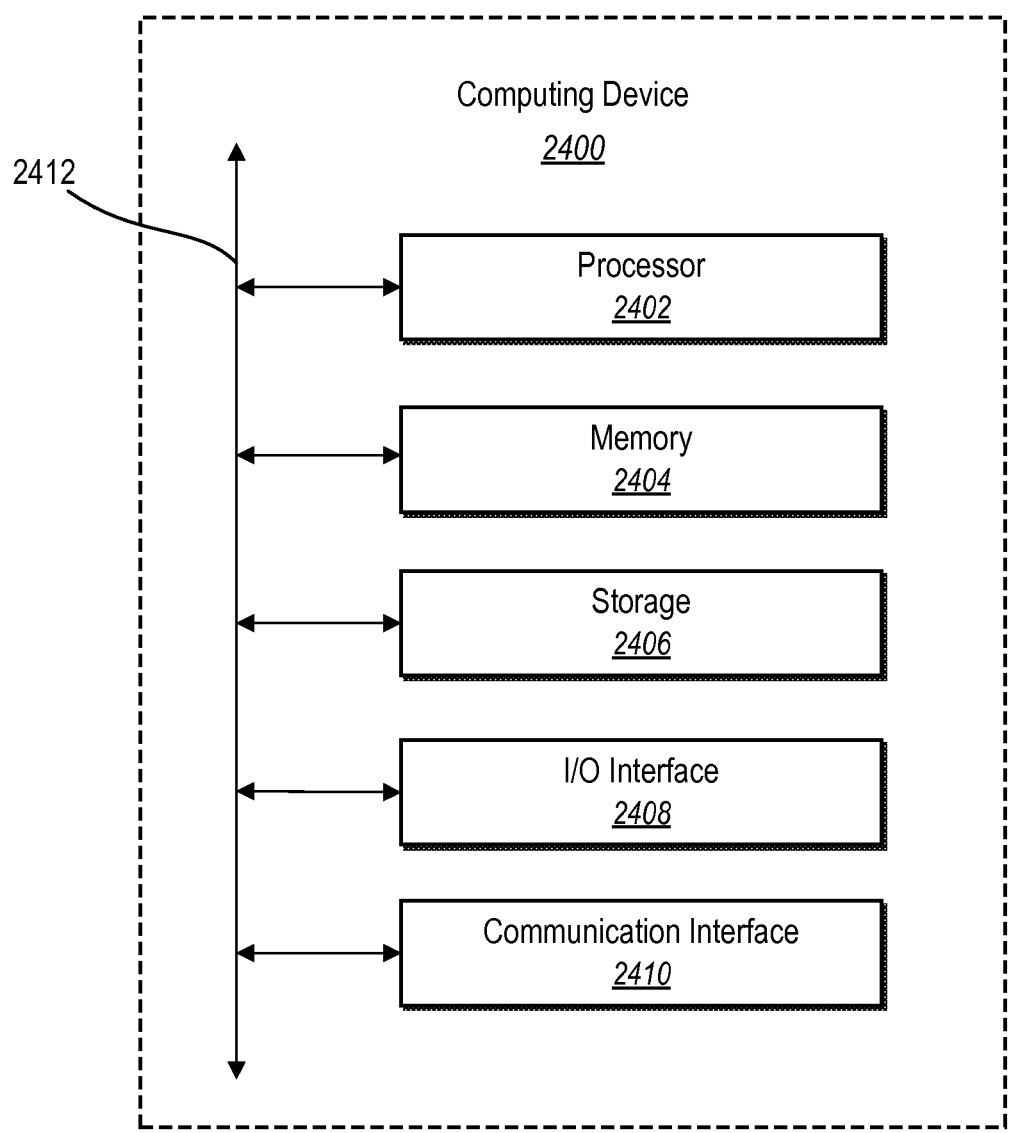
FIG. 24 illustrates a block diagram of a client device in accordance with one or more embodiments.

FIG. 24 illustrates a block diagram of exemplary computing device 2400 that may be configured to perform one or more of the processes described above. One will appreciate that one or more computing devices such as the computing device 2400 may implement the media presentation system 102 and/or computing devices 104a, 104b, 104, and 300. As shown by FIG. 24, the computing device 2400 can comprise a processor 2402, a memory 2404, a storage device 2406, an I/O interface 2408, and a communication interface 2410, which may be communicatively coupled by way of a communication infrastructure 2412. While an exemplary computing device 2400 is shown in FIG. 24, the components illustrated in FIG. 24 are not intended to be limiting. Additional or alternative components may be used in other embodiments. Furthermore, in certain embodiments, the computing device 2400 can include fewer components than those shown in FIG. 24. Components of the computing device 2400 shown in FIG. 24 will now be described in additional detail.

In one or more embodiments, the processor 2402 includes hardware for executing instructions, such as those making up a computer program. As an example and not by way of limitation, to execute instructions, the processor 2402 may retrieve (or fetch) the instructions from an internal register, an internal cache, the memory 2404, or the storage device 2406 and decode and execute them. In one or more embodiments, the processor 2402 may include one or more internal caches for data, instructions, or addresses. As an example and not by way of limitation, the processor 2402 may include one or more instruction caches, one or more data caches, and one or more translation lookaside buffers (TLBs). Instructions in the instruction caches may be copies of instructions in the memory 2404 or the storage 2406.

The memory 2404 may be used for storing data, metadata, and programs for execution by the processor(s). The memory 2404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 2404 may be internal or distributed memory.

The storage device 2406 includes storage for storing data or instructions. As an example and not by way of limitation, storage device 2406 can comprise a non-transitory storage medium described above. The storage device 2406 may include a hard disk drive (HDD), a floppy disk drive, flash memory, an optical disc, a magneto-optical disc, magnetic tape, or a Universal Serial Bus (USB) drive or a combination of two or more of these. The storage device 2406 may include removable or non-removable (or fixed) media, where appropriate. The storage device 2406 may be internal or external to the computing device 2400. In one or more embodiments, the storage device 2406 is non-volatile, solid-state memory. In other embodiments, the storage device 2406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 2408 allows a user to provide input to, receive output from, and otherwise transfer data to and receive data from computing device 2400. The I/O interface 2408 may include a mouse, a keypad or a keyboard, a touch screen, a camera, an optical scanner, network interface, modem, other known I/O devices or a combination of such I/O interfaces. The I/O interface 2408 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2408 is configured to provide graphical data to a display for presentation to a user. The graphical data may be representative of one or more graphical user interfaces and/or any other graphical content as may serve a particular implementation.

The communication interface 2410 can include hardware, software, or both. In any event, the communication interface 2410 can provide one or more interfaces for communication (such as, for example, packet-based communication) between the computing device 2400 and one or more other computing devices or networks. As an example and not by way of limitation, the communication interface 2410 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 2410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 2410 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 2410 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 2412 may include hardware, software, or both that couples components of the computing device 2400 to each other. As an example and not by way of limitation, the communication infrastructure 2412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communication system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 25:
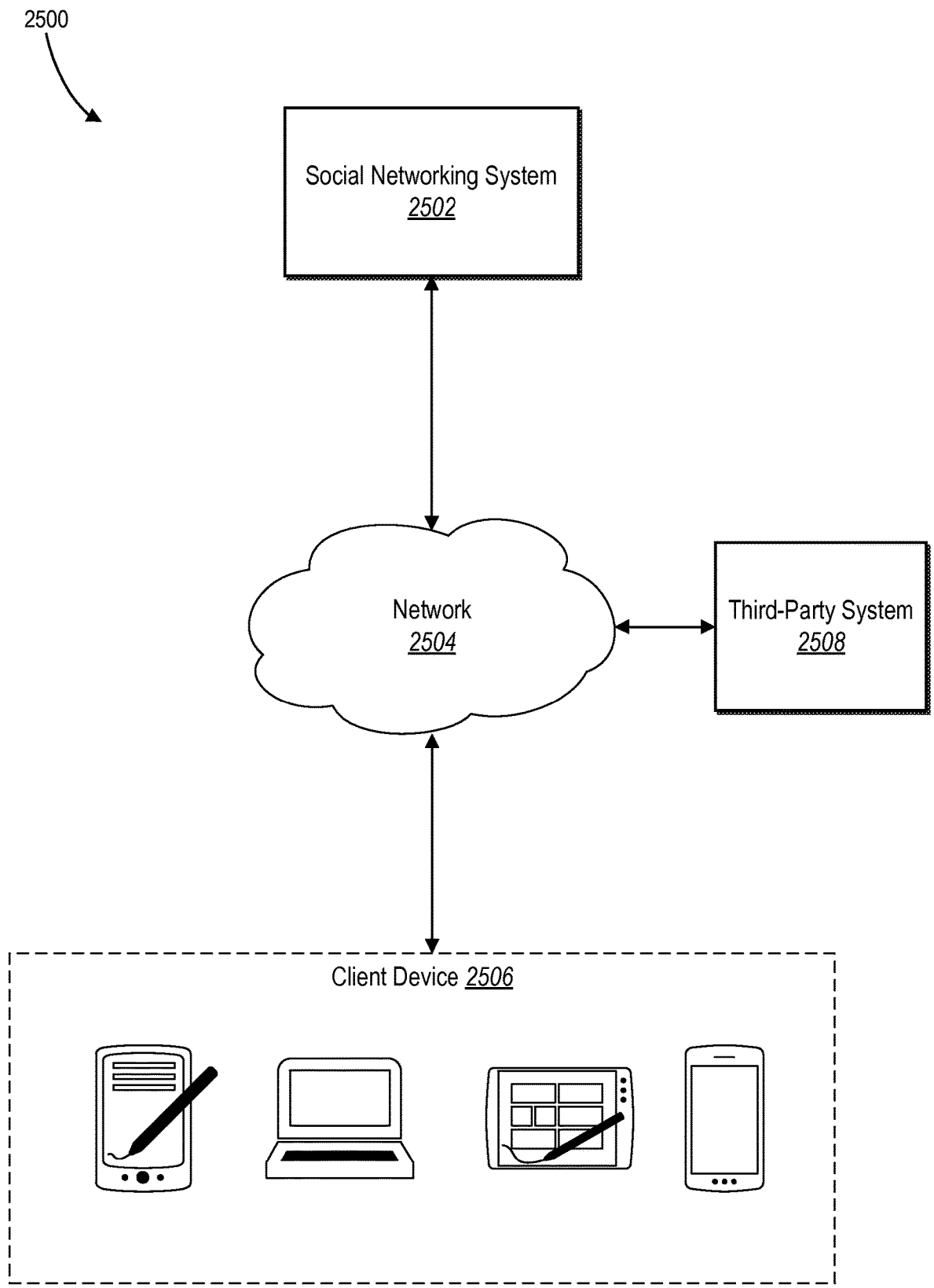
FIG. 25 illustrates a network environment of a social networking system in accordance with one or more embodiments described herein.

FIG. 25 illustrates an example network environment 2500 of a social networking system. Network environment 2500 includes a client system 2506, a social networking system 2502, and a third-party system 2508 connected to each other by a network 2504. Although FIG. 25 illustrates a particular arrangement of client system 2506, social networking system 2502, third-party system 2508, and network 2504, this disclosure contemplates any suitable arrangement of client system 2506, social networking system 2502, third-party system 2508, and network 2504. As an example and not by way of limitation, two or more of client system 2506, social networking system 2502, and third-party system 2508 may be connected to each other directly, bypassing network 2504. As another example, two or more of client system 2506, social networking system 2502, and third-party system 2508 may be physically or logically co-located with each other in whole, or in part. Moreover, although FIG. 25 illustrates a particular number of client systems 2506, social networking systems 2502, third-party systems 2508, and networks 2504, this disclosure contemplates any suitable number of client systems 2506, social networking systems 2502, third-party systems 2508, and networks 2504. As an example and not by way of limitation, network environment 2500 may include multiple client system 2506, social networking systems 2502, third-party systems 2508, and networks 2504.

This disclosure contemplates any suitable network 2504. As an example and not by way of limitation, one or more portions of network 2504 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 2504 may include one or more networks 2504.

Links may connect client system 2506, social networking system 2502, and third-party system 2508 to communication network 2504 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 2500. One or more first links may differ in one or more respects from one or more second links.

In particular embodiments, client system 2506 may be an electronic device including hardware, software, or embedded logic components or a combination of two or more such components and capable of carrying out the appropriate functionalities implemented or supported by client system 2506. As an example and not by way of limitation, a client system 2506 may include any of the client devices or systems described in the above figures. A client system 2506 may enable a network user at client system 2506 to access network 2504. A client system 2506 may enable its user to communicate with other users at other client systems 2506.

In particular embodiments, client system 2506 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 2506 may enter a Uniform Resource Locator (URL) or other address directing the web browser to a particular server (such as server, or a server associated with a third-party system 2508), and the web browser may generate a Hyper Text Transfer Protocol (HTTP) request and communicate the HTTP request to server. The server may accept the HTTP request and communicate to client system 2506 one or more Hyper Text Markup Language (HTML) files responsive to the HTTP request. Client system 2506 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 2502 may be a network-addressable computing system that can host an online social network. Social networking system 2502 may generate, store, receive, and send social-networking data, such as, for example, user-profile data, concept-profile data, social-graph information, or other suitable data related to the online social network. Social networking system 2502 may be accessed by the other components of network environment 2500 either directly or via network 2504. In particular embodiments, social networking system 2502 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 2502 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 2506, a social networking system 2502, or a third-party system 2508 to manage, retrieve, modify, add, or delete, the information stored in data store.

In particular embodiments, social networking system 2502 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 2502 may provide users of the online social network the ability to communicate and interact with other users. In particular embodiments, users may join the online social network via social networking system 2502 and then add connections (e.g., relationships) to a number of other users of social networking system 2502 whom they want to be connected to. Herein, the term "friend" may refer to any other user of social networking system 2502 with which a user has formed a connection, association, or relationship via social networking system 2502.

In particular embodiments, social networking system 2502 may provide users with the ability to take actions on various types of items or objects, supported by social networking system 2502. As an example and not by way of limitation, the items and objects may include groups or social networks to which users of social networking system 2502 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 2502 or by an external system of third-party system 2508, which is separate from social networking system 2502 and coupled to social networking system 2502 via a network 2504.

In particular embodiments, social networking system 2502 may be capable of linking a variety of entities. As an example and not by way of limitation, social networking system 2502 may enable users to interact with each other as well as receive content from third-party systems 2508 or other entities, or to allow users to interact with these entities through an application programming interfaces (API) or other communication channels.

In particular embodiments, a third-party system 2508 may include one or more types of servers, one or more data stores, one or more interfaces, including but not limited to APIs, one or more web services, one or more content sources, one or more networks, or any other suitable components, e.g., that servers may communicate with. A third-party system 2508 may be operated by a different entity from an entity operating social networking system 2502. In particular embodiments, however, social networking system 2502 and third-party systems 2508 may operate in conjunction with each other to provide social-networking services to users of social networking system 2502 or third-party systems 2508. In this sense, social networking system 2502 may provide a platform, or backbone, which other systems, such as third-party systems 2508, may use to provide social-networking services and functionality to users across the Internet.

In particular embodiments, a third-party system 2508 may include a third-party content object provider. A third-party content object provider may include one or more sources of content objects, which may be communicated to a client system 2506. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 2502 also includes user-generated content objects, which may enhance a user's interactions with social networking system 2502. User-generated content may include anything a user can add, upload, send, or "post" to social networking system 2502. As an example and not by way of limitation, a user communicates posts to social networking system 2502 from a client system 2506. Posts may include data such as status updates or other textual data, location information, photos, videos, links, music or other similar data or media. Content may also be added to social networking system 2502 by a third-party through a "communication channel," such as a newsfeed or stream.

In particular embodiments, social networking system 2502 may include a variety of servers, sub-systems, programs, modules, logs, and data stores. In particular embodiments, social networking system 2502 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 2502 may also include suitable components such as network interfaces, security mechanisms, load balancers, failover servers, management-and-network-operations consoles, other suitable components, or any suitable combination thereof. In particular embodiments, social networking system 2502 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 2502 to one or more client systems 2506 or one or more third-party system 2508 via network 2504. The web server may include a mail server or other messaging functionality for receiving and routing messages between social networking system 2502 and one or more client systems 2506. An API-request server may allow a third-party system 2508 to access information from social networking system 2502 by calling one or more APIs. An action logger may be used to receive communications from a web server about a user's actions on or off social networking system 2502. In conjunction with the action log, a third-party-content-object log may be maintained of user exposures to third-party-content objects. A notification controller may provide information regarding content objects to a client system 2506. Information may be pushed to a client system 2506 as notifications, or information may be pulled from client system 2506 responsive to a request received from client system 2506. Authorization servers may be used to enforce one or more privacy settings of the users of social networking system 2502. A privacy setting of a user determines how particular information associated with a user can be shared. The authorization server may allow users to opt in to or opt out of having their actions logged by social networking system 2502 or shared with other systems (e.g., third-party system 2508), such as, for example, by setting appropriate privacy settings. Third-party-content-object stores may be used to store content objects received from third parties, such as a third-party system 2508. Location stores may be used for storing location information received from client systems 2506 associated with users. Advertisement-pricing modules may combine social information, the current time, location information, or other suitable information to provide relevant advertisements, in the form of notifications, to a user.

Figure 26:
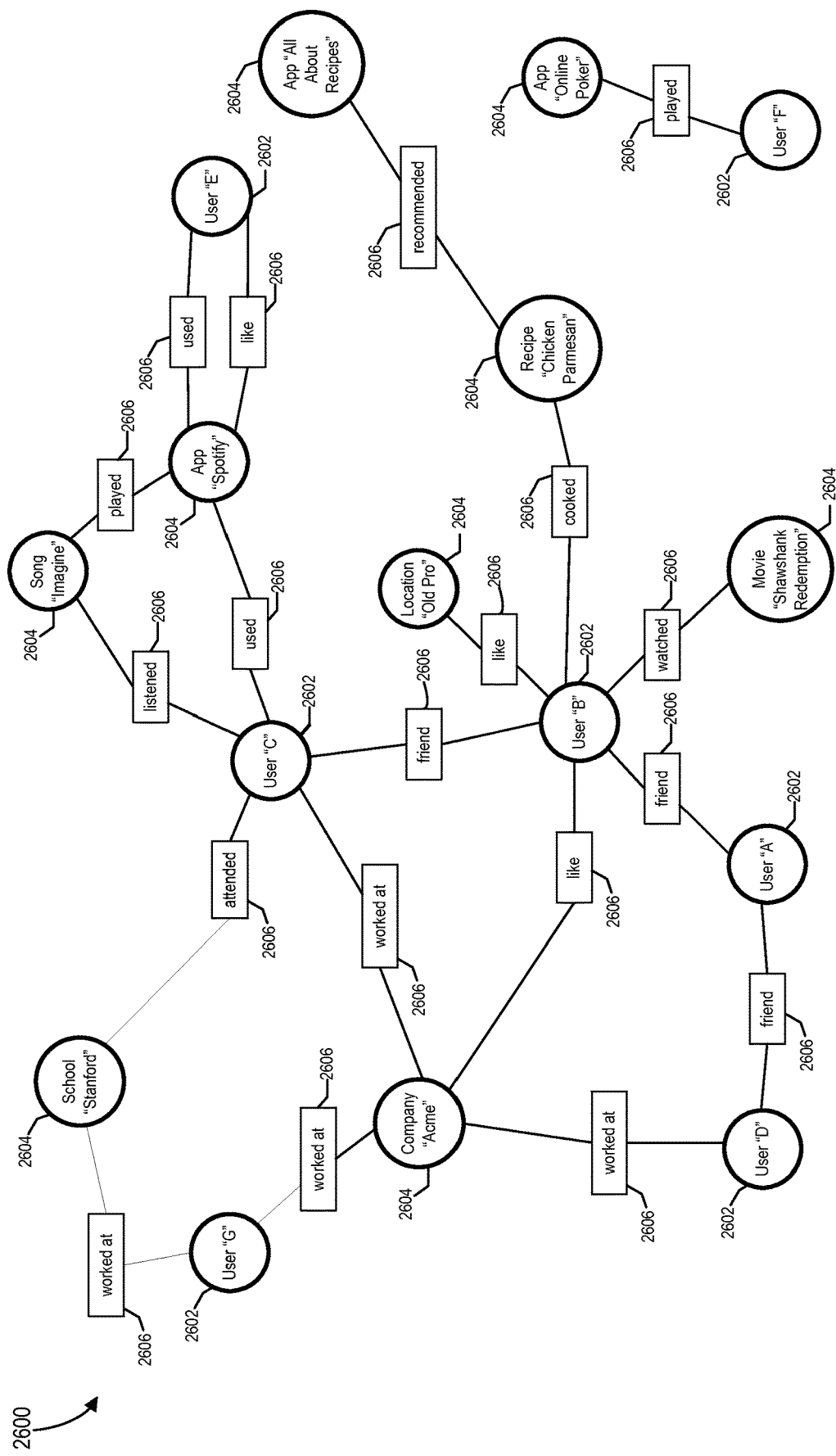
FIG. 26 illustrates an example social graph of a social networking system in accordance with one or more embodiments described herein.

FIG. 26 illustrates example social graph 2600. In particular embodiments, social networking system 2502 may store one or more social graphs 2600 in one or more data stores. In particular embodiments, social graph 2600 may include multiple nodes—which may include multiple user nodes 2602 or multiple concept nodes 2604—and multiple edges 2606 connecting the nodes. Example social graph 2600 illustrated in FIG. 26 is shown, for didactic purposes, in a two-dimensional visual map representation. In particular embodiments, a social networking system 2502, client system 2506, or third-party system 2508 may access social graph 2600 and related social-graph information for suitable applications. The nodes and edges of social graph 2600 may be stored as data objects, for example, in a data store (such as a social-graph database). Such a data store may include one or more searchable or query able indexes of nodes or edges of social graph 2600.

In particular embodiments, a user node 2602 may correspond to a user of social networking system 2502. As an example and not by way of limitation, a user may be an individual (human user), an entity (e.g., an enterprise, business, or third-party application), or a group (e.g., of individuals or entities) that interacts or communicates with or over social networking system 2502. In particular embodiments, when a user registers for an account with social networking system 2502, social networking system 2502 may create a user node 2602 corresponding to the user, and store the user node 2602 in one or more data stores. Users and user nodes 2602 described herein may, where appropriate, refer to registered users and user nodes 2602 associated with registered users. In addition or as an alternative, users and user nodes 2602 described herein may, where appropriate, refer to users that have not registered with social networking system 2502. In particular embodiments, a user node 2602 may be associated with information provided by a user or information gathered by various systems, including social networking system 2502. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 2604 may correspond to a concept. As an example and not by way of limitation, a concept may correspond to a place (such as, for example, a movie theater, restaurant, landmark, or city); a website (such as, for example, a website associated with social-network system 2502 or a third-party website associated with a web-application server); an entity (such as, for example, a person, business, group, sports team, or celebrity); a resource (such as, for example, an audio file, video file, digital photo, text file, structured document, or application) which may be located within social networking system 2502 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 2604 may be associated with information of a concept provided by a user or information gathered by various systems, including social networking system 2502. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 2604 may be associated with one or more data objects corresponding to information associated with concept node 2604. In particular embodiments, a concept node 2604 may correspond to one or more webpages.

In particular embodiments, a node in social graph 2600 may represent or be represented by a webpage (which may be referred to as a "profile page"). Profile pages may be hosted by or accessible to social networking system 2502. Profile pages may also be hosted on third-party websites associated with a third-party server 2508. As an example and not by way of limitation, a profile page corresponding to a particular external webpage may be the particular external webpage and the profile page may correspond to a particular concept node 2604. Profile pages may be viewable by all or a selected subset of other users. As an example and not by way of limitation, a user node 2602 may have a corresponding user-profile page in which the corresponding user may add content, make declarations, or otherwise express himself or herself. As another example and not by way of limitation, a concept node 2604 may have a corresponding concept-profile page in which one or more users may add content, make declarations, or express themselves, particularly in relation to the concept corresponding to concept node 2604.

In particular embodiments, a concept node 2604 may represent a third-party webpage or resource hosted by a third-party system 2508. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 2506 to send to social networking system 2502 a message indicating the user's action. In response to the message, social networking system 2502 may create an edge (e.g., an "eat" edge) between a user node 2602 corresponding to the user and a concept node 2604 corresponding to the third-party webpage or resource and store edge 2606 in one or more data stores.

In particular embodiments, a pair of nodes in social graph 2600 may be connected to each other by one or more edges 2606. An edge 2606 connecting a pair of nodes may represent a relationship between the pair of nodes. In particular embodiments, an edge 2606 may include or represent one or more data objects or attributes corresponding to the relationship between a pair of nodes. As an example and not by way of limitation, a first user may indicate that a second user is a "friend" of the first user. In response to this indication, social networking system 2502 may send a "friend request" to the second user. If the second user confirms the "friend request," social networking system 2502 may create an edge 2606 connecting the first user's user node 2602 to the second user's user node 2602 in social graph 2600 and store edge 2606 as social-graph information in one or more of data stores. In the example of FIG. 26, social graph 2600 includes an edge 2606 indicating a friend relation between user nodes 2602 of user "A" and user "B" and an edge indicating a friend relation between user nodes 2602 of user "C" and user "B." Although this disclosure describes or illustrates particular edges 2606 with particular attributes connecting particular user nodes 2602, this disclosure contemplates any suitable edges 2606 with any suitable attributes connecting user nodes 2602. As an example and not by way of limitation, an edge 2606 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 2600 by one or more edges 2606.

In particular embodiments, an edge 2606 between a user node 2602 and a concept node 2604 may represent a particular action or activity performed by a user associated with user node 2602 toward a concept associated with a concept node 2604. As an example and not by way of limitation, as illustrated in FIG. 26, a user may "like," "attended," "played," "listened," "cooked," "worked at," or "watched" a concept, each of which may correspond to a edge type or subtype. A concept-profile page corresponding to a concept node 2604 may include, for example, a selectable "check in" icon (such as, for example, a clickable "check in" icon) or a selectable "add to favorites" icon. Similarly, after a user clicks these icons, social networking system 2502 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 2502 may create a "listened" edge 2606 and a "used" edge (as illustrated in FIG. 26) between user nodes 2602 corresponding to the user and concept nodes 2604 corresponding to the song and application to indicate that the user listened to the song and used the application. Moreover, social networking system 2502 may create a "played" edge 2606 (as illustrated in FIG. 26) between concept nodes 2604 corresponding to the song and the application to indicate that the particular song was played by the particular application. In this case, "played" edge 2606 corresponds to an action performed by an external application (SPOTIFY) on an external audio file (the song "Imagine"). Although this disclosure describes particular edges 2606 with particular attributes connecting user nodes 2602 and concept nodes 2604, this disclosure contemplates any suitable edges 2606 with any suitable attributes connecting user nodes 2602 and concept nodes 2604. Moreover, although this disclosure describes edges between a user node 2602 and a concept node 2604 representing a single relationship, this disclosure contemplates edges between a user node 2602 and a concept node 2604 representing one or more relationships. As an example and not by way of limitation, an edge 2606 may represent both that a user likes and has used at a particular concept. Alternatively, another edge 2606 may represent each type of relationship (or multiples of a single relationship) between a user node 2602 and a concept node 2604 (as illustrated in FIG. 26 between user node 2602 for user "E" and concept node 2604 for "SPOTIFY").

In particular embodiments, social networking system 2502 may create an edge 2606 between a user node 2602 and a concept node 2604 in social graph 2600. As an example and not by way of limitation, a user viewing a concept-profile page (such as, for example, by using a web browser or a special-purpose application hosted by the user's client system 2506) may indicate that he or she likes the concept represented by the concept node 2604 by clicking or selecting a "Like" icon, which may cause the user's client system 2506 to send to social networking system 2502 a message indicating the user's liking of the concept associated with the concept-profile page. In response to the message, social networking system 2502 may create an edge 2606 between user node 2602 associated with the user and concept node 2604, as illustrated by "like" edge 2606 between the user and concept node 2604. In particular embodiments, social networking system 2502 may store an edge 2606 in one or more data stores. In particular embodiments, an edge 2606 may be automatically formed by social networking system 2502 in response to a particular user action. As an example and not by way of limitation, if a first user uploads a picture, watches a movie, or listens to a song, an edge 2606 may be formed between user node 2602 corresponding to the first user and concept nodes 2604 corresponding to those concepts. Although this disclosure describes forming particular edges 2606 in particular manners, this disclosure contemplates forming any suitable edges 2606 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 2502). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 2502 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 2502) or RSVP (e.g., through social networking system 2502) to an event associated with the advertisement. In addition or as an alternative, an advertisement may include social-networking-system context directed to the user. As an example and not by way of limitation, an advertisement may display information about a friend of the user within social networking system 2502 who has taken an action associated with the subject matter of the advertisement.

In particular embodiments, social networking system 2502 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 2508 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 2502 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 2502 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 260%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 2502 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 2502 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 2502 may calculate a coefficient based on a user's actions. Social networking system 2502 may monitor such actions on the online social network, on a third-party system 2508, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 2502 may calculate a coefficient based on the user's actions with particular types of content. The content may be associated with the online social network, a third-party system 2508, or another suitable system. The content may include users, profile pages, posts, news stories, headlines, instant messages, chat room conversations, emails, advertisements, pictures, video, music, other suitable objects, or any combination thereof. Social networking system 2502 may analyze a user's actions to determine whether one or more of the actions indicate an affinity for subject matter, content, other users, and so forth. As an example and not by way of limitation, if a user may make frequently posts content related to "coffee" or variants thereof, social networking system 2502 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 2502 may calculate a coefficient based on the type of relationship between particular objects. Referencing the social graph 2600, social networking system 2502 may analyze the number and/or type of edges 2606 connecting particular user nodes 2602 and concept nodes 2604 when calculating a coefficient. As an example and not by way of limitation, user nodes 2602 that are connected by a spouse-type edge (representing that the two users are married) may be assigned a higher coefficient than user nodes 2602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 2502 may determine that the user has a higher coefficient with respect to the first photo than the second photo because having a tagged-in-type relationship with content may be assigned a higher weight and/or rating than having a like-type relationship with content. In particular embodiments, social networking system 2502 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 2502 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 2600. As an example and not by way of limitation, social-graph entities that are closer in the social graph 2600 (i.e., fewer degrees of separation) may have a higher coefficient than entities that are further apart in the social graph 2600.

In particular embodiments, social networking system 2502 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 2506 of the user). A first user may be more interested in other users or concepts that are closer to the first user. As an example and not by way of limitation, if a user is one mile from an airport and two miles from a gas station, social networking system 2502 may determine that the user has a higher coefficient for the airport than the gas station based on the proximity of the airport to the user.

In particular embodiments, social networking system 2502 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 2502 may provide information that is relevant to user's interests and current circumstances, increasing the likelihood that they will find such information of interest. In particular embodiments, social networking system 2502 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 2502 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 2502 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 2508 (e.g., via an API or other communication channel), or from another suitable system. In response to the request, social networking system 2502 may calculate the coefficient (or access the coefficient information if it has previously been calculated and stored). In particular embodiments, social networking system 2502 may measure an affinity with respect to a particular process. Different processes (both internal and external to the online social network) may request a coefficient for a particular object or set of objects. Social networking system 2502 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 24, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 2604 corresponding to a particular photo may have a privacy setting specifying that the photo may only be accessed by users tagged in the photo and their friends. In particular embodiments, privacy settings may allow users to opt in or opt out of having their actions logged by social networking system 2502 or shared with other systems (e.g., third-party system 2508). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 2508, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 2502 may send a request to the data store for the object. The request may identify the user associated with the request and may only be sent to the user (or a client system 2506 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   maintaining a media presentation list personalized to a user that comprises a plurality of media presentations, wherein each of the plurality of media presentations comprises one or more media segments received directly from co-users selected by the user;
   providing, to the user via a first client device, the media presentation list having the plurality of media presentations organized in a first arrangement personalized to the user;
   receiving an additional media segment to append to a first media presentation of the plurality of media presentations;
   appending, by at least one processor, the additional media segment to the first media presentation;
   identifying a recency characteristic of the additional media segment within the appended first media presentation;
   identifying an additional characteristic of one or more co-user interactions with the additional media segment within the appended first media presentation by one or more of the co-users associated with the user;
   organizing the plurality of media presentations in a second arrangement within the media presentation list based on a combination of the recency characteristic and the additional characteristic of the one or more co-user interactions with the additional media segment within the appended first media presentation based on a correspondence between the one or more co-user interactions with the additional media segment and profile attributes associated with the user; and
   providing, to the user via the first client device, the media presentation list organized in the second arrangement personalized to the user.

2. The method of claim 1, further comprises:
   ranking each of the plurality of media presentations within the media presentation list; and
   wherein organizing the plurality of media presentations within the media presentation of the plurality of media presentations is further based on the ranking of each of the plurality of media presentations according to at least one of popularity of a defined co-user group comprising the co-users associated with the user, trendiness, or topic.

3. The method of claim 2, wherein the user is associated with a user account of a social network system comprising a social graph and the co-users associated with the user are related to the user within the social networking system.

4. The method of claim 1, further comprising:
   identifying an attribute corresponding to the first client device;
   determining that a second media presentation from the plurality of media presentations is related to the identified attribute corresponding to the first client device; and
   wherein organizing the plurality of media presentations in the second arrangement within the media presentation list further comprises prioritizing the second media presentation within the second arrangement based on the determination that the second media presentation shares the identified attribute corresponding to the first client device.

5. The method of claim 4, wherein the attribute corresponding to the first client device is a geographic location, and wherein determining that the second media presentation is related to the identified attribute comprises determining that one or more media segments in the second media presentation were captured at the geographic location corresponding to the first client device.

6. The method of claim 5, wherein the location is a past location of the first client device.

7. The method of claim 1, further comprising:
   identifying social connections between the user and the co-users associated with each of the plurality of media presentations;
   determining a social affinity between each of the plurality of media presentations and the user based on the identified social connections; and
   wherein organizing the plurality of media presentations in the second arrangement within the media presentation list is further based on the determined social affinities.

8. The method of claim 1, further comprising:
   accessing user preferences associated with the user;
   identifying a media presentation that corresponds to the user preferences; and
   appending the identified media presentation to the media presentation list.

9. The method of claim 1, further comprising:
   accessing, from user preferences associated with the user, categories of interest to the user;
   identifying that a second media presentation within the plurality of media presentations within the media presentation list that corresponds to at least one category from the categories of interest; and
   wherein organizing the plurality of media presentations in the second arrangement within the media presentation list further comprises prioritizing the second media presentation within the second arrangement based on the second media presentation corresponding to the at least one category of interest.

10. The method of claim 1, further comprising:
    detecting one or more faces within a second media presentation of the plurality of media presentations;
    matching the one or more detected faces within the second media presentation to one or more co-users socially connected to the user; and
    wherein organizing the plurality of media presentations in the second arrangement within the media presentation list further comprises prioritizing the second media presentation within the second arrangement based on the matching the one or more detected faces with the one or more co-users socially connected to the user.

11. A non-transitory computer readable medium storing instructions thereon that, when executed by at least one processor, cause a computer system to:
   maintain a media presentation list personalized to a user that comprises a plurality of media presentations, wherein each of the plurality of media presentations comprises one or more media segments received directly from co-users selected by the user;
   provide, to the user via a first client device, the media presentation list having the plurality of media presentations organized in a first arrangement personalized to the user;
   receive an additional media segment to append to a first media presentation of the plurality of media presentations;
   append the additional media segment to the first media presentation;
   identify a recency characteristic of the additional media segment within the appended first media presentation;
   identify an additional characteristic of one or more co-user interactions with the additional media segment within the appended first media presentation by one or more of the co-users associated with the user;
   organize the plurality of media presentations in a second arrangement within the media presentation list based on a combination of the recency characteristic and the additional characteristic of the one or more co-user interactions with the additional media segment within the appended first media presentation based on a correspondence between the one or more co-user interactions with the additional media segment and profile attributes associated with the user; and
   provide, to the user via the first client device, the media presentation list organized in the second arrangement personalized to the user.

12. The non-transitory computer readable medium of claim 11, further comprising instructions that, when executed by the at least one processor, cause the computer system to:
   determine a number of views for each media presentation of the plurality of media presentations based on interactions by the user and co-users associated with the user; and
   wherein organizing the plurality of media presentations in the second arrangement within the media presentation list comprises prioritizing media presentations within the second arrangement based on the combination of the recency characteristic and the number of views corresponding to the additional media segment within the appended first media presentation.

13. The non-transitory computer readable medium of claim 11, further comprising instructions that, when executed by the at least one processor, cause the computer system to:
   identify an additional media presentation that has at least a threshold number of views;
   add the additional media presentation to the media presentation list;
   organize the plurality of media presentations including the additional media presentation in a third arrangement within the media presentation list; and
   provide, to the user via the first client device, the media presentation list organized in the third arrangement personalized to the user.

14. The non-transitory computer readable medium of claim 13, further comprising instructions that, when executed by the at least one processor, cause the computer system to prioritize the identified media presentation within the third arrangement of the media presentation list.

15. The non-transitory computer readable medium of claim 11, further comprising instructions that, when executed by the at least one processor, cause the computer system to:
   detect a first location of the first client device associated with the user; and
   adding one or more media presentations that correspond to the detected first location of the first client device to the media presentation list personalized to the user.

16. The non-transitory computer readable medium of claim 11, further comprising instructions that, when executed by the at least one processor, cause the computer system to:
   enable the user to search for media presentations by location; and
   add, in response to the user selecting a media presentation from a search result, the selected media presentation to the media presentation list personalized to the user.

17. The non-transitory computer readable medium of claim 11, further comprising instructions that, when executed by the at least one processor, cause the computer system to:
   identify social connections between the user and the co-users associated with each of the plurality of media presentations;
   determine a social affinity between each of the plurality of media presentations and the user based on the identified social connections; and
   wherein organizing the plurality of media presentations in the second arrangement within the media presentation list is further based on the determined social affinities.

18. The non-transitory computer readable medium of claim 11, further comprising instructions that, when executed by the at least one processor, cause the computer system to:
   detect one or more faces within a second media presentation of the plurality of media presentations;
   match the one or more detected faces within the second media presentation to one or more co-users socially connected to the user; and
   wherein organizing the plurality of media presentations in the second arrangement within the media presentation list further comprises prioritizing the second media presentation within the second arrangement based on matching the one or more detected faces with the one or more co-users connected to the user.

19. A system comprising:
   at least one processor; and
   at least one non-transitory computer readable storage medium storing instructions thereon that, when executed by the at least on processor, cause the system to:
      maintain a media presentation list personalized to a user that comprises a plurality of media presentations, wherein each of the plurality of media presentations comprises one or more media segments received directly from co-users selected by the user;

provide, to the user via a first client device, the media presentation list having the plurality of media presentations organized in a first arrangement personalized to the user;

receive an additional media segment to append to a first media presentation of the plurality of media presentations;

append the additional media segment to the first media presentation;

identify a recency characteristic of the additional media segment within the appended first media presentation;

identify an additional characteristic of one or more co-user interactions with the additional media segment within the appended first media presentation by one or more of the co-users associated with the user;

organize the plurality of media presentations in a second arrangement within the media presentation list based on a combination of the recency characteristic and the additional characteristic of the one or more co-user interactions with the additional media segment within the appended first media presentation based on a correspondence between the one or more co-user interactions with the additional media segment and profile attributes associated with the user; and provide, to the user via the first client device, the media presentation list organized in the second arrangement personalized to the user.

20. The system of claim 19, further comprising instructions that, when executed by the at least on processor, cause the system to:

detect one or more faces within a second media presentation of the plurality of media presentations;

match the one or more detected faces within the second media presentation to one or more co-users socially connected to the user; and wherein organizing the plurality of media presentations in the second arrangement within the media presentation list further comprises prioritizing the second media presentation within the second arrangement based on the matching the one or more detected faces with the one or more co-users socially connected to the user.

\* \* \* \* \*